(12) United States Patent
Takagi et al.

(10) Patent No.: US 9,757,944 B2
(45) Date of Patent: Sep. 12, 2017

(54) LIQUID JET HEAD AND METHOD FOR PRODUCING SAME, AND LIQUID JET APPARATUS AND IMAGE FORMING APPARATUS

(71) Applicants: Daisuke Takagi, Kanagawa (JP); Hisashi Habashi, Kanagawa (JP); Tomoyuki Aratani, Kanagawa (JP); Tatsuya Sameshima, Kanagawa (JP); Ryo Ogawa, Saitama (JP); Takuya Matsuda, Saitama (JP)

(72) Inventors: Daisuke Takagi, Kanagawa (JP); Hisashi Habashi, Kanagawa (JP); Tomoyuki Aratani, Kanagawa (JP); Tatsuya Sameshima, Kanagawa (JP); Ryo Ogawa, Saitama (JP); Takuya Matsuda, Saitama (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/305,723

(22) PCT Filed: May 19, 2015

(86) PCT No.: PCT/JP2015/002501
§ 371 (c)(1),
(2) Date: Oct. 21, 2016

(87) PCT Pub. No.: WO2015/178010
PCT Pub. Date: Nov. 26, 2015

(65) Prior Publication Data
US 2017/0043580 A1    Feb. 16, 2017

(30) Foreign Application Priority Data

May 23, 2014    (JP) ................. 2014-107209

(51) Int. Cl.
*B41J 2/14*    (2006.01)

(52) U.S. Cl.
CPC ......... *B41J 2/1433* (2013.01); *B41J 2/14274* (2013.01); *B41J 2202/03* (2013.01)

(58) Field of Classification Search
CPC .... B41J 2/1433; B41J 2/14274; B41J 2/1606; C08G 59/245; C08G 59/66
See application file for complete search history.

(56) References Cited

U.S. PATENT DOCUMENTS 8,632,161 B2    1/2014   Kuwata et al.
9,150,697 B2 *  10/2015  Sawada ................ B41J 2/1603
                         (Continued)

FOREIGN PATENT DOCUMENTS

JP    2002-284860    10/2002
JP    2003-020339    1/2003
                    (Continued)

OTHER PUBLICATIONS

International Search Report dated Aug. 11, 2015 for counterpart International Patent Application No. PCT/JP2015/002501 filed May 19, 2015.

*Primary Examiner* — Lamson Nguyen
(74) *Attorney, Agent, or Firm* — Oblon, McClelland, Maier & Neustadt, L.L.P.

(57) ABSTRACT

Provided is a liquid jet head, including a flow path including a first member, a resin layer, and a second member, wherein the resin layer contains a cured product of a resin composition containing an epoxy compound represented by General Formula (1), a polythiol compound having 2 or more thiol groups in a molecule thereof, and a specific imidazole compound, where in General Formula (1), L is an integer of 0 or greater but less than 3, m is a positive number of 0.1 or greater but less than 50, $R_1$ represents any one of a hydrogen atom, and an alkyl group having 1 to 4 carbon atoms, and $R_2$ represents a substituent represented by a formula below where $R_3$ and $R_4$ each represent any one of hydrogen atom, (Continued)

and a non-substituted or fluorine-substituted methyl group, and n is an integer of 4 to 12.

18 Claims, 8 Drawing Sheets

(56) References Cited

U.S. PATENT DOCUMENTS

| | | |
|---|---|---|
| 9,150,706 B2 * | 10/2015 | Yoshida .................. C08K 5/09 |
| 2006/0207720 A1 | 9/2006 | Yoshizawa et al. |
| 2008/0152877 A1 | 6/2008 | Mukai et al. |
| 2014/0267497 A1 | 9/2014 | Takagi et al. |
| 2014/0307022 A1 * | 10/2014 | Takahashi .............. B41J 2/1433 |
| | | 347/20 |
| 2014/0375725 A1 | 12/2014 | Sameshima et al. |

FOREIGN PATENT DOCUMENTS

| | | |
|---|---|---|
| JP | 2005-220296 | 8/2005 |
| JP | 4277898 | 3/2009 |
| JP | 2009-285904 | 12/2009 |
| JP | 2013-059966 | 4/2013 |
| JP | 2013-155336 | 8/2013 |
| WO | WO 2011/099501 A1 | 8/2011 |

* cited by examiner

[Fig. 1]
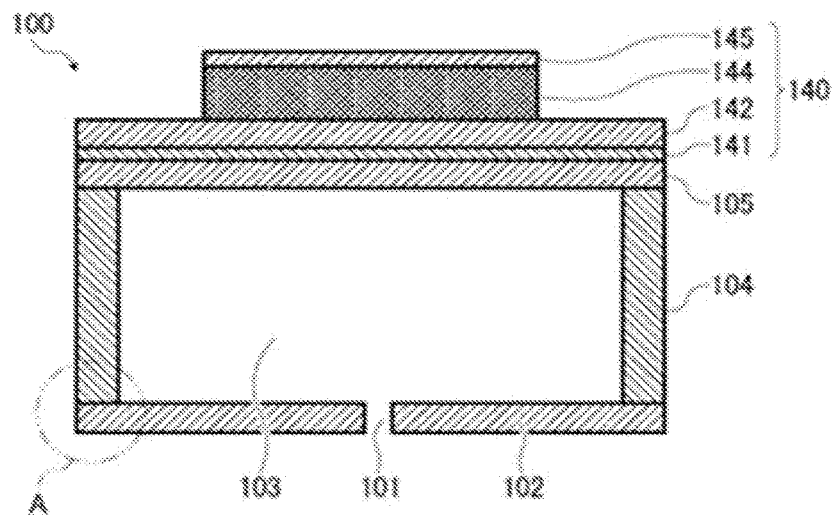
[Fig. 2]
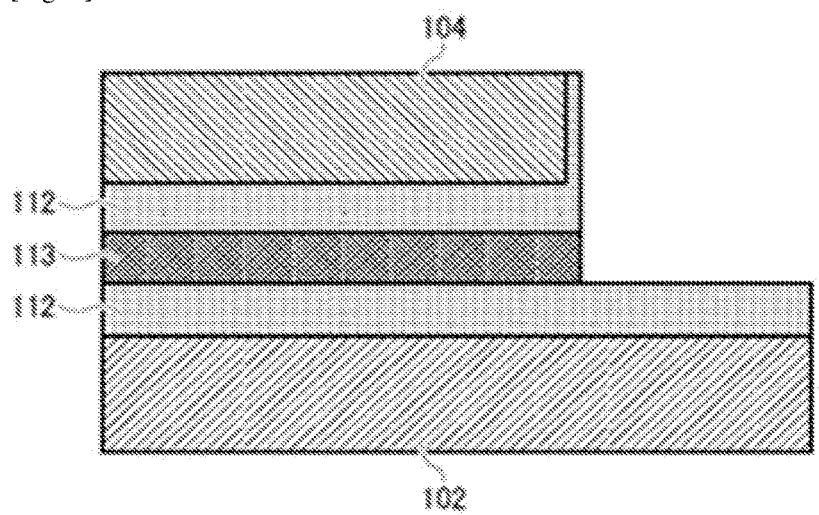
[Fig. 3]
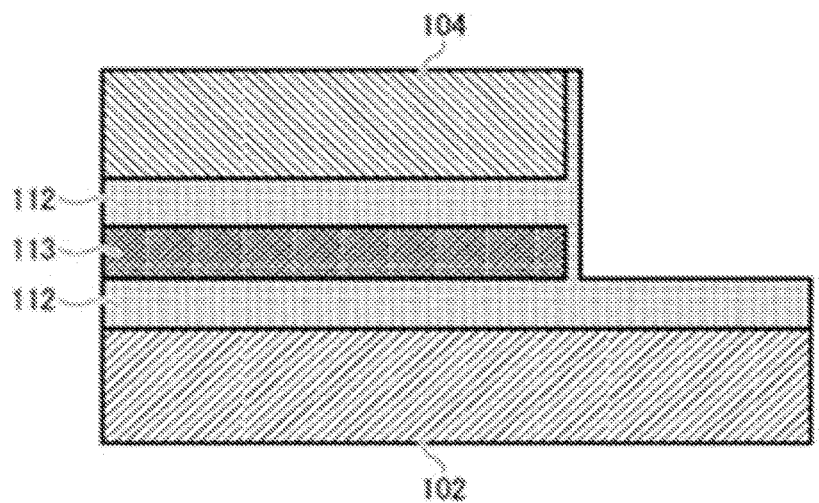

[Fig. 4]
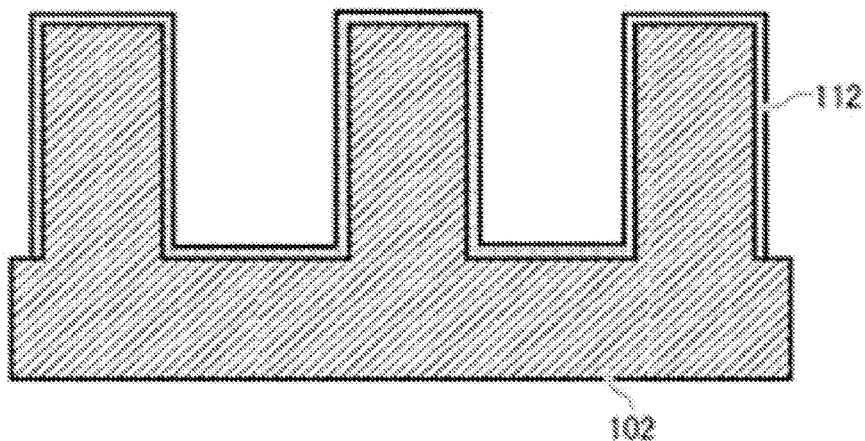
[Fig. 5-A]
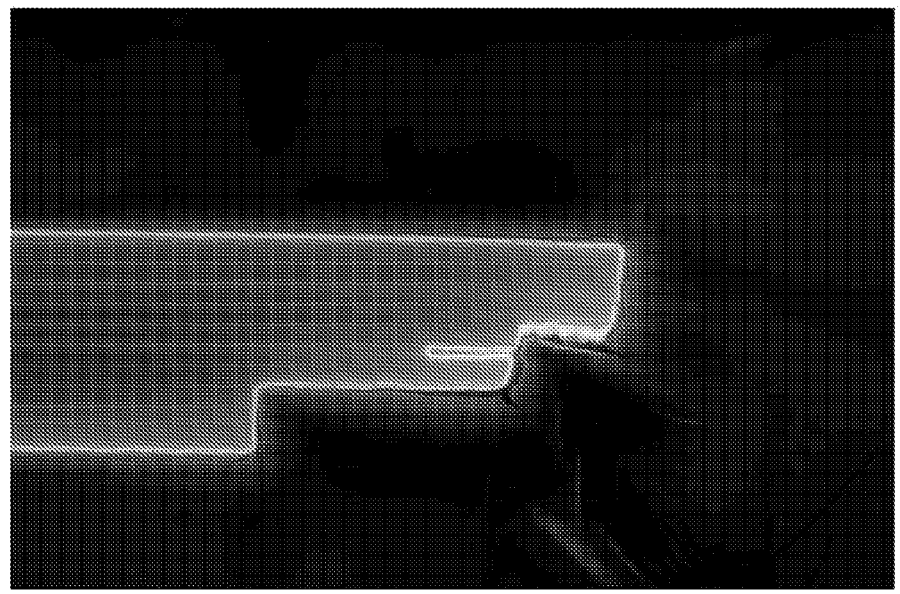

[Fig. 5-B]
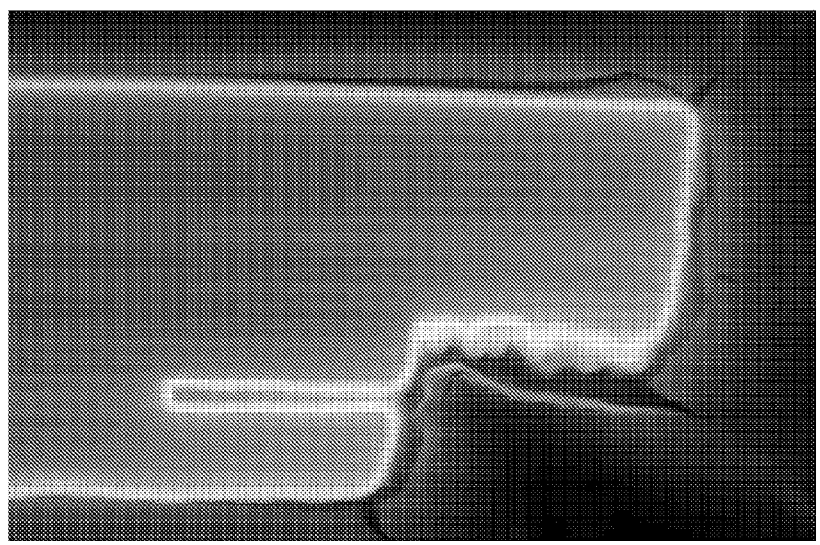
[Fig. 6]
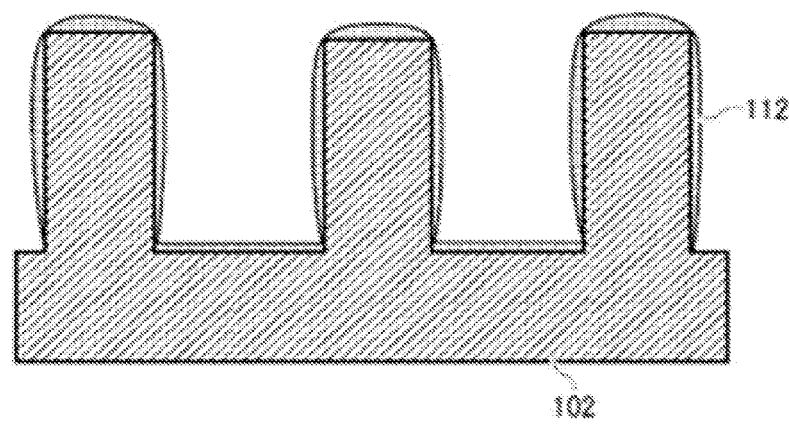

[Fig. 7]
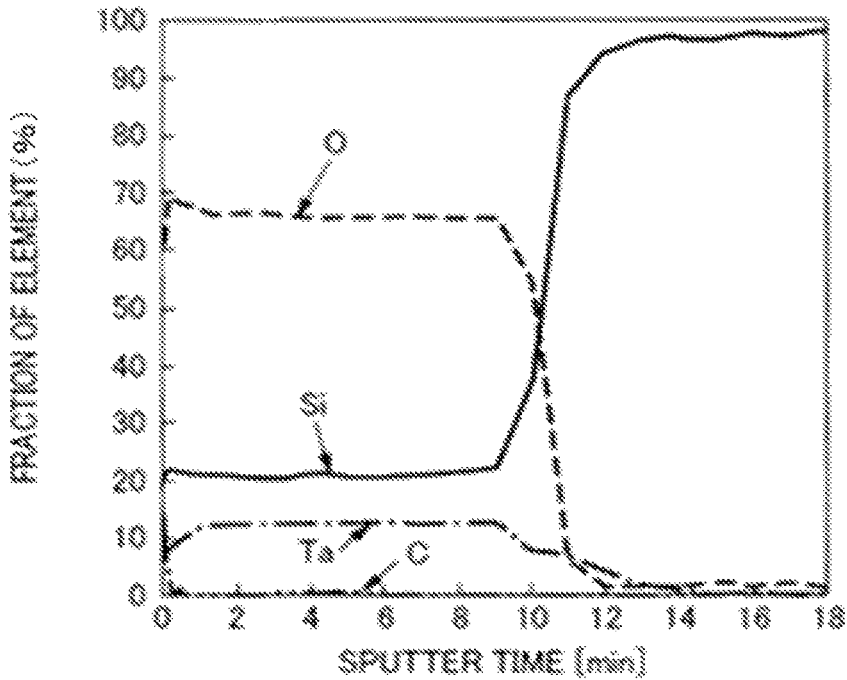
[Fig. 8]
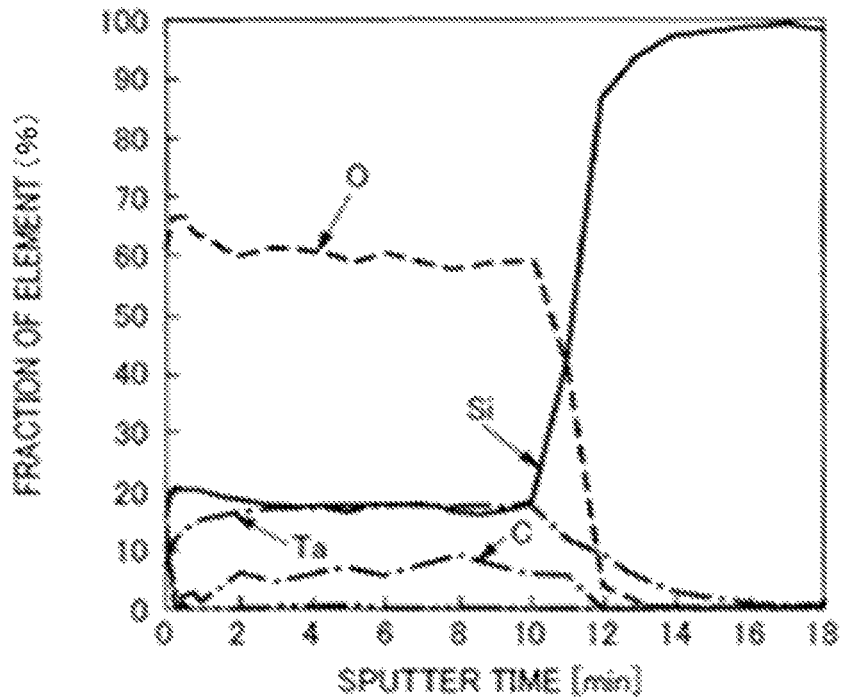

[Fig. 9]
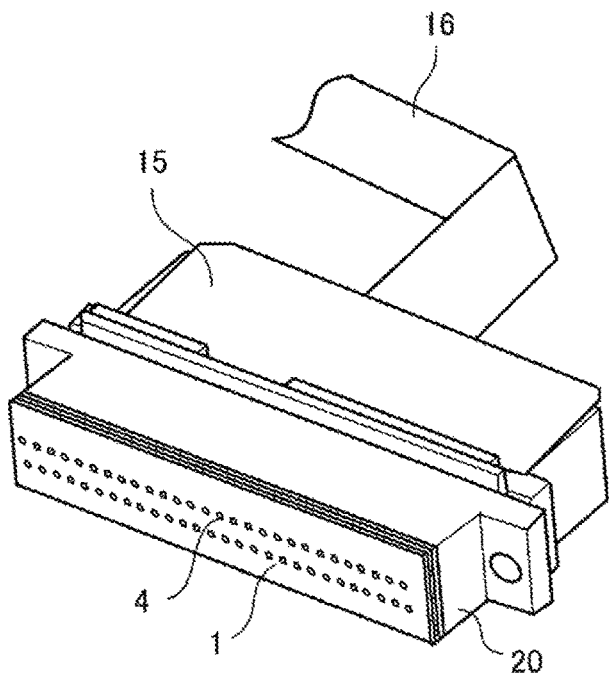
[Fig. 10]
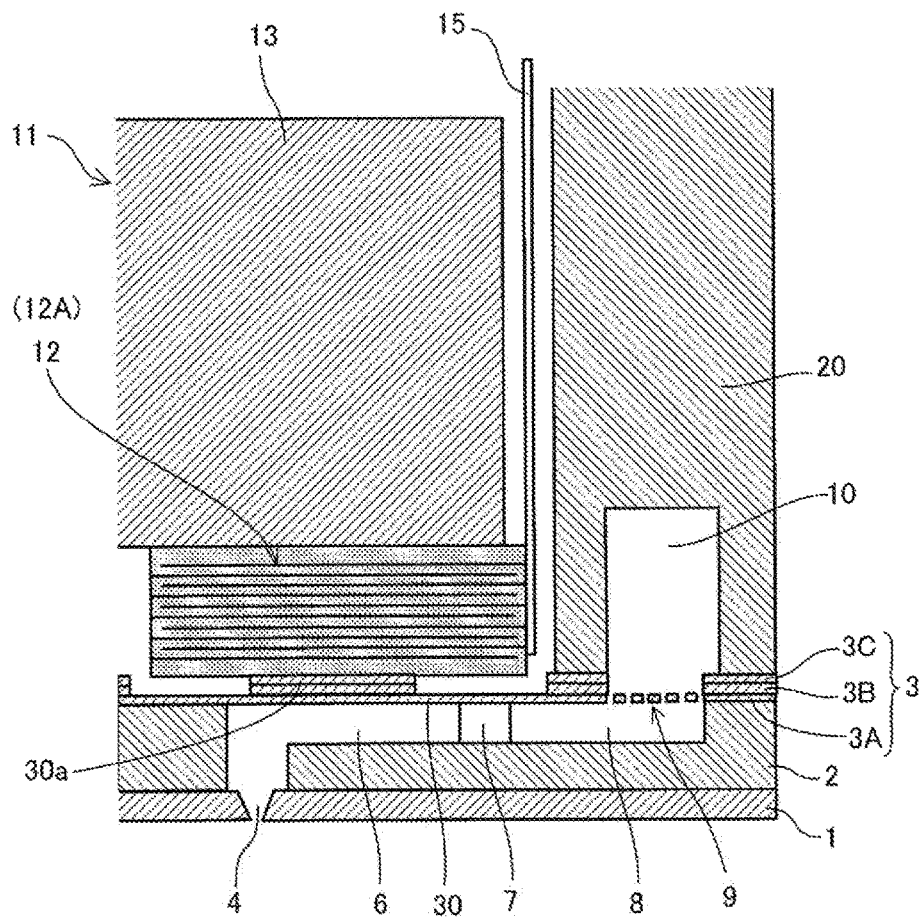

[Fig. 11]
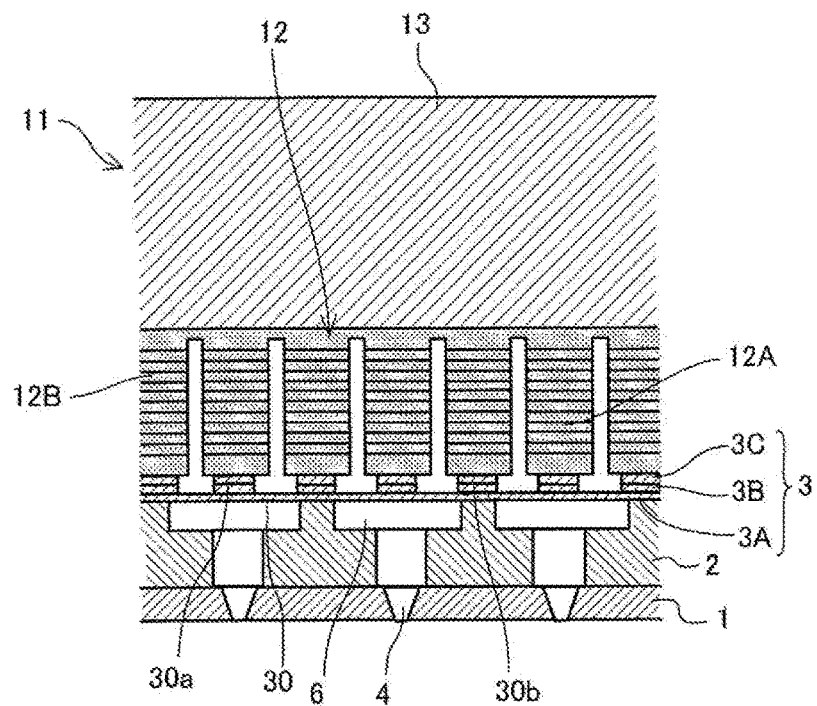
[Fig. 12]
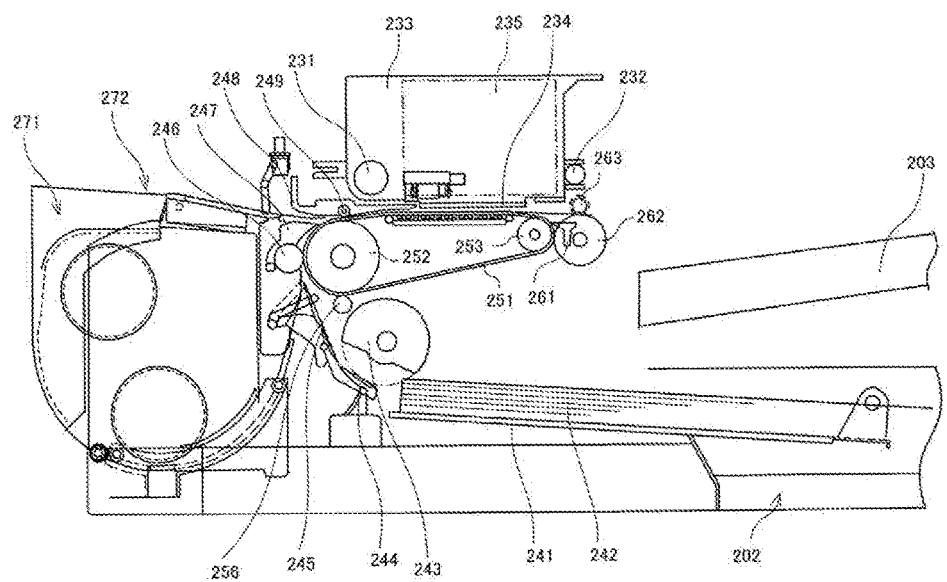

[Fig. 13]
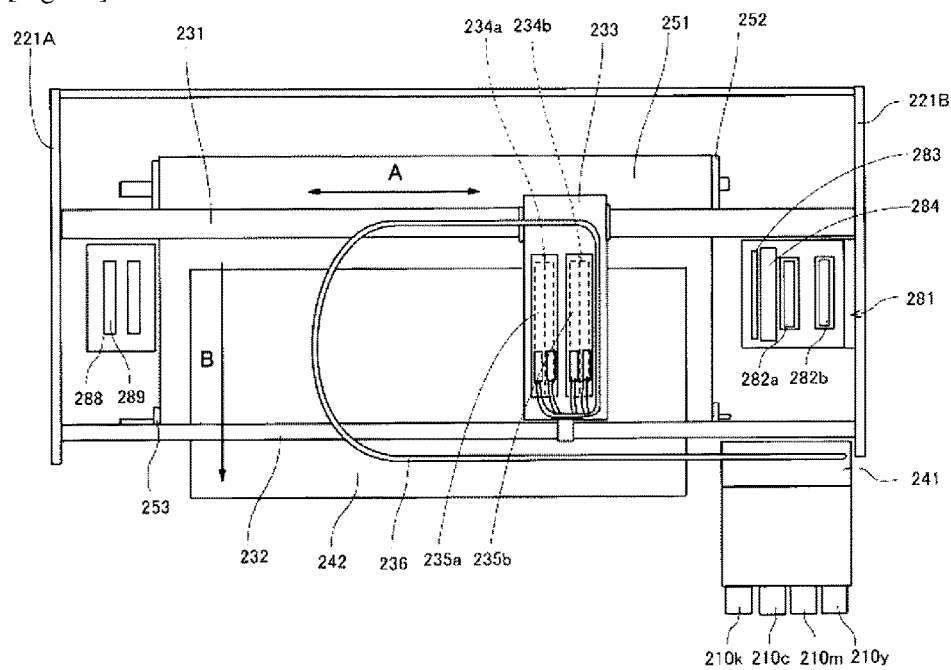
[Fig. 14]
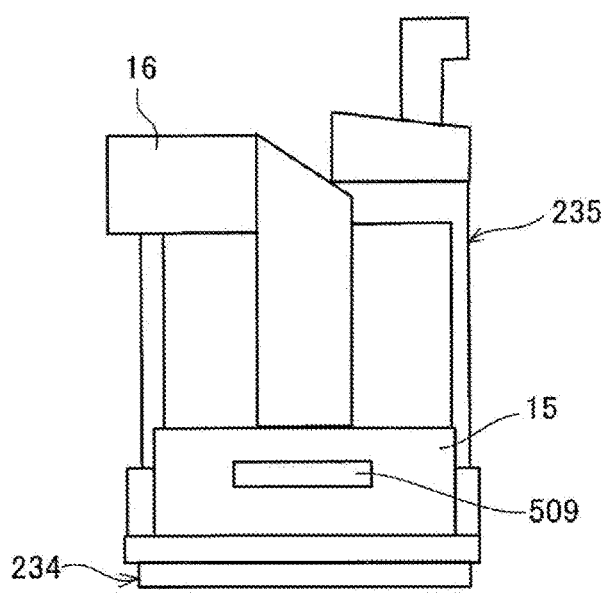

[Fig. 15]
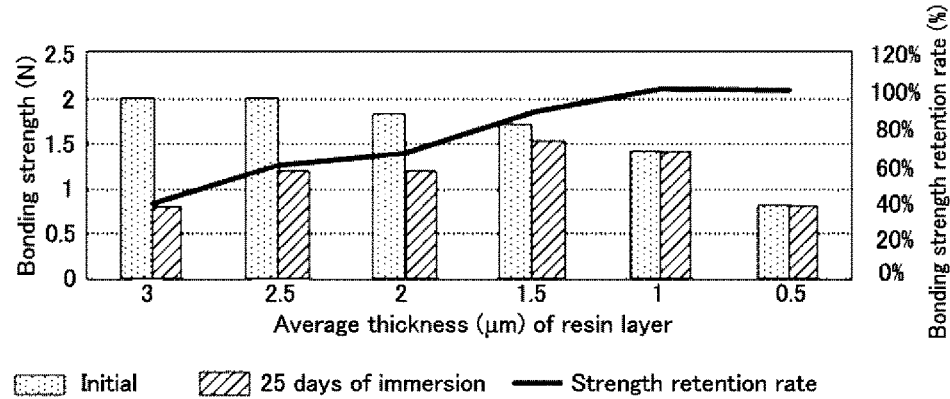
[Fig. 16]
Average thickness of resin layer
= 1.8 μm (n=3)
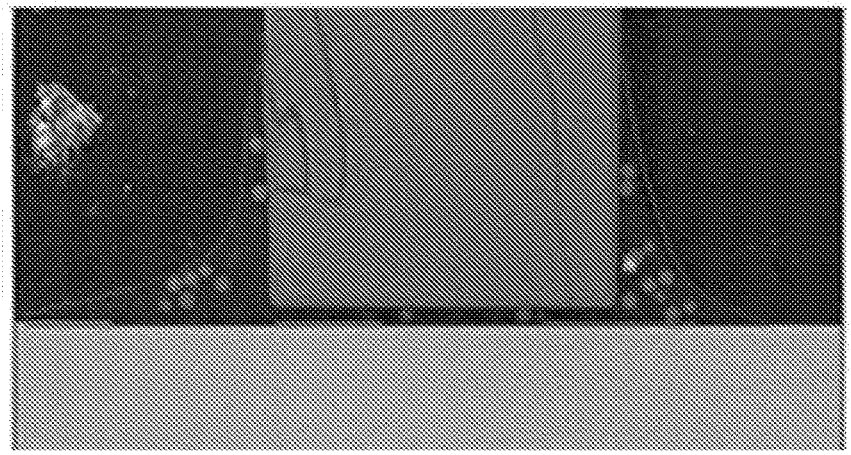
[Fig. 17]
Average thickness of resin layer
= 2.9 μm (n=3)
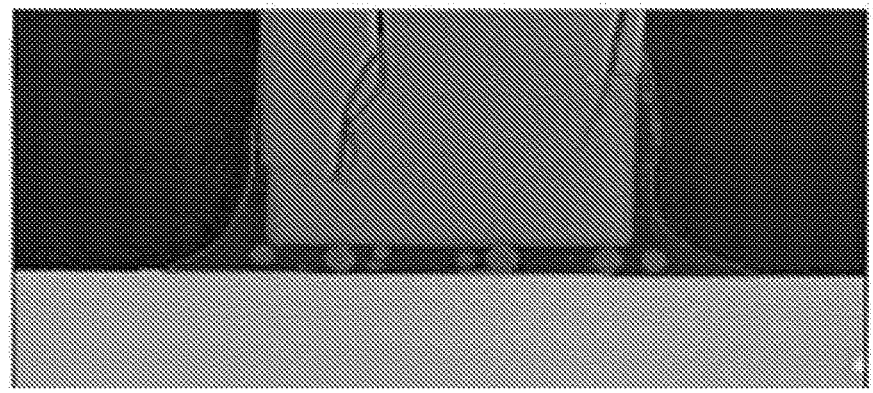

LIQUID JET HEAD AND METHOD FOR PRODUCING SAME, AND LIQUID JET APPARATUS AND IMAGE FORMING APPARATUS

TECHNICAL FIELD

The present invention relates to a liquid jet head and a method for manufacturing the same, and a liquid jet apparatus and an image forming apparatus.

BACKGROUND ART

Conventionally, as image forming apparatuses such as printers, facsimile machines, copiers, and plotters, or multifunction peripherals having these functions, there have been known liquid jet recording type image forming apparatuses including a liquid jet head.

The liquid jet head (hereinafter, may be referred to as "inkjet head") includes nozzles from which ink droplets are jetted, a liquid chamber (may be referred to as "pressurizing chamber", "jet chamber", "pressure chamber", and "pressurizing liquid chamber") leading to the nozzles, and a pressure generating means (may be referred to as "driving means" or "energy generating means") for pressurizing an ink in the liquid chamber. Upon actuation of the pressure generating means, the ink in the liquid chamber is pressurized, and ink droplets are jetted from the nozzles. The inkjet head is formed by bonding a flow path substrate over which a flow path such as the liquid chamber is formed, and a nozzle plate having the nozzles with each other.

The members to constitute the inkjet head are bonded by, for example, adhesive bonding using a wet glue, a film adhesive, or the like, direct bonding or eutectic bonding via a metal material when silicon substrates are used as the liquid chamber substrate and the nozzle plate, or anodic bonding when metal materials are used as them.

In the inkjet head, end portions of the bonded regions are exposed to the ink, and the pressure for ink jetting is applied to the junctions of the members. Because these members are used at a jetting cycle of several kHz and receive high-frequency pressure fluctuations, their bonded portions degenerate easily. Hence, these members must have a greater liquid resistance than required in bonding of ordinary materials.

In bonding two members, it is generally required to bond them with a high reliability by maintaining part accuracy. However, many of the bonded portions of the inkjet head contact the ink, and the contact with the ink degenerates the adhesive resin layers themselves, or the ink permeates the bonding interface to cause debonding, leading to a significant problem in terms of reliability. Therefore, the resin layers are requested to have a resistance to the ink used, and a sufficient bonding strength with maximum rejection of permeation to the bonding interface leading to debonding. However, there have been no adhesives available that are advantageous with all kinds of inks, and it has been extremely difficult to select an adhesive that is low-degenerative with a specific ink.

Meanwhile, in recent years, home-use inkjet printers and industrial inkjet plotters have become widespread. Hence, there have been increasing opportunities of jetting water-based inks or oil-based inks, and adhesives suitable for these inks have been discovered.

However, the latest efforts of development are directed to inks for suppressing curls of paper media when printed, and inks to be printed on non-absorptive film media, which have different properties from conventional water-based inks and oil-based inks. For example, a curl suppression ink as presented in PTL 1 has a composition in which the water content of the ink is reduced while a solvent is increased, which leads to a strong expression of the characteristics of the water-soluble solvent, instead of the characteristics of the water as in conventional water-based inks. Further, an ink to be printed on non-absorptive film media as presented in PTL 2 is an ink containing a solvent having a high dissolving ability such as methyl pyrrolidone in a high amount, and hence more aggressive against organic substances than conventional water-based inks.

A characteristic difference of these inks from conventional water-based inks is that although they are inks containing water, they strongly express characteristics of an organic solvent and have a greater permeability into an organic structure. Hence, there are problems that adhesives that have been used for water-based inks would be permeated by these inks easily, and that these adhesives would also receive permeation of water at their interface, to thereby lose their bonding strength significantly on a material having hydrophilicity on its bonded surface, such as metal and oxide.

Hence, it is requested to provide a liquid jet head that includes a resin layer having a high organic solvent resistance and curable at a low temperature, and that has excellent initial bondability and bonding reliability.

CITATION LIST

Patent Literature

PTL 1: Japanese Patent Application Laid-Open (JP-A) No. 2005-220296

PTL 2: Japanese Patent (JP-B) No. 4277898

SUMMARY OF INVENTION

Technical Problem

An object of the present invention is to provide a liquid jet head that includes a resin layer having a high organic solvent resistance and curable at a low temperature, and that has excellent initial bondability and bonding reliability.

Solution to Problem

A liquid jet head of the present invention as a solution to the problems described above is a liquid jet head, including:

a flow path composed of a first member, a resin layer, and a second member, wherein the resin layer contains a cured product of a resin composition containing: an epoxy compound represented by general formula (1) below; a polythiol compound having 2 or more thiol groups in a molecule thereof; and an imidazole compound represented by general formula (2) below.

[Chem. 1]

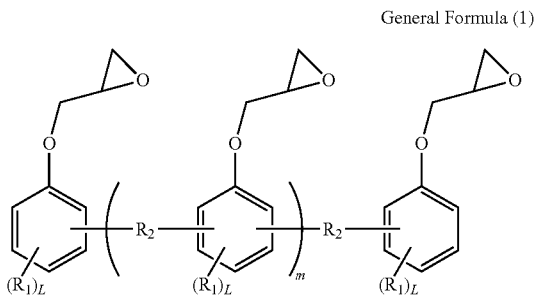

General Formula (1)

In the general formula (1) above, L is an integer of 0 or greater but less than 3, m is a positive number of 0.1 or greater but less than 50, $R_1$ represents any one of a hydrogen atom, and an alkyl group having 1 to 4 carbon atoms, and $R_2$ represents a substituent represented by a formula below.

[Chem.2]

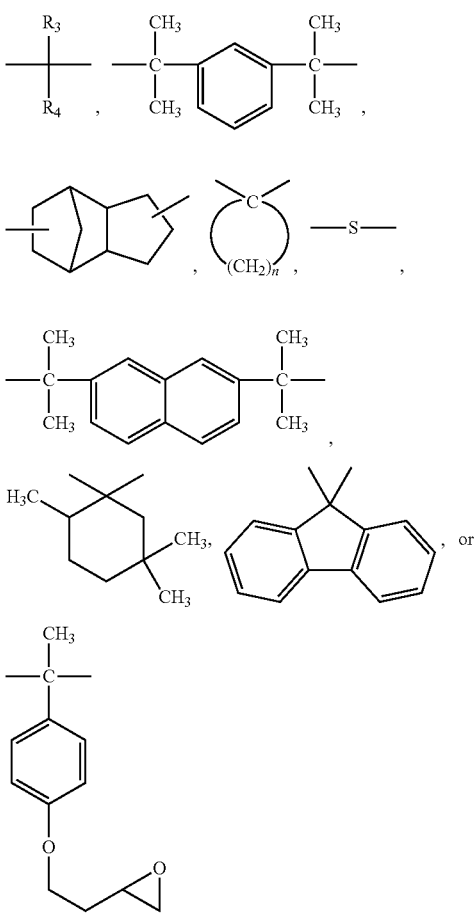

$R_3$ and $R_4$ each independently represent any one of a hydrogen atom, and a non-substituted or fluorine-substituted methyl group, and n is an integer of from 4 to 12.

[Chem.3]

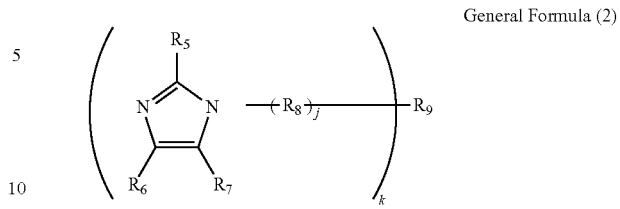

General Formula (2)

In the general formula (2) above, k is 1 or greater but less than 6, j is 0 or 1, $R_5$, $R_6$, and $R_7$ each independently represent any one of a hydrogen atom, an alkyl group having 1 to 20 carbon atoms, and an aryl group, $R_8$ represents any one of an alkylene group having 1 to 20 carbon atoms, an arylene group, and —$CH_2CH_2COO$—, $R_9$ represents a hydrogen atom, an alkyl group having 1 to 20 carbon atoms, an aryl group, or a cyanomethyl group when k is 1, and represents a hydrocarbon group having 1 to 20 carbon atoms when k is 2 to 6.

Advantageous Effects of Invention

The present invention can provide a liquid jet head that includes a resin layer having a high organic solvent resistance and curable at a low temperature, and that has excellent initial bondability and bonding reliability.

BRIEF DESCRIPTION OF DRAWINGS

FIG. 1 is a cross-sectional diagram showing an example of a liquid jet head of the present invention.

FIG. 2 is an expanded cross-sectional diagram showing an example of a portion A of FIG. 1.

FIG. 3 is an expanded cross-sectional diagram showing another example of the portion A of FIG. 1.

FIG. 4 is an explanatory diagram used for explanation of film formation over a member having undulations by ALD method.

FIG. 5-A is an explanatory diagram showing an example of a cross-section observed image of a sample of a flow path pattern-etched Si substrate over which a Ta-introduced $SiO_2$ surface treatment film is formed.

FIG. 5-B is an enlarged diagram of FIG. 5-A.

FIG. 6 is an explanatory diagram used for explanation of film formation over a member having undulations by sputtering.

FIG. 7 is an explanatory diagram showing an example of the result of XPS comparison of impurities contained in a treatment layer formed over a Si substrate by sputtering.

FIG. 8 is an explanatory diagram showing an example of the result of XPS comparison of impurities contained in a treatment layer formed over a Si substrate by ALD method.

FIG. 9 is a schematic diagram showing an example of a liquid jet head of the present invention.

FIG. 10 is a schematic diagram showing another example of a liquid jet head of the present invention.

FIG. 11 is a schematic diagram showing yet another example of a liquid jet head of the present invention.

FIG. 12 is a schematic side elevation of a mechanical section showing an example of an image forming apparatus of the present invention.

FIG. 13 is a schematic plan view of a mechanical section showing an example of an image forming apparatus of the present invention, where an arrow A represents a carriage main scanning direction, and an arrow B represents a belt conveying direction (sub scanning direction).

FIG. 14 is an explanatory front elevation diagram showing an example of a liquid jet head.

FIG. 15 is a graph showing a relationship of a bonding strength and a bonding strength retention rate of a resin layer relative to an average thickness thereof.

FIG. 16 is a cross-sectional image of a bonded region bonded by a gap agent having a particle diameter of 1.5 μm.

FIG. 17 is a cross-sectional image of a bonded region bonded by a gap agent having a particle diameter of 3.0 μm

DESCRIPTION OF EMBODIMENTS

A liquid jet head of the present invention includes a flow path composed of a first member, a resin layer, and a second member, and includes other members according to necessity.

<Resin Layer>

The resin layer contains a cured product of a resin composition containing an epoxy compound represented by the general formula (1) below; a polythiol compound having 2 or more thiol groups in a molecule thereof; and an imidazole compound represented by the general formula (2) below.

[Chem.4]

General Formula (1)

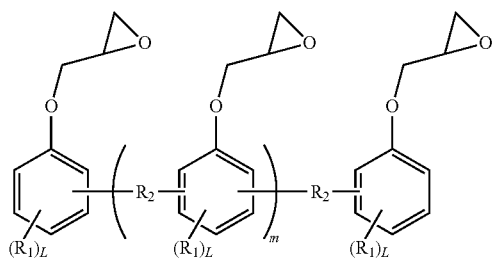

In the general formula (1) above, L is an integer of 0 or greater but less than 3, m is a positive number of 0.1 or greater but less than 50, $R_1$ represents any one of a hydrogen atom, and an alkyl group having 1 to 4 carbon atoms, and $R_2$ represents a substituent represented by a formula below.

[Chem.5]

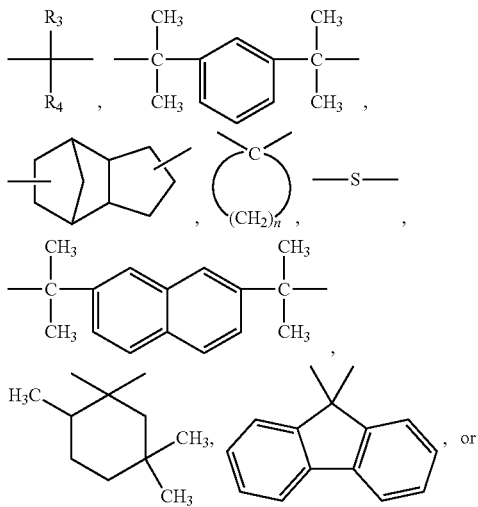

-continued

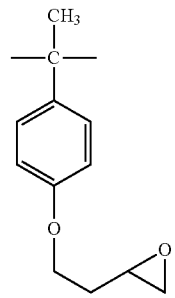

$R_3$ and $R_4$ each independently represent any one of a hydrogen atom, and a non-substituted or fluorine-substituted methyl group, and n is an integer of from 4 to 12.

[Chem.6]

General Formula (2)

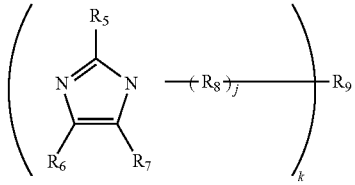

In the general formula (2) above, k is 1 or greater but less than 6, j is 0 or 1, $R_5$, $R_6$, and $R_7$ each independently represent any one of a hydrogen atom, an alkyl group having 1 to 20 carbon atoms, and an aryl group, $R_8$ represents any one of an alkylene group having 1 to 20 carbon atoms, an arylene group, and —$CH_2CH_2COO$—, $R_9$ represents a hydrogen atom, an alkyl group having 1 to 20 carbon atoms, an aryl group, or a cyanomethyl group when k is 1, and represents a hydrocarbon group having 1 to 20 carbon atoms when k is 2 to 6.

—Epoxy Compound—

It is preferable that the epoxy compound represented by the general formula (1) above be an epoxy compound represented by the general formula (3) below, in terms of ink resistance and heat resistance.

[Chem.7]

General Formula (3)

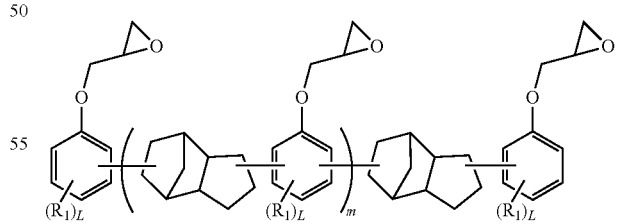

In the general formula (3) above, L is an integer of 0 or greater but less than 3, m is a positive number of 0.1 or greater but less than 50, and $R_1$ represents any one of a hydrogen atom, and an alkyl group having 1 to 4 carbon atoms.

The content of the epoxy compound represented by the general formula (1) above is preferably from 10 parts by mass to 100 parts by mass, and more preferably from 30 parts by mass to 80 parts by mass relative to a total epoxy compound amount of 100 parts by mass. It is preferable if the content of the epoxy compound represented by the general formula (1) above is from 10 parts by mass to 100 parts by mass, because a balance between heat resistance and chemical resistance will be excellent.

It is preferable that the resin composition contain an epoxy compound represented by the general formula (4) below.

[Chem.8]

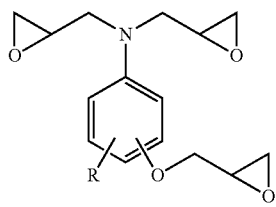

General Formula (4)

In the general formula (4) above, R represents any one of a hydrogen atom, and an alkyl group having 1 to 4 carbon atoms.

The content of the epoxy compound represented by the general formula (4) above is preferably from 10 parts by mass to 80 parts by mass relative to a total epoxy compound amount of 100 parts by mass. It is preferable if the content of the epoxy compound represented by the general formula (4) above is from 10 parts by mass to 80 parts by mass, because ink resistance will be excellent.

It is preferable that the resin composition contain an epoxy compound represented by the general formula (5) below, because a balance between workability and bondability will be excellent.

[Chem.9]

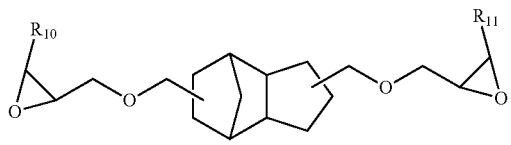

General Formula (5)

In the general formula (5) above, $R_{10}$ and $R_{11}$ each independently represent any one of a hydrogen atom and an alkyl group having 1 to 4 carbon atoms.

The content of the epoxy compound represented by the general formula (5) above is preferably from 5 parts by mass to 30 parts by mass relative to a total epoxy compound amount of 100 parts by mass. It is preferable if the content of the epoxy compound represented by the general formula (5) above is from 5 parts by mass to 30 parts by mass, because a balance between workability and bondability will be excellent.

The resin composition may contain various other epoxy compounds than the above-described epoxy compounds according to the purpose. Examples thereof include: polyglycidyl ether compounds of mononuclear multivalent phenol compounds such as hydroquinone, resorcin, pyrocatechol, and phloroglucinol; polyglycidyl ether compounds of multinuclear multivalent phenol compounds such as dihydroxy naphthalene, biphenol, methylenebisphenol (bisphenol F), methylene bis(orthocresol), ethylidene bisphenol, isopropylidene bisphenol (bisphenol A), isopropylidene bis (orthocresol), tetrabromobisphenol A, 1,3-bis(4-hydroxycumylbenzene), 1,4-bis(4-hydroxycumylbenzene), 1,1,3-tris (4-hydroxyphenyl)butane, 1,1,2,2-tetra(4-hydroxyphenyl) ethane, thiobisphenol, sulfonylbisphenol, oxybisphenol, and terpenephenol; polyglycidyl ethers of multivalent alcohols such as ethylene glycol, propylene glycol, butylene glycol, hexanediol, polyglycol, thiodiglycol, glycerin, trimethylol propane, pentaerythritol, sorbitol, and bisphenol A-ethylene oxide adduct; homopolymers or copolymers of glycidyl esters and glycidyl methacrylates of aliphatic, aromatic or alicyclic polybasic acids such as maleic acid, fumaric acid, itaconic acid, succinic acid, glutaric acid, suberic acid, adipic acid, azelaic acid, sebacic acid, dimer acid, trimer acid, phthalic acid, isophthalic acid, terephthalic acid, trimellitic acid, trimesic acid, pyromellitic acid, tetrahydrophthalic acid, hexahydrophthalic acid, and endomethylene tetrahydrophthalic acid; epoxy compounds having a glycidylamino group such as N,N-diglycidyl aniline, bis(4-(N-methyl-N-glycidylamino)phenyl)methane, and diglycidyl orthotoluidine; epoxidized products of cyclic olefin compounds such as vinylcyclohexene diepoxide, dicyclopentanediene diepoxide, 3,4-epoxycyclohexylmethyl-3,4-epoxycyclohexane carboxylate, 3,4-epoxy-6-methylcyclohexylmethyl-6-methylcyclohexane carboxylate, and bis(3,4-epoxy-6-methylcyclohexylmethyl)adipate; epoxidized conjugated diene polymers such as epoxidized polybutadiene, and epoxidized styrene/butadiene copolymers; and heterocyclic compounds such as triglycidyl isocyanurate; or products of those described above that are internally cross-linked by an isocyanate-terminated prepolymer, or products of those described above that are polymerized with a multivalent active hydrogen compound (e.g., multivalent phenol, polyamine, a carbonyl group-containing compound, and polyphosphate ester). One of these may be used alone, or two or more of these may be used in combination.

The epoxy compound is not particularly limited, and an arbitrary epoxy compound may be selected according to the purpose. However, an epoxy compound having an epoxy equivalent of from 70 to 3,000 is preferable, and an epoxy compound having an epoxy equivalent of 90 to 2,000 is more preferable. In the epoxy equivalent range of from 70 to 3,000, there is an advantage that a sufficient curability is obtained.

When a multifunctional compound having an epoxy group is used as the epoxy compound to constitute the resin layer, it is possible to obtain a cured product having a three-dimensional cross-linked structure. Epoxy compounds can be classified into a glycidyl ether type, a glycidyl ester type, a glycidyl amine type, etc. depending on the bonding site of a glycidyl group, and there are also a wide variety of epoxy compounds available depending on the compound to function as the base material for bonding.

It is necessary to suppress hydrophilicity of the epoxy compound and enhance a three-dimensional cross-linked degree thereof, in order to suppress permeation of an ink into the epoxy compound and prevent it from swelling. For prevention of swelling, a multifunctional epoxy compound such as a glycidyl amine type, and a glycidyl ether compound of a novolac resin are preferable. Note, however, that the epoxy compound may be a mixture of a plurality of kinds, because there is a need to consider wettability and adsorptivity to the members. Further, glycidyl ether of bisphenol A is also preferable in terms of its hydrogen-bonding property to a metal, and it can constitute a resin composition richer in elasticity as the molecular weight thereof is greater. However, it can be used as long as it is mixed adequately, because it may swell with an ink, or hydrogen bonds thereof may be disconnected.

Epoxy compounds are sold by many companies including Mitsubishi Chemical Corporation, Shikoku Chemicals Corporation, ADEKA Corporation, and DIC Corporation, and may be purchased from any of them.

An epoxy adhesive may be solvent-free, or may be diluted with a diluting solvent in order to have an adequate viscosity. As the diluting solvent, a solvent that is free from an active hydrogen reactive with an epoxy group is preferred to a solvent containing such an active hydrogen in terms of a storage property of the adhesive. However, an arbitrary diluting solvent may be selected in terms of wettability to the members, drying speed, viscosity, etc., and an arbitrary diluting solvent may be used safely as long as the epoxy adhesive can form a resin layer even when it is dried from a state of being dispersed in the diluting solvent, and not from a state of being dissolved therein completely.

The solvent may be dried at room temperature, or even by heating as long as heating is in a non-reactive temperature range. Furthermore, the solvent may be dried at reduced pressure, and reduced-pressure drying enables an epoxy resin to be dried non-reactively even when a solvent having a high boiling point is used.

A solvent that can be used may be selected arbitrarily according to the epoxy compound, a curing agent, and other additives, but an impurity-controlled solvent is preferable for the sake of a stable curing reaction.

The epoxy adhesive may contain a filler or any other binder resin, a viscosity modifier, and the like in addition to the epoxy compound, a curing agent, a solvent, and a coupling agent. The filler may be inorganic particles such as silica and alumina, or may be resin particles of a melamine resin and an acrylic resin. As the viscosity modifier, a higher fatty acid amide or the like may be added in order to adjust the adhesive to an adequate viscosity during application of the adhesive. A foam suppresser or a defoaming agent may be added in order to save an applied film from including spotty application unevenness due to bubbles.

It has been typical of such an epoxy structure having a high crosslink density as described above to have an extremely high Young's modulus, and it has been difficult to obtain a sufficient bonding strength with such an epoxy structure when it is applied as a thin resin layer. It is possible to secure a necessary bonding strength by prescribing the thickness of the resin layer to thicker than 0.5 µm. It is possible to control the thickness of the resin layer by using a gap agent, for example, a silica filler having a controlled particle diameter, a filler obtained by polymerizing a resin, and the like. Such a filler can be purchased from Sekisui Chemical Co., Ltd., Ube Chemicals Co., Ltd., ADEKA Corporation, etc.

—Polythiol Compound—

The polythiol compound is not particularly limited, and an arbitrary polythiol compound may be selected according to the purpose as long as it is a compound having 2 or more thiol groups in a molecule thereof. Examples thereof include polythiol compounds that do not require use of a basic substance in the production process thereof, such as thiol compounds obtained from an esterification reaction between a polyol and a mercapto organic acid, examples of which include trimethylolpropanetris(thioglycolate), pentaerythritoltetrakis(thioglycolate), ethyleneglycol dithioglycolate, trimethylolpropanetris(β-thiopropionate), pentaerythritoltetrakis(β-thiopropionate), and dipentaerythritolpoly(β-thiopropionate).

Other examples of the polythiol compound that involve use of a basic substance as a reaction catalyst in the production process thereof include polythiol compounds having an alkali metal ion concentration of 50 ppm or less that are obtained from dealkalization of the followings: alkyl polythiol compounds such as 1,4-butanedithiol, 1,6-hexanedithiol, and 1,10-decanedithiol; terminal thiol group-containing polyether; terminal thio group-containing polythioether; a thiol compound obtained from a reaction between an epoxy compound and hydrogen sulfide; and a thiol compound having a terminal thiol group obtained from a reaction between a polythiol compound and an epoxy compound.

Examples of the method for dealkalizing a polythiol compound produced using a basic substance as a reaction catalyst include a method of dissolving the polythiol compound to be dealkalized in an organic solvent such as acetone and methanol, neutralizing it by adding an acid such as a dilute hydrochloric acid and a dilute sulfuric acid, and then removing a resulting salt by extraction, washing, or the like, or removing a resulting salt by adsorbing it using an ion-exchange resin, a method of separating and refining a polythiol compound by distillation, etc.

Among the polythiol compounds described above, at least one selected from the group consisting of dipentaerythritol hexa(3-mercaptobutyrate), and 1,3,5-tris(3-mercaptopropyl)-1,3,5-triazine-2,4,6(1H,3H,5H)-trione is preferable because a balance between storage stability and curability will be excellent.

A mixing ratio between the epoxy compound and the polythiol compound, as expressed in thiol equivalent weight/epoxy equivalent weight, is preferably from 0.2 to 2.0, and more preferably from 0.5 to 1.5. When the mixing ratio is 0.2 or greater, a sufficient rapid curability can be obtained. When the mixing ratio is 2.0 or less, a cured product property such as a heat resistance can be obtained.

—Imidazole Compound—

A compound represented by the general formula (2) below is used as the imidazole compound.

[Chem.10]

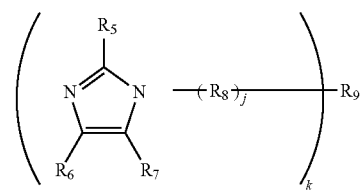

General Formula (2)

In the general formula (2) above, k is 1 or greater but less than 6 and preferably 1 or 2, and j is 0 or 1 and preferably 1.

In the general formula (2) above, $R_5$, $R_6$, and $R_7$ each independently represent any one of a hydrogen atom, an alkyl group having 1 to 20 carbon atoms, and an aryl group.

Examples of the alkyl group having 1 to 20 carbon atoms include methyl group, ethyl group, propyl group, isopropyl group, butyl group, isobutyl group, tert-butyl group, pentyl group, isopentyl group, tert-pentyl group, hexyl group, isohexyl group, octyl group, 2-ethylhexyl group, tert-octyl group, nonyl group, decyl group, undecyl group, dodecyl group, tridecyl group, tetradecyl group, pentadecyl group, hexadecyl group, heptadecyl group, and octadecyl group. Examples of the aryl group include phenyl group, and naphthyl group. A halogen, a hydroxy group, or the like may be substituted in these groups.

It is preferable that $R_5$, $R_6$, and $R_7$ be any one of a hydrogen atom, methyl group, ethyl group, and phenyl group.

In the general formula (2) above, $R_8$ represents any one of an alkylene group having 1 to 20 carbon atoms, —$CH_2CH_2COO$—, and an arylene group.

Examples of the alkylene group having 1 to 20 carbon atoms include methylene group, ethylene group, propane-1,2-diyl group, propane-1,3-diyl group, butane-1,4-diyl group, pentane-1,5-diyl group, hexane-1,6-diyl group, octane-1,8-diyl group, 2-methyl-hexane-1,6-diyl group, and decane-1,10-diyl group. Examples of the arylene group include phenylene group, and naphthylene group. A halogen, a hydroxy group, or the like may be substituted in these groups.

It is preferable that $R_8$ be —$CH_2CH_2COO$— and methylene group.

In the general formula (2) above, $R_9$ represents any one of a hydrogen atom, an alkyl group having 1 to 20 carbon atoms, an aryl group, and a cyanomethyl group when k is 1, and represents a hydrocarbon group having 1 to 20 carbon atoms when k is 2 to 6.

Examples of the hydrocarbon group having 1 to 20 carbon atoms include alkyl group having 1 to 20 carbon atoms, and aryl group.

Examples of the alkyl group having 1 to 20 carbon atoms and the aryl group include the same as those listed for $R_5$, $R_6$, and $R_7$.

Examples of the imidazole compound represented by the general formula (2) above include those represented by the structural formulae below.

[Chem. 11]

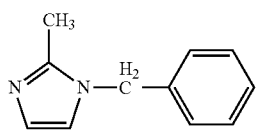

IM-1

[Chem. 12]

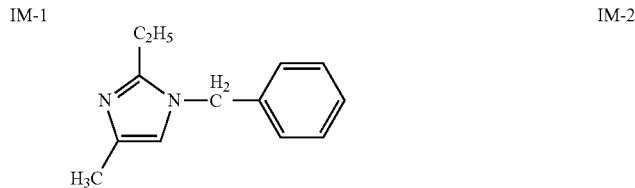

IM-2

[Chem. 13]

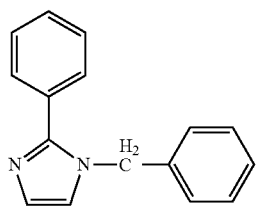

IM-3

[Chem. 14]

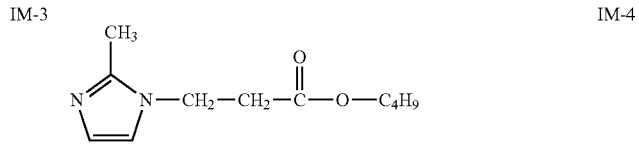

IM-4

[Chem. 15]

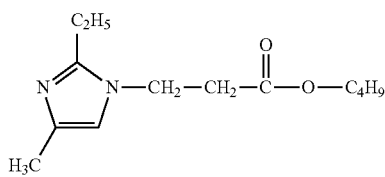

IM-5

[Chem. 16]

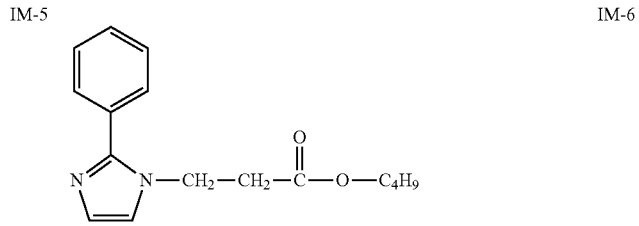

IM-6

[Chem. 17]

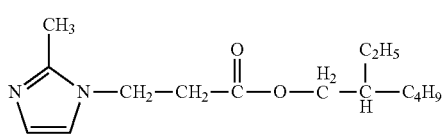

IM-7

[Chem. 18]

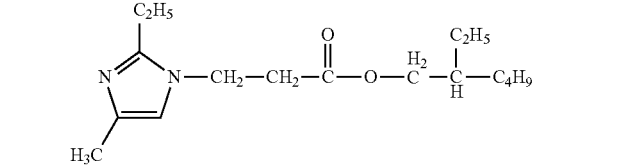

IM-8

[Chem. 19]

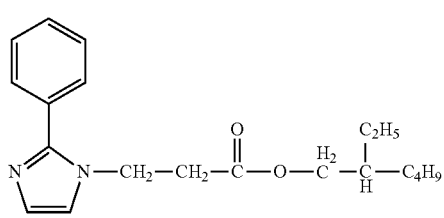

IM-9

[Chem. 20]

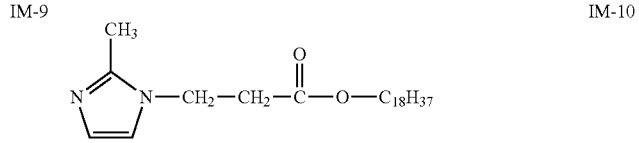

IM-10

-continued
[Chem. 21]
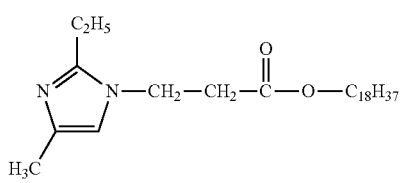
IM-11
[Chem. 22]
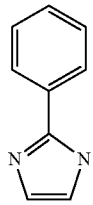
IM-12
[Chem. 23]
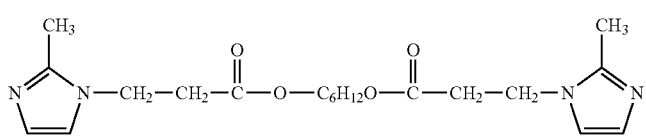
IM-13
[Chem. 24]
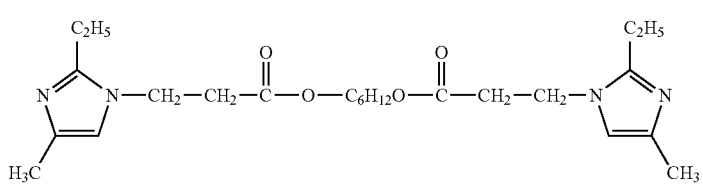
IM-14
[Chem. 25]
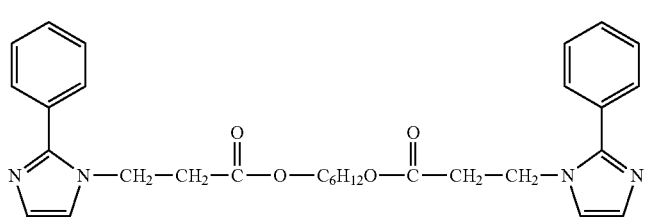
IM-15
[Chem. 26]
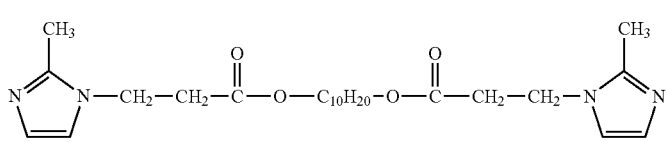
IM-16
[Chem. 27]
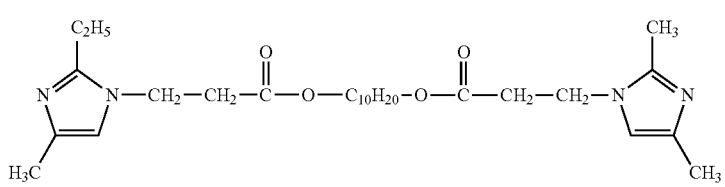
IM-17
[Chem. 28]
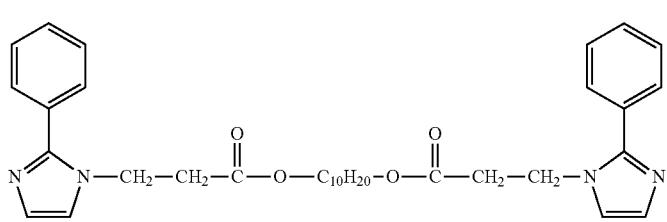
IM-18

-continued

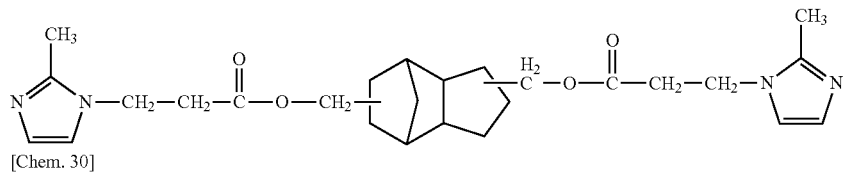

IM-19

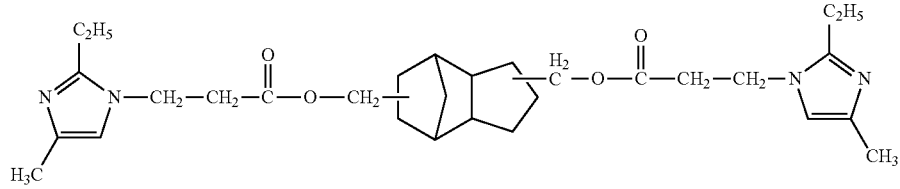

IM-20

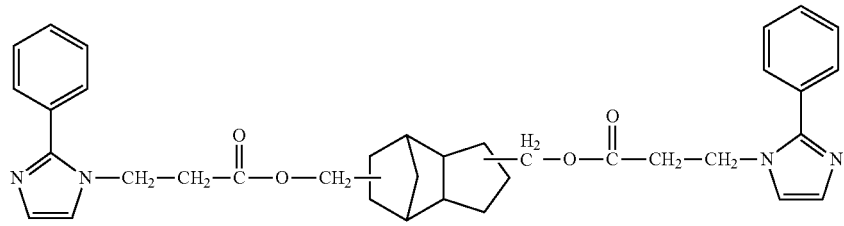

IM-21

[Chem. 32]

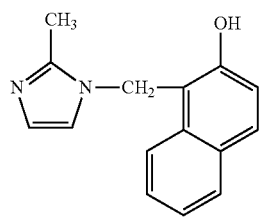

IM-22

[Chem. 33]

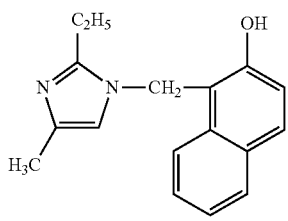

IM-23

[Chem. 34]

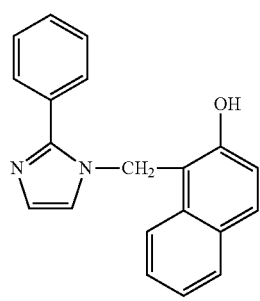

IM-24

The content of the imidazole compound is not particularly limited, and may be appropriately selected according to the purpose. However, it is preferably from 1 part by mass to 5 parts by mass relative to 100 parts by mass of the epoxy compound.

It is preferable that the resin composition contain a silane coupling agent represented by the general formula (6) below, in terms of improving a bonding strength.

[Chem. 35]

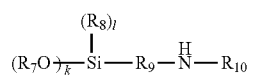

General Formula (6)

In the general formula (6) above, $R_7$ and $R_8$ represent an alkyl group having 1 to 4 carbon atoms.

Examples of the alkyl group having 1 to 4 carbon atoms include methyl group, ethyl group, propyl group, isopropyl group, and butyl group.

In the general formula (6) above, $R_9$ represents any one of an alkylene group having 1 to 20 carbon atoms, and an arylene group.

Examples of the alkylene group having 1 to 20 carbon atoms include methylene group, ethylene group, propane-1,2-diyl group, propane-1,3-diyl group, butane-1,4-diyl group, pentane-1,5-diyl group, hexane-1,6-diyl group, octane-1,8-diyl group, 2-methyl-hexane-1,6-diyl group, and decane-1,10-diyl group. Examples of the arylene group phenylene group and naphthylene group. A halogen, a hydroxy group, or the like may be substituted in these groups.

In the general formula (6) above, $R_{10}$ represents any one of a hydrogen atom, an alkyl group having 1 to 20 carbon atoms, and an aryl group.

Examples of the alkyl group having 1 to 20 carbon atoms include methyl group, ethyl group, propyl group, isopropyl group, butyl group, isobutyl group, tert-butyl group, pentyl group, isopentyl group, tert-pentyl group, hexyl group, isohexyl group, octyl group, 2-ethylhexyl group, tert-octyl group, nonyl group, decyl group, undecyl group, dodecyl group, tridecyl group, tetradecyl group, pentadecyl group, hexadecyl group, heptadecyl group, and octadecyl group. Examples of the aryl group include phenyl group, and naphthyl group. An aryl group, a heterocycle, amine, amide, imine, a halogen, a hydroxy group, or the like may be substituted in these groups.

Examples of the silane coupling agent represented by the general formula (6) above include 3-aminopropyltrimethoxysilane, 3-aminopropyltriethoxysilane, N-(2-aminoethyl)aminopropyltrimethoxysilane, N-(2-aminoethyl)aminopropylmethyldimethoxysilane, and 3-phenylaminopropyltrimethoxysilane.

The resin composition may contain any other silane coupling agent than the silane coupling agent represented by the general formula (6) above, a titanate-based coupling agent, and an aluminate-based coupling agent.

Examples of the any other silane coupling agent include 2-(3,4-epoxycyclohexyl)ethyltrimethoxysilane, 3-glycidoxypropyltrimethoxysilane, 3-glycidoxypropylmethyldiethoxysilane, 3-glycidoxypropyltriethoxysilane, N-2(-aminoethyl)-3-aminopropylmethyldimethoxysilane, N-2(-aminoethyl)-3-aminopropylmethyldiethoxysilane, N-2(-aminoethyl)-3-aminopropyltrimethoxysilane, N-2(-aminoethyl)-3-aminopropyltriethoxysilane, 3-aminopropyltrimethoxysilane, 3-aminopropyltriethoxysilane, (1,3-dimethyl-butylidene)-propylamine, N-phenyl-3-aminopropyltrimethoxysilane, N,N-bis(3-(trimethoxysilyl)propyl)ethylenediamine, N-(1,3-dimethylbutylidene)-3-(triethoxysilyl)-1-propaneamine, 3-phenylaminopropyltrimethoxysilane, aminoethyl-3-aminopropyltrimethoxysilane hydrochloride salt, N-(2-(vinylbenzineamino)ethyl)-3-aminopropyltrimethoxysilane hydrochloride salt, 1,2-ethanediamine, N-{3-(trimethoxysilyl)propyl}-N-{(ethenylphenyl) methyl} and a derivative thereof and a hydrochloride salt thereof, 3-chloropropyltrimethoxysilane, 3-mercaptopropylmethyldimethoxysilane, 3-mercaptopropyltrimethoxysilane, 3-mercaptopropyltriethoxysilane, bis(triethoxysilylpropyl)tetrasulfide, and 3-isocyanatepropyltriethoxysilane.

It is preferable that the silane coupling group have, as an organic group thereof, a functional group reactive with an epoxy resin, and the coupling agents listed above are examples of such silane coupling group. These coupling agents can be purchased from Shin-Etsu Chemical Co., Ltd., Dow Corning Toray Co., Ltd., Chisso Corporation, etc.

Examples of the titanate-based and aluminate-based coupling agents include tetra-i-propoxy titanium, tetra-n-butoxy titanium, tetrakis(2-ethylhexyloxy)titanium, titanium-i-propoxyoctylene glycolate, di-i-propoxy/bis(acetylacetonato)titanium, poly(di-i-propoxy/oxytitanium), poly(di-n-butoxy/oxytitanium), di-n-butoxy/bis(triethanolaminato) titanium, diisopropoxy/bis(triethanolaminate)titanium, isopropyltri(N-amideethyl/aminoethyl)titanate, and acetoalkoxyaluminium diisopropylate.

The titanate-based and aluminate-based coupling agents improve bonding strength of an adhesive by improving wettability thereof by forming a polymeric organic coating film over an inorganic surface. Those listed above are examples, and the titanate-based coupling agent is not limited to these. These can be purchased from Mitsubishi Gas Chemical Company, Inc., Nippon Soda Co., Ltd., and Ajinomoto Fine-Techno Co., Inc.

As the coupling agent, a coupling agent having an epoxy group or an amine group is preferable, and a coupling agent having an epoxy group is preferable in order for the epoxy adhesive to exhibit its effectiveness with a coupling agent added, because a coupling agent having an epoxy group will maintain the epoxy adhesive non-reactive at normal temperature, which is preferable in terms of an effective life of the adhesive.

—Other Components—

Examples of other components include: a curing catalyst; a reactive or non-reactive diluent (plasticizer) such as ethers, dioctyl phthalate, dibutyl phthalate, benzyl alcohol, and coal tar; a filler or a pigment such as glass fiber, carbon fiber, cellulose, silica sand, cement, kaolin, clay, aluminium hydroxide, bentonite, talc, silica, fine powder silica, titanium dioxide, carbon black, graphite, iron oxide, and bituminous substance; a lubricant such as candelilla wax, carnauba wax, Japan tallow, insect wax, beeswax, lanolin, cetaceum, montan wax, petroleum wax, fatty acid wax, fatty acid ester, fatty acid ether, aromatic ester, and aromatic ether; a silane coupling agent; a thickener; a thixotropic agent; an antioxidant; a light stabilizer; an ultraviolet absorbing agent; a flame retardant; a defoaming agent; an anti-rust agent; and common additives such as colloidal silica, and colloidal alumina. Furthermore, viscous resins such as a xylene resin, and a petroleum resin may also be used in combination.

The resin composition can be produced by mixing the epoxy compound, the polythiol compound, the imidazole compound, and the silane coupling agent, and any of the other components according to necessity according to a common procedure.

When the resin composition is heated, a cured product is obtained. A curing temperature is preferably from 60° C. to 100° C. A curing time is preferably from 10 minutes to 4 hours.

It is possible to analyze whether the resin layer includes a structural unit represented by the general formula (1a) below, a structural unit represented by the structural formula 1 below, and an imidazole compound represented by the general formula (2) below, by using pyrolytic GC/MS method and GC/TOFMS to grasp a main skeleton, and also using FTIR method and NMR method to add more information about structure and functional groups.

Conditions for analyzing the resin layer by pyrolytic GC/MS method are given below. In this method, a trace sample is pyrolyzed instantaneously by being exposed to a high temperature directly, and a gas component produced at the time is introduced to a GC/MS device and analyzed. The analysis conditions given below are examples, and non-limiting. The analysis conditions may be changed anytime according to the composition or state of the material being analyzed, so that it is possible to perform the analysis by exploring the optimum conditions.

—Device Configuration/Measurement Conditions—

GC/MS device: QP-5000 manufactured by Shimadzu Corporation

Pyrolysis device: PY-2020D manufactured by Frontier Laboratories, Ltd.

Evaluation Conditions

Heating temperature: 300° C.

Column: UA5 L=30 m, I.D=0.25 mm, Film=0.25 μm

Column temperature raising: from 50° C. to 350° C. (raised at 20° C./min)

Ionization method: EI method (70 eV)

Split: 1:100

A major analytical approach of the GC/MS measurement is structural estimation based on library searching. Therefore, it is difficult to analyze a substance that is not yet registered in the database to be searched. Hence, GC-TOFMS measurement by which accurate mass information of a molecule or a fragment can be obtained may be performed in order to perform structural analysis of any component of which structure cannot be estimated by GC-MS.

Furthermore, accurate mass measurement by chemical ionization method (CI method) by which a molecular ion can be observed easily may be performed in combination.

—Device Configuration/Measurement Conditions—

GC/TOFMS: WATERS GCT PREMIER

Column: DBS-MS (30 m'0.25 mm, 0.25 μm)

Temperature raising conditions: from 50° C. (for 1 min) to 320° C. (for 10 min) at 10° C./min Carrier gas: He, 1.0 mL/min (constant flow rate)

Injection method: split 50:1

Injection port: 280° C.

"CI Ionization Conditions"

Ionization method: PCI method (methane, isobutene, no gas)

Electron energy: 40 eV

Ionizing current: 200 μA

By summing up these pieces of information together with functional group information and element ratios obtained by FT-IR analysis and Raman spectroscopic analysis using ATR method used for common chemical analyses, and by $^{13}C$, $^{1}H$, $^{14}N$, $^{33}S$-NMR analysis, it is possible to analyze that the resin layer includes the structural unit represented by the general formula (1a) below, the structural unit represented by the structural formula 1, and the imidazole compound represented by the general formula (2) below. From the fact, the resin layer can be proved to include a cured product of the resin composition that contains: the epoxy compound represented by the general formula (1) above; the polythiol compound having 2 or more thiol groups in a molecule thereof; and the imidazole compound represented by the general formula (2) above.

[Chem.36]

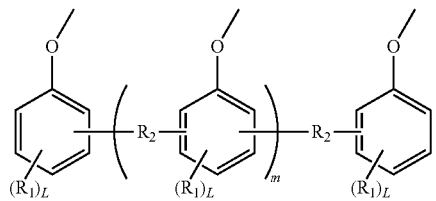

General Formula (1a)

In the general formula (1a) above, L is an integer of 0 or greater but less than 3, m is a positive number of 0.1 or greater but less than 50, $R_1$ represents any one of a hydrogen atom, and an alkyl group having 1 to 4 carbon atoms, and $R_2$ represents a substituent represented by a formula below.

[Chem.37]

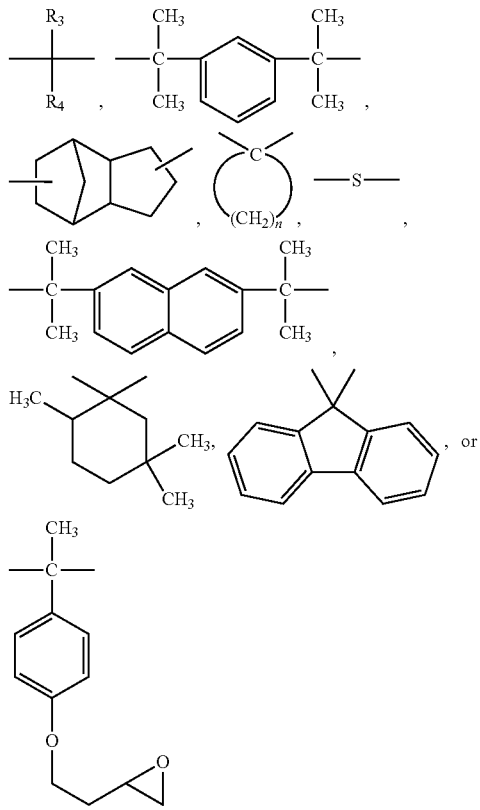

$R_3$ and $R_4$ each independently represent any one of a hydrogen atom, and a non-substituted or fluorine-substituted methyl group, and n is an integer of from 4 to 12.

[Chem.38]

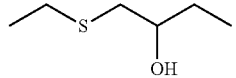

Structural Formula 1

[Chem.3]

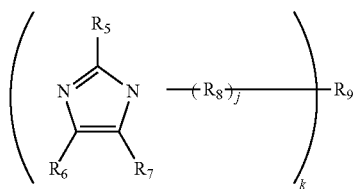

General Formula (2)

In the general formula (2) above, k is 1 or greater but less than 6, j is 0 or 1, $R_5$, $R_6$, and $R_7$ each independently represent any one of a hydrogen atom, an alkyl group having 1 to 20 carbon atoms, and an aryl group, $R_8$ represents any one of an alkylene group having 1 to 20 carbon atoms, an arylene group, and —$CH_2CH_2COO$—, $R_9$ represents a hydrogen atom, an alkyl group having 1 to 20 carbon atoms, an aryl group, or a cyanomethyl group when k is 1, and represents a hydrocarbon group having 1 to 20 carbon atoms when k is 2 to 6.

The resin composition is not particularly limited, and may be used for various purposes such as paints or adhesives to be applied on concrete, cement mortar, various metals, leather, glass, rubber, plastic, wood, cloth, and paper; adhesives of an adhesive tape for packaging, an adhesive label, a label for frozen foods, a remover label, a POS label, an adhesive wallpaper, and an adhesive floor material; processed paper such as art paper, lightweight coated paper, cast-coated paper, coated paperboard, carbonless copy paper, and impregnated paper; a textile treating agent such as a bundling agent, a fray prevention agent, and a processing agent for natural fiber, synthetic fiber, glass fiber, carbon fiber, metal fiber, etc.; a building material such as a sealant, a cement admixture, and a waterproof material; and a sealant for electronic and electric appliances.

To enhance the bonding strength, it is effective to make an anchor agent active on the interface to the resin layer, to fix the resin layer, the first member, and the second member firmly by ionic bonding or covalent bonding. When the first member and the second member are metals, an oil-based ink would not affect hydrogen-bonded firm fixation between them, whereas a water-based ink would disconnect the hydrogen bonds by its water content that permeates the bonding interface, and significantly reduce the bonding strength. Also for this reason, it is preferable to introduce covalent bonding between the resin layer, and the first and second members.

To bond a metal and the resin composition by covalent bonding, it is effective to use a silane coupling agent, a titanate-based coupling agent, and an aluminate-based coupling agent. For firm bonding, the surfaces of the metallic members to be bonded may be treated with a coupling agent directly, or the surfaces may be subjected to surface treatment for enhancing the bonding ability of the coupling agent beforehand and then treated with the coupling agent.

Surface treatment before the coupling treatment with a silane coupling agent is very effective if performed with a silicon-containing oxide such as $SiO_2$, SiOC, SiTaOx, and SiZrOx, and is performed effectively by a method by which a thin film is formed easily, such as vapor deposition, sputtering, chemical vapor deposition, and atomic layer deposition. Surface treatment with $TiO_2$ or TiN is effective not only for a titanate-based coupling agent but also for a silane coupling agent. If such pre-treatment is performed to a large thickness, the strength of the treatment layer influences the bonding strength. Therefore, it is preferable that the treatment layer be as thin as possible.

<First Member>

It is preferable that the first member be a nozzle plate in which jet ports for jetting a liquid are formed.

The nozzle plate includes a nozzle substrate, and a water repellent film over the nozzle substrate.

The shape, size, material, structure, etc. of the nozzle substrate are not particularly limited, and may be appropriately selected according to the purpose.

The material of the nozzle substrate is not particularly limited, and an arbitrary material may be selected according to the purpose. Examples thereof include stainless steel, Al, Bi, Cr, InSn, ITO, Nb, $Nb_2O_5$, NiCr, Si, $SiO_2$, Sn, $Ta_2O_5$, Ti, W, ZAO (ZnO+$Al_2O_3$), and Zn. One of these may be used alone, or two or more of these may be used in combination. Among these, stainless steel is preferable in terms of an anti-rust property.

The number, arrangement, and interval of the jet ports, and the shape, size, and cross-sectional shape of the openings of the jet ports, etc. are not particularly limited, and may be appropriately selected according to the purpose.

<Second Member>

It is preferable that the second member be a flow path plate including individual liquid chambers leading to the jet ports.

The individual liquid chambers are formed by bonding the first member and the second member with each other via the resin layer. That is, it is preferable that the resin layer be present between the first member and the second member. The average thickness of the resin layer is preferably from 1.0 µm to 2.5 µm. When the average thickness of the resin layer is 2.5 µm or less, bonding reliability can be secured. When the average thickness of the resin layer is 1.0 µm or greater, a high initial strength can be obtained, and bonding reliability and initial bondability can both be secured hence. The average thickness of the resin layer is observed by embedding the bonded members in an epoxy resin, and machining them with a polishing machine so that a desired cross-section can be observed. For the observation, measurement with an electron microscope (SEM: Scanning Electron Microscope) is possible.

It is preferable that a surface to contact the resin layer, of at least one of the first member and the second member, have a treatment layer thereon, that the treatment layer be made of a Si-containing oxide, and that the oxide contain a transition metal to form a passive layer over one of the first member and the second member.

It is preferable that the treatment layer contain at least one kind of a transition metal selected from the group consisting of transition metals of Group IV and Group V.

It is preferable that the treatment layer contain at least one selected from the group consisting of Hf, Ta, and Zr.

When at least one or more of Hf, Ta, and Zr is/are introduced into a $SiO_2$ film, the transition metal species bind with O very strongly and form a passive layer. Here, with the passive layer function introduced, the treatment layer 112 not only can be improved in the filling density, but also can suppress a corrosion reaction strongly when it contacts a liquid which may either be acidic or alkaline. Hence, an oxide having resistance to both of an acidic liquid and an alkaline liquid can be formed.

<Other Members>

Examples of the other members include an impact generation member.

The impact generation member is a member configured to generate an impact to be applied to a liquid (ink).

The impact of the impact generation member is not particularly limited, and an arbitrary impact may be selected according to the purpose. Examples thereof include heat (temperature), pressure, vibration, and light. One of these may be used alone, or two or more of these may be used in combination. Among these, heat and pressure are preferable.

Examples of the impact generation member include a heating device, a pressurizing device, a piezoelectric element, a vibration generation device, an ultrasonic oscillator, and a light. Specific examples of the impact generation member include a piezoelectric actuator such as a piezoelectric element, a thermal actuator using an electrothermal conversion element such as a heat resistor to utilize a phase change due to film boiling of a liquid, a shape-memory-alloy actuator utilizing a phase change of a metal due to a temperature change, and a static actuator utilizing an electrostatic force.

When the impact is "heat", there is a method of delivering a thermal energy corresponding to a recording signal to a liquid (ink) in the liquid jet head by, for example, a thermal head, generating bubbles in the ink by the thermal energy, and jetting the ink from nozzle holes 1 of the nozzle plate 2 in the form of liquid droplets by the pressure of the bubbles.

When the impact is "pressure", there is a method of applying a voltage to the piezoelectric element bonded at a position called a pressure chamber present in an ink flow path in the liquid jet head, to make the piezoelectric element bend and the cubic capacity of the pressure chamber to contract, to thereby jet the liquid (ink) from the nozzle holes 1 of the liquid jet head in the form of liquid droplets.

Of these, the piezo method of making the liquid (ink) fly by applying a voltage to the piezo element is preferable.

Here, FIG. 1 is a cross-sectional explanatory diagram used for explaining the liquid jet head of the present invention. FIG. 2 is an expanded cross-sectional explanatory diagram showing an example of a portion A of FIG. 1. FIG. 3 is an expanded cross-sectional explanatory diagram showing another example of the portion A of FIG. 1.

The liquid jet head 100 is formed by stacking a nozzle plate 102 in which nozzles 101 for jetting liquid droplets are formed, a flow path plate 104 forming a flow path (pressure chamber) 103 to which the nozzles 101 lead, and a vibration plate 105 forming a wall surface of the pressure chamber 103. Here, the nozzle plate 102, the flow path plate 104, and the vibration plate 105 are flow path forming members that are bonded by the resin layer 113 and form a flow path.

A piezoelectric actuator formed of an electromechanical conversion element 140 is provided on a surface of the vibration plate 105 opposite to a surface thereof at a side of the pressure chamber 103.

The electromechanical conversion element 140 is formed by stacking an oxide electrode 141 as a close adhesion layer, a first electrode (lower electrode) 142, an electromechanical conversion film 144, and a second electrode (upper electrode) 145 sequentially over the vibration plate 105.

The first electrode 142 and the second electrode 145 are made of a material having a high conductivity, such as Pt and Au. The electromechanical conversion film 144 is made of PZT. The flow path plate 104 is made of silicon, and the nozzle plate 102 is made of SUS, nickel, polyimide, or the like.

Next, details of the bonded portions of the liquid jet head will be described with reference to FIG. 2 and FIG. 3. FIG. 2 and FIG. 3 are expanded cross-sectional explanatory diagrams of the portion A of FIG. 1, showing different examples, respectively.

The nozzle plate 102 and the flow path plate 104 are bonded by the resin layer 113.

Here, the treatment layer 112 is formed over the surfaces of the nozzle plate 102 and flow path plate 104, including surfaces thereof to be bonded by the resin layer 113. FIG. 2 shows an example in which no treatment layer 112 is formed over an exposed surface of the resin layer 113, and FIG. 3 shows an example in which the treatment layer 112 is formed over the exposed surface of the resin layer 113. The configuration of FIG. 3 is obtained by, for example, forming the treatment layer 112 utilizing a surface reaction according to ALD (Atomic Layer Deposition) method or the like, after the nozzle plate 102 is bonded.

The treatment layer 112 is a Si-containing oxide, and the oxide contains a transition metal to form a passive layer.

Here, the treatment layer 112 is a Si-based complex oxide that has a high ink resistance reliability and improves bondability between: the transition metal species to form the passive layer; and the resin layer 113.

The resin layer 113 is a thin film made of an organic substance, and hence permeable by water. Therefore, when the treatment layer 112 has no ink resistance reliability, an ink may corrode the treatment layer 112 through the resin layer 113, to thereby detach the treatment layer together with the resin layer 113.

However, the transition metal species can form a stable oxide, and hence can have resistance to an ink by keeping a stable state in an aqueous solution.

Further, the Si-containing oxide can be used successfully with an anionic curing agent and a silane coupling agent contained in the resin layer 113, and improves the adhesiveness between the treatment layer 112 and the resin layer 113.

With this configuration in which a treatment layer is formed over the surfaces of the flow path forming members, the treatment layer is a Si-containing oxide, and the oxide contains a transition metal to form a passive layer over one of the first member and the second member, it is possible to achieve improvement in both of adhesiveness at the interface between the treatment layer 112 and the resin layer 113, and ink resistance reliability.

That is, $SiO_2$ can secure a high close adhesiveness with the members, and can also secure a highly waterproof adhesiveness with the resin layer owing to an amine-based curing agent or a silane coupling agent. Furthermore, the passive layer forms a stable corrosion-resistant film over the surface of the treatment layer 112, which makes the treatment layer stable for a long term even in contact with a liquid.

A transition metal can have a plurality of oxidation numbers, by having a vacant inner orbital on the d orbital, the f orbital, or the like. Hence, by containing the transition metal species, the treatment layer 112 is enhanced in oxidation number adjustability throughout the film, to have a greater tolerance for excess or shortage of oxygen atoms, leading to expression of a high stability against loss or excess in the number of oxygen atoms in the film.

Without transition metals, the treatment layer 112 may become defective due to excess or shortage of oxygen atoms, and the defective portions have a high energy, which makes it likely for the treatment layer to dissolve. As compared with this, with transition metals, it is possible to suppress deficiency of the treatment layer, increase the stability of the oxide, and suppress the liquid solubility.

Among such transition metals, a passive layer forming metal such as a valve metal can suppress solubility of the treatment layer 112 better.

As the metals to form the passive layer, tantalum, niobium, titanium, hafnium, zirconium, and tungsten, which are transition metals having a high oxidation number adjustability, are preferable.

Tantalum, niobium, hafnium, and zirconium form a very stable oxide regardless of whether pH of a liquid to contact them is acidic or alkaline. Therefore, there is an advantage that they can keep a stable state regardless of whether they are under acidic or alkaline conditions.

In other words, it is preferable that the treatment layer 112 contain transition metals of Group IV and Group V that form a passive layer. Transition metals of Group IV and Group V that form a passive layer have similar electron orbitals to Si, which is among Group IV. When these metals are incorporated into a $SiO_2$ film, the metal species can bind with Si strongly via O, and can improve the filling density of the film, which can be a dense film.

In addition to the improvement in the filling density, the treatment layer can suppress a corrosion reaction upon contact with a liquid, by containing firm bonds formed of Si—O bonds. Hence, an oxide having liquid resistance can be formed, which makes it possible to improve the reliability of the head by ensuring it a sufficient resistance.

In this case, it is preferable that at least one kind selected from the group consisting of Hf, Ta, and Zr be contained as a metal of Group IV or Group V that forms the passive layer.

Further, it is preferable that the treatment layer 112 be oxidized completely. This makes the crystal structure of the treatment layer 112 amorphous. Hence, when exposed to a liquid, the treatment layer has substantially no crystal grain boundaries at which corrosion is likely to occur, and can express a high resistance to the liquid.

It is preferable that the treatment layer 112 contain Si in an amount of 17 at % higher in the film. When the treatment layer 112 contains Si in an amount of 17 at % or higher, it can be a completely transparent film. The content of Si is preferably 20 at % or higher.

This makes it possible to form an amorphous film that is uniform with little uneven distribution of metal species, in which partial presence of crystals, etc., and hence local weakness to a liquid are suppressed. When the Si content in the film is low, other metal species may aggregate and crystallize to produce unevenness in the film quality. A film with unevenness may cause a battery effect between Si and other metal species upon contact with a liquid, which may cause a corrosion reaction.

Here, because the film is amorphous, it is possible to determine whether the alloy film forming the treatment layer is oxidized completely or not, by confirming whether or not the film is transmissive to visible light. For example, the film can be determined as being oxidized completely, when it has an attenuation coefficient (k) of 0.1 or lower, preferably 0.03 or lower for wavelengths of from 400 nm to 800 nm in ellipsometer measurement.

It is preferable that the treatment layer 112 contain a transition metal in an amount of 2 at % or higher. This improves the density of the treatment layer 112 without fail, and improve its liquid resistance. A more preferable content is from 3.5 at % to 13.5 at %. This ensures that the treatment layer 112 has a structure with little deficiency and a high filling density, which is convenient for obtaining ink resistance.

As a method for confirming the state of the film, it is possible to confirm whether the film has a certain refractive index with an ellipsometer. For example, a refractive index of a single Sift film is 1.4, and a refractive index of a single $Ta_2O_5$ film is 2.1. Hence, when the treatment layer 112 is oxidized completely, its refractive index is from 1.4 to 2.1. However, when the metal species in the treatment layer 112 are not oxidized completely, the treatment layer has a lower transmittance and a higher refractive index. Therefore, it is possible to obtain a desired film quality by controlling both of refractive index and transmittance.

That is, when the metal oxides constituting the treatment layer 112 have different refractive indices, it is possible to control the alloy ratio based on the refractive indices. This makes it possible to perform a rapid, non-destructive measurement under atmospheric conditions, and makes it easy to control the conditions of the treatment layer 112 in the actual mass production process.

Next, as a method for forming the treatment layer 112, it is possible to employ a method by which a thin film can be formed easily, such as vapor deposition, sputtering, CVD (Chemical Vapor Deposition), ALD (Atomic Layer Deposition), etc. Particularly, when the flow path forming members are made of materials that may deform during a heating process, film formation by sputtering, or by ALD at 160° C. or lower, or more preferably 120° C. or lower is preferable.

Particularly, ALD terminates a film formation reaction each time one atomic layer is formed. Therefore, by ALD, a film to be formed can be by far denser and less defective than by common CVD or deposition method. Furthermore, ALD enables film formation over any portion of a member that can adsorb a gas. Therefore, a film can be formed uniformly over a member that has a vertical wall or an edge portion.

The sputtering (PVD) method sputters out the target metal species with Ar ions, which makes it possible to form a film with few impurities. Further, the method sputters out ions in a vacuum, which makes it possible to form a film having a high adhesiveness to a substrate. Furthermore, the method does not utilize heat for the reaction, which makes it possible to cool the member and form a film at a temperature close to room temperature. Hence, even when a material that is hard to warm is used as the flow path forming members, it is possible to obtain liquid resistance.

It is preferable that surfaces of the flow path forming members other than bonding surfaces thereof be also coated with the treatment layer 112. With this configuration, it becomes harder for any member having a low wetting resistance and an adhesiveness improving material to be eluted, which leads to a high reliability of the configuration.

In this case, the film thickness of the treatment layer is preferably 10 nm or greater, and more preferably 25 nm or greater, at the thinnest portion thereof. When the film thickness is too small, it is difficult for a defective portion, if any, of the flow path forming members to be covered.

It is undesirable if a treatment layer 112 to be formed over a surface of the vibration plate 105, which is a flow path forming member, is a thick film that may affect the operational characteristics of the vibration plate 105. Hence, the thickness of the treatment layer 112 is preferably 200 nm or less, and more preferably 50 nm or less.

Film formation by ALD at 160° C. or lower, preferably 120° C. or lower is preferable for formation of a treatment layer 112 having the film thickness described above over surfaces of the flow path forming members that are to become flow path walls. ALD enables single molecular layer-level control, and forms a film by a surface reaction, which makes it possible for a very uniform film to be formed over a member having a vertical wall or a slanted wall as shown in FIG. 4.

FIGS. 5-A and 5-B show an example of an observed cross-section of an actual sample of a flow path pattern-etched Si substrate, over which Ta-introduced $SiO_2$ treatment layer 112 is formed by ALD. As can be seen from FIGS. 5-A and 5-B, it was confirmed that a film was formed uniformly over also side walls of the etched pattern.

Reactivity is different depending on the kind of the source gas to be used. In the case of film formation at 160° C. or lower, examples of functional groups to be coordinated around the metals includes —$C_2H_5$, —Cl, and —$N(CH_3)_2$. In most of the cases, amino-based gases such as —$N(CH_3)_2$ are excellent in reactivity at a low temperature.

Commonly, gases to be reacted are $O_2$ plasma and $H_2O$. $O_2$ plasma is highly reactive, but $O_3$ produced in the plasma decomposes the source gas and tends to produce a by-product. In the case of low temperature treatment at 160° C. or lower, the by-product is likely to reattach to the interior of the chamber of the device and to the constituting substrates and produce particles, which may be a factor of reducing the yield.

As compared with this, $H_2O$ reacts to only hydrolyze. Therefore, it can suppress production of a by-product. Further, during a reaction, $H_2O$ is likely to produce an OH group over the surface of the treatment layer, and can facilitate adsorption of the source gas to the substrate when the source gas is introduced in the next film formation cycle, which is particularly advantageous for low temperature film formation. When the source gas is pentane dimethyl amide tantalum (PDMA-Ta), uniform film formation is possible even at 80° C. However, because the film formation speed is low, batch processing in which a plurality of parts are processed simultaneously is preferable in the case of mass production.

Low temperature treatment also makes it possible to form a treatment layer 112 over an already bonded portion without damaging the adhesive layer thereof.

Next, when sputtering is employed as a method for forming the treatment layer 112, the film thickness of a film formed over a member having vertical walls or edge portions may be uneven as shown in FIG. 6.

Sputtering employs reactive sputtering of injecting Ar ions into metal targets and introducing an $O_2$ gas at the same time to thereby oxidize the metals. This makes it less likely for impurities to be incorporated into the treatment layer 112. Hence, a pure oxide film containing few impurities can be formed.

Here, the results of XPS comparison of impurities in treatment layers formed over Si substrates by sputtering and ALD (at a temperature of 100° C.) are shown in FIG. 7 (sputtering) and FIG. 8 (ALD).

In the case of ALD, carbon was detected in an amount of from about 5 at % to 10 at %. On the other hand, in the case of sputtering, no impurities were detected in the film at all. Impurities tend to gather at crystal grain boundaries. Therefore, when etching is induced by a liquid, it may be started from where impurities gather. A film with fewer impurities can obtain a higher ink resistance reliability, and can hence secure corrosion resistance with a smaller film thickness.

Here, an example of a liquid jet head of the present invention will be described with reference to FIG. 9 to FIG. 11. FIG. 9 is a perspective explanatory diagram showing an appearance of a liquid jet head. FIG. 10 is a cross-sectional explanatory diagram taken in a direction (liquid chamber longer direction) perpendicular to a direction in which nozzles of the liquid jet head are arranged. FIG. 11 is a cross-sectional explanatory diagram taken in a direction (liquid chamber shorter direction) in which nozzles of the liquid jet head are arranged.

The liquid jet head is formed by stacking and bonding a nozzle plate 1, a flow path plate 2, and a vibration plate member 3. The liquid jet head includes a piezoelectric actuator 11 configured to displace the vibration plate member 3, and a frame member 20 as a common liquid chamber member.

The nozzle plate 1, the flow path plate 2, and the vibration plate member 3 form individual liquid chambers 6 continuing and leading to a plurality of nozzles 4 for jetting liquid droplets, a fluid resistance section 7 configured to supply a liquid to the individual liquid chambers 6, and a liquid introducing section 8 leading to the fluid resistance section 7.

A liquid from a common liquid chamber 10 of the frame member 20 that passes through a filter section 9 formed in the vibration plate member 3 is supplied to the plurality of individual liquid chambers 6 through the liquid introducing section 8 and the fluid resistance section 7.

The nozzle plate 1 has nozzles 4 corresponding to the individual liquid chambers 6 respectively and each having a diameter of from 10 μm to 35 μm. The nozzle plate 1 is bonded to the flow path plate 2 via a resin layer. The nozzle plate 1 has a water repellent layer on a surface thereof at a liquid jetting side (a surface that is ahead in the jetting direction: jetting surface, a surface opposite to the liquid chamber 6).

The flow path plate 2 is formed of a single crystal silicon substrate that is etched to have grooves constituting the individual liquid chambers 6, the fluid resistance section 7, the liquid introducing section 8, etc. Alternatively, the flow path plate 2 may be a metal plate such as a SUS substrate that is etched with an acidic etching liquid or that is mechanically machined with a press or the like.

The vibration plate member 3 functions both as a wall surface member forming a wall surface of the individual liquid chambers 6 of the flow path plate 2 and as a filter member constituting the filter section 9. The vibration plate member 3 has a multilayered structure formed of three layers, namely, a first layer 3A, a second layer 3B, and a third layer 3C seen from the individual liquid chambers 6 (may be formed of two layers or four or more layers). The first layer 3A includes a deformable vibration region 30 at a position corresponding to the individual liquid chambers 6.

A piezoelectric actuator 11 including an electromechanical conversion element as a driving element (actuating means, pressure generating means) for deforming the vibration region 30 of the vibration plate member 3 is provided at a side of the vibration plate member 3 opposite to the individual liquid chambers 6 side.

The piezoelectric actuator 11 includes a stacked piezoelectric member 12 bonded, with an adhesive, to a base member 13 made of a metal material. The piezoelectric member 12 is machined by half cut dicing to have grooves that provides one piezoelectric member 12 with a required number of piezoelectric poles 12A and 12B at certain intervals in a comb-teeth form.

The piezoelectric poles 12A and 12B of the piezoelectric member 12 are identical with each other, but piezoelectric poles to be driven by application of a driving waveform are distinguished as driving piezoelectric poles (driving poles, or hereinafter may be referred to also as "driving elements") 12A, and piezoelectric poles to be used simply as supports without application of a driving waveform are distinguished as non-driving piezoelectric poles (non-driving poles) 12B.

The driving poles 12A are bonded to projections 30a that are island-like thick-walled portions formed in the vibration region 30 of the vibration plate member 3. The non-driving poles 12B are bonded to projections 30b that are thick-walled portions of the vibration plate member 3.

The piezoelectric member 12 is formed of alternately stacked piezoelectric layers and internal electrodes. The internal electrodes are led out as an end surface to function as an external electrode, to which a first wiring member 15 formed of an FPC or the like, which is a bendable flexible wiring substrate for transmitting a driving signal to the external electrode of the driving pole 12A, is connected. A second wiring member 16 formed of an FFC or the like, which is a flexible wiring substrate having a metal shield member, is connected to the first wiring member 15.

The frame member 20 is formed by, for example, injection-molding an epoxy-based resin, or polyphenylene sulfite that is a thermoplastic resin, and has the common liquid chamber 10 to which a liquid is supplied from an unillustrated head tank or liquid cartridge.

In the liquid jet head configured as described above, when the voltage applied to the driving poles 12A is lowered from a reference potential, the driving poles 12A contract, the vibration region 30 of the vibration plate member 3 goes up, and the volume of individual liquid chambers 6 expands, which causes a liquid to flow into the individual liquid chambers 6.

After this, when the voltage applied to the driving poles 12A is raised, the driving poles 12A elongate in the stacking direction, the vibration region 30 of the vibration plate member 3 deforms toward the nozzles 4, and the volume of the individual liquid chambers 6 contracts, which causes the liquid in the individual liquid chambers 6 to be pressurized and liquid droplets to be jetted (discharged) from the nozzles 4.

Then, when the voltage applied to the driving poles 12A is returned to the reference potential, the vibration region 30 of the vibration plate member 3 returns to the initial position, and the individual liquid chambers 6 expand and develop a negative pressure, which causes the liquid to be filled into the individual liquid chambers 6 from the common liquid chamber 10. Then, when the vibration of the meniscus surface at the nozzles 4 has decayed and stabilized, the next operation cycle of jetting liquid droplets starts.

The method for driving the head is not limited to the above example (contraction/expansion jetting), but contraction jetting and expansion jetting are also possible depending on how to apply a driving waveform.

(Liquid Jet Apparatus)

A liquid jet apparatus of the present invention includes the liquid jet head of the present invention, and includes other units according to necessity.

<Liquid>

The liquid is not particularly limited, and an arbitrary liquid may be selected according to the purpose as long as it is a liquid jettable by the liquid jet head. Examples thereof include an ink, an inkjet ink, a photo-polymerizable ink, a pre-treatment liquid, a fixing treatment liquid, a resist, and a pattern forming material. Among these, an inkjet ink is particularly preferable.

<Other Units>

Examples of the other units include a control unit.

The control unit is not particularly limited, and an arbitrary control unit can be selected according to the purpose as long as it can control the operations of each unit. Examples thereof include devices such as a sequencer, and a computer.

(Image Forming Apparatus)

An image forming apparatus of the present invention includes an ink housing unit, and a liquid jet head, and further includes other units according to necessity.

<Ink Housing Unit>

The ink housing unit is a unit in which an inkjet ink is housed, and examples thereof include a tank, and an ink cartridge.

The ink cartridge includes a container in which the inkjet ink is housed, and further includes other members appropriately selected according to necessity.

The container is not particularly limited, and the shape, structure, size, material, etc. thereof may be appropriately selected according to the purpose. Preferable examples thereof include a container that has an ink bag made of an aluminium laminate film, a resin film, or the like.

<Liquid Jet Head>

The liquid jet head is a unit configured to apply an impact to the inkjet ink and fly the ink to thereby record an image on a recording medium.

As the liquid jet head, the liquid jet head of the present invention is used.

The inkjet ink may be any of a water-based ink containing water as a main solvent, a photo-polymerizable ink containing a reactive organic compound as a solvent, an oil-based ink containing a solvent that does not volatilize at 200° C. or lower as a main solvent, and a solvent ink containing a volatile solvent as a main solvent.

<<Water-Based Ink>>

The water-based ink contains at least water and a water-soluble organic solvent, and further contains other components according to necessity.

—Water-Soluble Organic Solvent—

Examples of the water-soluble organic solvent include polyvalent alcohols, polyvalent alcohol alkyl ethers, polyvalent alcohol aryl ethers, a nitrogen-containing heterocyclic compound, amides, amines, sulfur-containing compounds, propylene carbonate, and ethylene carbonate. Further, solid wetting agents described below may be used as examples of the water-soluble organic solvent.

Among these, at least one water-soluble organic solvent selected from the group consisting of triol having 4 or less carbon atoms, polyethylene glycol ether of triol having 4 or less carbon atoms, polyethylene glycols, and 1,3-propanediol is preferable, because they have a high equilibrium water content.

The content of the water-soluble organic solvent is preferably 20% by mass or higher, and more preferably from 30% by mass to 70% by mass, relative to a total water-soluble organic solvent amount.

When the content is less than 20% by mass, the ink will have a poor moisture retaining ability and dry up easily, which may cause deposition of dissolved components of the ink or aggregation of dispersed components of the ink at the head meniscus portion due to drying, which may lead to a jetting failure.

Examples of the triol having 4 or less carbon atoms include 1,2,3-butanetriol, 1,2,4-butanetriol, and glycerin.

Examples of the polyethylene glycol ether of triol having 4 or less carbon atoms include polyoxyethylene glyceryl ether, polyoxyethylene-1,2,3-butanetirol ether, and polyoxyethylene-1,2,4-butanetirol ether.

Examples of the polyethylene glycols include ethylene glycol, diethylene glycol, triethylene glycol, tetraethylene glycol, and PEG200.

Among these, glycerin is preferable, because it has a very high equilibrium water content of 49% by mass at 23° C. at a relative humidity of 80%, can minimize drying of the ink, and besides, has a great viscosity drop when water is added, which provides an excellent jetting stability from the head, excellent suppression of waste ink thickening in a head maintenance device, and excellent prevention of waste ink adherence to the maintenance device.

In addition to such an organic solvent having a high equilibrium water content and an excellent moisture retaining ability, any other water-soluble organic solvent may be used according to necessity. Examples of the other water-soluble organic solvent include polyvalent alcohols, polyvalent alcohol alkyl ethers, polyvalent alcohol aryl ethers, cyclic ethers, amines, amides, sulfur-containing compounds, propylene carbonate, and ethylene carbonate.

Examples of the polyvalent alcohols include 1,2-propylene glycol, dipropylene glycol, tripropylene glycol, polypropylene glycol, 1,3-butanediol, 3-methyl-1,3-butanediol, 1,5-pentanediol, 2-methyl-2,4-pentanediol, hexylene glycol, 1,6-hexanediol, 1,2,6-hexanetriol, trimethylolethane, trimethylolpropane, 3-methyl-1,3-hexanediol, and propyl propylene diglycol.

Examples of the polyvalent alcohol alkyl ethers include ethylene glycol monoethyl ether, ethylene glycol monobutyl ether, diethylene glycol monomethyl ether, diethylene glycol monoethyl ether, diethylene glycol monobutyl ether, ethylene glycol mono-2-ethylhexyl ether, propylene glycol monoethyl ether, and triethylene glycol dimethyl ether.

Examples of the polyvalent alcohol aryl ethers include ethylene glycol monophenyl ether, and ethylene glycol monobenzyl ether.

Examples of the cyclic ethers include epoxies, oxetanes, tetrahydrofurans, tetrahydropyrans, and crown ether. Among these, oxetanes and tetrahydrofurans are preferable, and oxetanes are more preferable in terms of water-solubility.

Example of the sulfur-containing compounds include dimethyl sulfoxide, sulfolane, and thiodigylcol.

Examples of the amines include monoethanol amine, diethanol amine, triethanol amine, N,N-dimethyl monoethanol amine, N-methyl diethanol amine, N-methyl ethanol amine, N-phenyl ethanol amine, and 3-aminopropyl diethylamine.

Examples of the amide compounds include 2-pyrrolidone, N-methyl-2-pyrrolidone, 1,3-dimethyl-2-imidazolidinone, ε-caprolactam, γ-butyrolactone, β-methoxy-N,N-dimethylpropionamide, and β-butoxy-N,N-dimethylpropnionamide. Among these, a water-soluble amide compound described below is preferable.

The water-soluble amide compound is a polar solvent that can dissolve many organic compounds and inorganic salts, and can be mixed with a wide variety of liquids from water to organic solvents, which makes it possible to obtain an effect of improving wettability to a recording medium, a dissolving ability, and mixing stability of other component.

An amide compound represented by the structural formula below, which is one kind of a non-cyclic amide compound, is also one of water-soluble amide compounds.

[Chem.40]

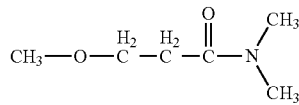

The amide compound represented by the structural formula above have different degrees of hydrophilicity depending on the length of an alkyl group, and hence have different degrees of miscibility with water and an organic solvent.

An amide compound of which alkyl group is a methyl group has a high boiling point of 216° C., a high equilibrium water content of 39.2% at a temperature of 23° C. at a relative humidity of 80%, and a very low liquid viscosity of 1.48 mPa·s at 25° C. Furthermore, it can dissolve in a water-soluble organic solvent and water very easily, and hence can thin the ink to a low viscosity. Therefore, it is extremely preferable as a water-soluble organic solvent used in an ink. An ink containing this amide compound will have favorable storage stability and jetting stability, and be friendly to a maintenance/restoration device.

An amide compound of which alkyl group is a butyl group can dissolve in water freely, can dissolve liquid paraffin and n-hexane, has a high boiling point of 252° C., and can be added as a permeation improver for improving permeation into an ink, or a solubilizer.

Any of these amide compounds has a high dissolving ability, and also has a high dissolving ability to conventional adhesives. Therefore, it has been difficult to increase the amount of these amide compounds in water-based inks. As a result, in the case of such a head as a plate stacked-type head that uses an adhesive, the amount of an amide compound to be added to the ink used has been 10% by mass or less, because there has been a problem that an amide compound added in a high amount would attack the bonding interface between the stacked plates, to make it impossible to obtain a sufficient strength.

In the case of the liquid jet head of the present invention, the amide compound can be added in the water-based ink in an amount of 20% by mass or higher.

An additive amount of such an amide compound is preferably 20% by mass or higher in terms of printed solid image uniformity. When it is greater than 60% by mass, a drying property of the ink on a paper surface may be poor, and character quality on regular paper may be poor.

Sugars are preferable as the solid wetting agent. Examples of the sugars include monosaccharides, disaccharides, oligosaccharides (including trisaccharides and tetrasaccharides), and polysaccharides. Specific examples thereof include glucose, mannose, fructose, ribose, xylose, arabinose, galactose, maltose, cellobiose, lactose, sucrose, trehalose, and maltotriose.

The term "polysaccharides" refers to sugars in the broad sense of the term, and is to be used to encompass substances that are present in nature in abundance, such as α-cyclodextrin, and cellulose.

Examples of derivatives of these sugars include reducing sugars of the sugars described above (e.g., sugar alcohol (represented by the general formula: $HOCH_2(CHOH)nCH_2OH$ (where n represents an integer of from 2 to 5)), sugar oxides (e.g., aldonic acid, and uronic acid), amino acid, and thio acid.

Among these, sugar alcohol is preferable. Examples of the sugar alcohol include maltitol and sorbit.

The content of the water-soluble organic solvent is preferably from 10% by mass to 50% by mass, and more preferably from 15% by mass to 40% by mass relative to the total amount of the water-based ink. When the content is 10% by mass or greater, an excellent jetting stability can be obtained. When the content is 50% by mass or less, a drying property over a paper surface can be obtained, and drying/fixing will not take time.

—Colorant—

A colorant may either be a pigment or a dye. However, a pigment is preferable in terms of optical discoloration.

The pigment may be an organic pigment or an inorganic pigment. It is possible to use a dye at the same time for the purpose of color tone adjustment. However, a dye can be used within a range in which weatherability will not be degraded. It is preferable to use a pigment principally in terms of weatherability, but a dye may also be used at the same time for the purpose of color tone adjustment within a range in which weatherability will not be degraded.

Examples of the inorganic pigment include titanium oxide, iron oxide, calcium carbonate, barium sulfate, aluminium hydroxide, barium yellow, cadmium red, chrome yellow, and carbon black produced by a publicly-known method such as contact method, furnace method, and thermal method.

Examples of the organic pigment include azo pigment (e.g., azo lake, insoluble azo pigment, condensed azo pigment, and chelate azo pigment), polycyclic pigment (e.g., phthalocyanine pigment, perylene pigment, perinone pigment, anthraquinone pigment, quinacridone pigment, dioxazine pigment, indigo pigment, thioindigo pigment, isoindolinone pigment, and quinophthalone pigment), dye chelate (basic dye-type chelate, and acidic dye-type chelate), nitro pigment, nitroso pigment, and aniline black. Among these, those having good affinity with water are preferable.

Among these pigments, those that have a preferable configuration are pigments that are surface-reformed to have at least one kind of a hydrophilic group bound to the surface thereof directly or via a group of other atoms. For this purpose, for example, a method of chemically binding a specific functional group (such a functional group as a sulfone group and a carboxyl group) on the surface of the pigment, and a method of subjecting the pigment to a wet oxidation treatment with a hypohalous acid, or a salt thereof, or both are used. A pigment in a particularly preferable configuration is bound with a carboxyl group on the surface thereof and dispersed in water. Also with this configuration, the pigment is surface-reformed to be bound with a carboxyl group, which not only improves dispersion stability, but also provides a high printed character quality and provides a recording medium after printed with a better water resistance.

An ink with this configuration has an excellent redispersiblity after dried. Therefore, even after a printing operation has been suspended for a long term and the water content of the ink at the nozzles of the inkjet head has evaporated, the nozzles will not be clogged but can perform fine printing easily with a simple cleaning operation. Furthermore, this self-dispersible pigment has a particularly great synergetic effect when combined with a surfactant and a permeation agent described below, and makes it possible to obtain an image with a greater reliability and a higher quality.

In addition to the pigment with the above configuration, it is possible to use a polymer emulsion obtained by adding a pigment in polymer particles. A polymer emulsion containing a pigment is an emulsion obtained by encapsulation of a pigment in polymer particles, or adsorption of a pigment to the surface of polymer particles, or both. In this case, there is no need of the whole content of the pigment being encapsulated, or adsorbed, or both, but some pigment may be dispersed in the emulsion. Examples of the polymer to form the polymer emulsion include a vinyl-based polymer, a polyester-based polymer, and a polyurethane-based polymer. Among these, a vinyl-based polymer and a polyester-based polymer are preferable.

Not only a pigment, but also a water-soluble dye may be used in combination. The water-soluble dye is preferably an acidic dye and a direct dye.

The content of the colorant is preferably from 1% by mass to 15% by mass, and more preferably from 3% by mass to 12% by mass relative to the total amount of the water-based ink.

—Surfactant—

The surfactant is not particularly limited, and an arbitrary surfactant may be selected according to the purpose, as long as it will not spoil the dispersion stability depending on the kind of the colorant, and combination with the wetting agent and the water-soluble organic solvent. Examples thereof include an anionic surfactant, a nonionic surfactant, an amphoteric surfactant, an acetylene glycol-based surfactant, and fluorosurfactant. One of these may be used alone, or two or more of these may be used in combination.

Examples of the anionic surfactant include polyoxyethylene alkyl ether acetic acid salt, dodecyl benzene sulfonic acid salt, succinic acid ester sulfonic acid salt, lauric acid salt, and polyoxyethylene alkyl ether sulfate salt.

Examples of the nonionic surfactant include polyoxyethylene alkyl ether, polyoxyethylene polyoxypropylene alkyl ether, polyoxyethylene alkyl ester, polyoxyethylene polyoxypropylene alkyl ester, polyoxyethylene sorbitan fatty acid ester, polyoxyethylene alkyl phenyl ether, polyoxyethylene alkyl amine, and polyoxyethylene alkyl amide.

Examples of the amphoteric surfactant include lauryl amino propionic acid salt, lauryl dimethyl betaine, stearyl dimethyl betaine, and lauryl dihydroxy ethyl betaine. Examples of the amphoteric surfactant include lauryl dimethyl amine oxide, myristyl dimethyl amine oxide, stearyl dimethyl amine oxide, dihydroxy ethyl lauryl amine oxide, polyoxyethylene palm oil alkyl dimethyl amine oxide, dimethyl alkyl (palm) betaine, and dimethyl lauryl betaine.

Examples of the acetylene glycol-based surfactant include acetylene glycol types such as 2,4,7,9-tetramethyl-5-desine-4,7-diol, 3,6-dimethyl-4-octine-3,6-diol, and 3,5-dimethyl-1-hexine-3-ol (e.g., SURFYNOL 104, 82, 465, and 485, or TG manufactured by Air Products and Chemicals, Inc.). Among these, SURFYNOL 465 and 104, or TG are preferable because they exhibit a favorable print quality.

Examples of the fluorosurfactant include perfluoroalkyl sulfonic acid salt, perfluoroalkyl carboxylic acid salt, perfluoroalkyl phosphoric acid ester, perfluoroalkyl ethylene oxide adduct, perfluoroalkyl betaine, a perfluoroalkyl amine oxide compound, a polyoxyalkylene ether polymer having a perfluoroalkyl ether group on a side chain thereof or a sulfuric acid ester salt thereof, and fluoroaliphatic polymeric ester.

The fluorosurfactant may be a commercially available product. Examples of the commercially available product include: SURFLON S-111, S-112, S-113, S121, S131, S132, S-141, and S-145 (all manufactured by Asahi Glass Co., Ltd.); FLUORAD FC-93, FC-95, FC-98, FC-129, FC-135, FC-170C, FC-430, FC-431, and FC-4430 (all manufactured by Sumitomo 3M Limited); FT-110, 250 251, and 400S (all manufactured by Neos Company Limited); ZONYL FS-62, FSA, FSE, FSJ, FSP, TBS, UR, FSO, FSO-100, FSN N, FSN-100, FS-300, and FSK (all manufactured by Du Pont Kabushiki Kaisha); and POLYFOX PF-136A, PF-156A, and PF-151N (all manufactured by Omnova Solutions Inc.)

The content of the surfactant is preferably from 0.01% by mass to 5% by mass, and more preferably from 0.5% by mass to 2% by mass to a total amount of the water-based ink, in order to exhibit a permeation effect. When the content is less than 0.01% by mass, there is no effect of adding the surfactant. When the content is greater than 5% by mass, permeability into a recording medium will be higher than necessary, which may lead to a poor image density or a bleed-through.

—Permeation Agent—

It is preferable that at least one kind of a polyol compound having a solubility to water of 20° C. of 0.2% by mass or greater but less than 5.0% by mass be added as the permeation agent.

Among such polyol compounds, examples of aliphatic diol include 2-ethyl-2-methyl-1,3-propanediol, 3,3-dimethyl-1,2-butanediol, 2,2-diethyl-1,3-propanediol, 2-methyl-2-propyl-1,3-propanediol, 2,4-dimethyl-2,4-pentanediol, 2,5-dimethyl-2,5-hexanediol, 5-hexene-1,2-diol, 2-ethyl-1,3-hexanediol, and 2,2,4-trimethyl-1,3-pentanediol.

Among these, 2-ethyl-1,3-hexanediol, and 2,2,4-trimethyl-1,3-pentanediol are preferable.

Examples of other permeation agents that can be used in combination include: alkyl and aryl ethers of polyvalent alcohol, such as diethylene glycol monophenyl ether, ethylene glycol monophenyl ether, ethylene glycol monoallyl ether, diethylene glycol monophenyl ether, diethylene glycol monobutyl ether, propylene glycol monobutyl ether, and tetraethylene glycol chlorophenyl ether; and lower alcohols such as ethanol. However, other permeation agents that can be used in combination are not limited to these, but any others may be used as long as such ones can adjust an ink to a desired physical property by dissolving in the ink.

Even a permeation agent that has a low water solubility may also be used, as long as it can be solubilized by the amide compound described above and will not deposit from the ink. Conventional inks contain an amide compound in a low additive amount and have a low solubilizing effect as a result. However, the ink described above can contain an amide compound in a high amount, and hence can contain a sparingly-soluble organic substance that cannot have been added in the conventional inks. Hence, the ink can permeate a coated paper for printing, etc. that have been hardly permeated.

The content of the permeation agent is preferably from 0.1% by mass to 4.0% by mass relative to a total amount of the water-based ink. When the content is less than 0.1% by mass, a fast drying property may not be obtained, and an image may be blurred. When the content is greater than 4.0% by mass, dispersion stability of the colorant may be damaged to make it more likely for the nozzles to be clogged, or permeability to a recording medium may be higher than necessary to lead to a poor image density and a bleed-through.

Further, because the permeation agent is an organic substance having a high hydrophobicity, it also has a high affinity with the resin layer of the head and can permeate the resin layer easily. In the case of such a head as a plate stacked-type head that uses an adhesive, there is a problem that the permeation agent added in a high amount would attack the bonding interface between the stacked plates via the resin layer between the plates, to make it impossible to obtain a sufficient strength.

The head of the present invention that uses the treatment layer and is enhanced in the durability of the bonding interface enables addition of the permeation agent in a high amount.

—Water-Dispersible Resin—

Examples of a water-dispersible resin include: a condensation-type synthetic resin (e.g., polyester resin, polyurethane resin, polyepoxy resin, polyamide resin, polyether resin, and silicon resin); an addition-type synthetic resin (e.g., polyolefin resin, polystyrene resin, polyvinyl alcohol-based resin, polyvinyl ester-based resin, polyacrylic acid-based resin, and unsaturated carboxylic acid-based resin); and a natural polymer (e.g., celluloses, rosins, and natural rubber). The water-dispersible resin may be used in the form of a homopolymer, or may be used in the form of a copolymer, and hence in the form of a complex resin which may be any of a single-phase structure type, a core-shell type, and a power feed emulsion.

The water-dispersible resin may be a self-dispersible resin that has a hydrophilic group in the resin itself, or may be a resin that has no dispersibility itself but to which dispersibility is imparted by means of a surfactant or a resin having a hydrophilic group. Particularly, an emulsion of resin particles obtained by emulsifying and suspension-polymerizing an ionomer or unsaturated monomer of polyester resin or polyurethane resin is optimum. In the case of emulsion polymerization of an unsaturated monomer, a resin emulsion thereof is obtained by letting the reaction occur in water to which the unsaturated monomer, a polymerization initiator, a surfactant, a chain transfer agent, a chelate agent, a pH adjustor, etc. are added. Therefore, it is easy to obtain a water-dispersible resin, and it is also easy to produce an intended property thereof because the resin configuration can be changed easily.

Examples of unsaturated monomers that can be used include unsaturated carboxylic acids, (meth)acrylic acid ester monomers, (meth)acrylic acid amide monomers, aromatic vinyl monomers, vinyl cyanogen compound monomers, vinyl monomers, allyl compound monomers, olefin monomers, diene monomers, oligomers having an unsaturated carbon atom, etc. These may be used alone, or a plurality of these may be used in combination. It is possible to reform properties flexibly by combining these monomers, or it is also possible to reform the properties of the resins by letting them undergo a polymerization reaction or a graft reaction using an oligomer-type polymerization initiator.

It is possible to reform the properties of the water-dispersible resin flexibly by using a single unsaturated monomer alone or using a plurality of unsaturated monomers in combination, and resinifying it/them with a polymerization initiator. Such a water-dispersible resin will have a molecular chain disconnection such as dispersion collapse and hydrolyzation under strong alkaline or strong acidic conditions. Therefore, pH thereof is preferably from 4 to 12, more preferably from 6 to 11 in terms of miscibility with a water-dispersible colorant, and yet more preferably from 7 to 9.

A particle diameter of the water-dispersible resin is related with a viscosity of a dispersion liquid. The same resin composition having the same solid content will have a higher viscosity as the particle diameter thereof is smaller. In order to avoid having an excessively high viscosity when prepared as an ink, it is preferable that the water-dispersible resin have an average particle diameter of 50 nm or greater. A water-dispersible resin having an average particle diameter of several ten μm cannot be used because it is larger than the nozzle ports of the inkjet head. It is known that jetting performance of an ink is poor when the ink contains particles having a large particle diameter, even if the particles are smaller than the nozzle diameter. In order not for the ink jetting performance to be hindered, the average particle diameter is preferably 500 nm or less, and more preferably 150 nm or less.

The water-dispersible resin has a function of fixing a water-dispersible colorant on a paper surface, and it is preferable that the water-dispersible resin be able to become a film at normal temperature and improve fixability. Hence, a minimum filming temperature (MFT) thereof is preferably equal to or lower than normal temperature, and more preferably 20° C. or lower.

—Other Components—

The other components are not particularly limited, and arbitrary components may be selected according to necessity. Examples thereof include a pH adjustor, an antiseptic/mildewcide, a chelate agent, an anti-rust agent, an antioxidant, an ultraviolet absorbing agent, an oxygen absorber, a light stabilizer, and a defoaming agent.

The pH adjustor is not particularly limited, and an arbitrary pH adjustor may be selected according to the purpose, as long as it can adjust pH of a recording ink to which it is blended to 7 to 11 without adversely affecting it. Examples thereof include alcohol amines, hydroxide of an alkali metal element, hydroxide of ammonium, phosphonium hydroxide, and carbonate salt of alkali metal.

When the pH is lower than 7 or higher than 11, the ink may elute the inkjet head or an ink supply unit in a large amount, which may lead to troubles such as change of properties of and leakage of the ink, jetting failure, etc.

Examples of the alcohol amines include diethanol amine, triethanol amine, and 2-amino-2-ethyl-1,3 propanediol.

Examples of the hydroxide of an alkali metal element include lithium hydroxide, sodium hydroxide, and potassium hydroxide.

Examples of the hydroxide of ammonium include ammonium hydroxide, quaternary ammonium hydroxide, and quaternary phosphonium hydroxide.

Examples of the carbonate salt of alkali metal include lithium carbonate, sodium carbonate, and potassium carbonate.

Examples of the antiseptic/mildewcide include sodium dehydroacetate, sodium sorbate, sodium 2-pyridinethiol-1-oxide, sodium benzoate, and pentachlorophenol sodium.

Examples of the chelate agent include sodium ethylene diamine tetraacetate, sodium nitrilotriacetate, sodium hydroxyethyl ethylene diamine triacetate, sodium diethylenetriamine pentaacetate, and sodium uramil diacetate.

Examples of the anti-rust agent acid sulfite, sodium thiosulfate, ammonium thiodiglycolate, diisopropyl ammonium nitrite, pentaerythritol tetranitrate, and dicyclohexyl ammonium nitrite.

Examples of the antioxidant include a phenol-based antioxidant (including a hindered phenol-based antioxidant), an amine-based antioxidant, a sulfur-based antioxidant, and a phosphorus-based antioxidant.

Examples of the ultraviolet absorbing agent include a benzophenone-based ultraviolet absorbing agent, a benzotriazole-based ultraviolet absorbing agent, a salicylate-based ultraviolet absorbing agent, a cyanoacrylate-based ultraviolet absorbing agent, and a nickel complex salt-based ultraviolet absorbing agent.

Examples of the defoaming agent include a silicone defoaming agent, a polyether defoaming agent, and a fatty acid ester defoaming agent. When a common defoaming agent that contains a large amount of inorganic particles with a view to improving a foam breaking effect is used in combination, the inorganic particles may be subjected to appropriate handling such as removal if such handling is necessary because of the necessity that the recording ink that contains the defoaming agent should contain coarse particles having a particle diameter of 0.5 μm or greater in an amount of $3.0 \times 10^7$ (particles/5 μl) or less, and that particles having a diameter of 1 μm or greater but less than 5 μm should account for equal to or less than 1 number % of the amount of the coarse particles.

The water-based ink is produced by dispersing or dissolving a colorant, a water-soluble organic solvent (wetting agent), a surfactant, a permeation agent, a water-dispersible resin, and water, and according to necessity, other components in an aqueous medium, and according to necessity, further stirring and mixing them.

The dispersion can be performed with, for example, a sand mill, a homogenizer, a ball mill, a paint shaker, and an ultrasonic disperser. The stirring and mixing can be performed with a stirrer using a normal stirring blade, a magnetic stirrer, a high-speed stirrer, etc.

Physical properties of the water-based ink are not particularly limited, and may be appropriately selected according to the purpose. For examples, it is preferable that a viscosity, a surface tension, etc. thereof be in the ranges described below.

The viscosity of the water-based ink at 25° C. is preferably from 3 mPa·s to 20 mPa·s.

When the ink viscosity is 3 mPa·s or greater, an effect of improving print density and character quality can be obtained. On the other hand, when the ink viscosity is 20 mPa·s or less, jetting performance can be ensured. Here, the viscosity can be measured with, for example, a viscometer (RL-550 manufactured by Toki Sangyo Co., Ltd.) at 25° C.

The surface tension of the water-based ink is preferably 35 mN/m or less, and more preferably 32 mN/m or less at 25° C. When the surface tension is greater than 35 mN/m, it becomes harder for the ink on a recording medium to be leveled, which may prolong the time taken for the ink to dry.

<<Photo-Polymerizable Ink>>

The photo-polymerizable ink contains a polymerizable compound, and further contains other components according to necessity.

The content of the polymerizable compound is preferably from 10% by mass to 70% by mass relative to a total amount of the photo-polymerizable ink. Different compounds can be used as the polymerizable compound depending on photo-curing reactions, and they are classified into radically-polymerizable photo-curable compounds for which a photoradical generator/initiator is used, and cationically-polymerizable photo-curable compounds for which a photoacid generator/initiator is used. It is also possible to use the radically-polymerizable photo-curable compound and the cationically-polymerizable photo-curable compound by mixing them, and arbitrary designing is possible depending on curing property, close adhesive strength, and an image formation process.

—Radically-Polymerizable Photo-Curable Compound—

Examples of the radically-polymerizable photo-curable compound include compounds having an unsaturated hydrocarbon chain as a reactive functional group. Examples of the reactive functional group include a vinyl group, an isopropenyl group, an allyl group, a methacrylic group, an acryloyl group, a methacryloyl group, a propioloyl group, and a maleoyl group.

Examples of compounds having a monofunctional group include 2-ethylhexyl (meth)acrylate (EHA), 2-hydroxyethyl (meth)acrylate (HEA), 2-hydroxypropyl (meth)acrylate (HPA), and caprolactone-modified tetrahydrofurfuryl (meth)acrylate.

Examples of compounds having a bifunctional group include tripropylene glycol di(meth)acrylate, triethylene glycol di(meth)acrylate, tetraethylene glycol di(meth)acrylate, polypropylene glycol di(meth)acrylate, and neopentyl glycol hydroxypivalic acid ester di(meth)acrylate (MANDA).

Examples of compounds having a polyfunctional group include trimethylolpropane tri(meth)acrylate (TMPTA), pentaerythritol tri(meth)acrylate (PETA), dipentaerythritol hexa(meth)acrylate (DPHA), triallyl isocyanate, and ε-caprolactone-modified dipentaerythritol (meth)acrylate.

Examples of oligomers include acrylate and methacrylate of polyester-based resin, acrylic-based resin, epoxy-based resin, urethane-based resin, alkyd resin, ether-based resin, and polyvalent alcohol.

Examples of curable polymers include a water-soluble resin having a polymerizable functional group, and an emulsion-type photo-curable resin.

At least one selected from the radically-polymerizable photo-curable compounds described above may be used, or two or more selected therefrom may be used as a mixture.

Examples of the photoradical polymerization initiator include a molecule cleaving-type photo-polymerization initiator, and a hydrogen abstracting-type photo-polymerization initiator.

Examples of the molecule cleaving-type photo-polymerization initiator include 2,2-dimethoxy-1,2-diphenylethan-1-one, 1-hydroxycyclohexyl phenyl ketone, 2-hydroxy-2-methyl-1-phenylpropan-1-one, and 1-[4-(2-hydroxyethoxy)-phenyl]-2-hydroxy-2-methyl-1-propan-1-one.

Examples of the hydrogen abstracting-type photo-polymerization initiator include: a benzophenone-based compound such as benzophenone, methyl benzophenone, methyl-2-benzoylbenzoate, 4-benzoyl-4'-methyldiphenyl sulfide, and phenyl benzophenone; and a thioxanthone-based compound such as 2,4-diethylthioxanthone, 2-chlorothioxanthone, isopropyl thioxanthone, and 1-chloro-4-propylthioxanthone.

An amine compound may be used in combination as a polymerization accelerator. Examples of the amine compound include ethyl p-dimethylaminobenzoate, p-dimethylamino benzoic acid-2-ethylhexyl, methyl p-dimethylaminobenzoate, benzoic acid-2-dimethylaminoethyl, and butoxyethyl p-dimethylaminobenzoate.

—Cationically-Polymerizable Photo-Curable Compound—

Examples of the cationically-polymerizable photo-curable compound include vinyl aromatic series, vinyl ethers, N-vinyl amides, a compound having an epoxy group, and a compound having an oxetanyl group.

Examples of the vinyl aromatic series include styrene, p-methylstyrene, p-methoxystyrene, β-methylstyrene, p-methyl-β-methylstyrene, α-methylstyrene, p-methoxy-β-methylstyrene, 1-vinylnaphthalene, α-methyl-1-vinylnaphthalene, β-methyl-1-vinylnaphthalene, 4-methyl-1-vinylnaphthalene, and 4-methoxy-1-vinylnaphthalene.

Examples of the vinyl ethers include isobutyl vinyl ether, ethyl vinyl ether, phenyl vinyl ether, p-methylphenyl vinyl ether, p-methoxyphenyl vinyl ether, α-methylphenyl vinyl ether, β-methylisobutyl vinyl ether, β-chloroisobutyl vinyl ether, ethylene glycol divinyl ether, 2-chloroethyl vinyl ether, 2-hydroxyethyl vinyl ether, triethylene glycol divinyl ether, 1,4-cyclohexanedimethanol divinyl ether, hydroxybutyl vinyl ether, and propylene glycol propenyl ether.

Examples of the N-vinyl amides include N-vinyl carbazole, N-vinylpyrrolidone, N-vinylindole, N-vinylpyrrol, N-vinylphenothiazine, N-vinylacetoanilide, N-vinylethyl acetamide, N-vinylsuccinimide, N-vinylphthalimide, N-, and N-vinylimidazole.

Examples of the compound having an epoxy group include hydrogenated bisphenol A diglycidyl ether, 3,4-epoxycyclohexylmethyl-3,4-epoxycyclohexane carboxylate, 3,4-epoxy-1-methylcyclohexyl-3,4-epoxy-1-methyl-hexane carboxylate, and 6-methyl-3,4-epoxycyclohexylmethyl-6-methyl-3,4-epoxycyclohexane carboxylate.

Examples of the compound having an oxetanyl group include 3-ethyl-3-hydroxymethyl oxetane, 3-(meth)allyloxymethyl-3-ethyl oxetane, (3-ethyl-3-oxetanylmethoxy) methyl benzene, 4-fluoro-[1-(3-ethyl-3-oxetanylmethoxy) methyl]benzene, and 4-methoxy-[1-(3-ethyl-3-oxetanylmethoxy)methyl]benzene.

Examples of other cationically-polymerizable compounds include: an oxolane compound such as tetrahydrofuran, and 2,3-dimethyl tetrahydrofuran; a cyclic acetal compound such as trioxane, 1,3-dioxolan, and 1,3,6-trioxanecyclooctane; a cyclic lactone compound such as β-propiolactone, and ε-caprolactone; a thiirane compound such as ethylene sulfide, and thioepichlorohydrin; a thietane compound such as 1,3-propyne sulfide, and 3,3-dimethyl thietane; a cyclic thioether compound such as a tetrahydrothiophene derivative; and a spiroorthoester compound obtained from a reaction between an epoxy compound and lactone.

At least one selected from the cationically-polymerizable photo-curable compounds described above may be used, or two or more selected therefrom may be used as a mixture.

—Cationic Photo-Polymerization Initiator—

The cationic photo-polymerization initiator may be a photoacid generator used commonly for photo cationic polymerization. Examples thereof include a double salt, which is an onium salt that releases a Lewis acid, or a derivative thereof.

Examples of the onium salt include a salt composed of cations of atoms or a group of atoms selected from S, N, Se, Te, P, As, Sb, Bi, O, I, Br, Cl, F, and N=N to which organic groups (at least one or more of which has/have an aromatic ring) are bound, and any anions selected from tetrafluoroborate $(BF_4)^-$, tetrakis (pentafluorophenyl)borate $(B(C_6F_5)_4)^-$, hexafluorophosphate $(PF_6)^-$, hexafluoroantimonate $(SbF_6)^-$, hexafluoroarsenate $(AsF_6)^-$, and hexachloroantimonate $(SbCl_6)^-$.

Note that a sulfonated product that generates a sulfonic acid, a halide that optically generates hydrogen halide, and an iron allene complex can also be used as a photo cationic polymerization initiator.

According to necessity, a colorant may be added in the ink. Publicly-known inorganic pigments and organic pigments can be used as the colorant of the photo-polymerizable ink. As the pigments, substances having the same configuration as those used in the water-based ink may be used.

Unlike in the water-based ink, a pigment dispersant is used in order to disperse the pigment in an oil base and improve dispersibility of the pigment.

Examples of the pigment dispersant include polyamide-based resin, hydroxyl group-containing carboxylic acid ester, a salt of long-chain polyaminoamide and high molecular weight acid ester, a salt of high molecular weight polycarboxylic acid, a salt of long-chain polyaminoamide and polar acid ester, high molecular weight unsaturated acid ester, modified polyurethane, modified polyacrylate, a polyether ester-based anionic active agent, a salt of formalin naphthalene sulfonate condensate, a salt of formalin aromatic sulfonate condensate, polyoxyethylene alkyl phosphoric acid ester, polyoxyethylene nonyl phenyl ether, and stearylamine acetate.

The pigment dispersant is preferably a polyester polyamide resin having a number average molecular weight of from 700 to 15,000.

The content of the pigment dispersant is preferably from 0.1% by mass to 15% by mass, and more preferably from 0.5% by mass to 10% by mass in order to improve pigment dispersibility.

The pigment dispersant may be a commercially available product. Examples of the commercially available product include SOLSPERSE 32000, SOLSPERSE 32500, SOLSPERSE 32600, SOLSPERSE 33500, SOLSPERSE 34750, SOLSPERSE 35100, and SOLSPERSE 37500 manufactured by Lubrizol Corporation; and BYK 9077 manufactured by Byk-Chemie GmbH.

Furthermore, according to necessity, a polymerization inhibitor such as 4-methoxy-1-naphthol, methyl hydroquinone, hydroquinone, t-butyl hydroquinone, di-t-butyl hydroquinone, methoquinone, 2,2'-dihydroxy-3,3'-di($\alpha$-methylcyclohexyl)-5,5'-dimethyldiphenylmethane, p-benzoquinone, di-t-butyldiphenylamine, phenothiazine, 9,10-di-n-butoxyanthracene, and 4,4'-[1,10-dioxo-1,10-decanediylbis(oxy)]bis[2,2,6,6-tetramethyl]-1-piperidinyloxy, a higher fatty acid-based surfactant, a silicone-based surfactant, a fluorosurfactant, and a polar group-containing polymeric pigment dispersant may be used.

The photo-polymerizable ink may have an excessively high viscosity when the photo-polymerization initiator, a polymerizable monomer, a colorant, etc. are added thereto, and cannot be jetted easily though it is an inkjet ink. In such a case, it is preferable to dilute the photo-polymerizable ink with a solvent.

It is preferable that the diluting solvent have a boiling point of from 160° C. to 190° C. A diluting solvent having a boiling point higher than 190° C. may hinder the curing performance. A diluting solvent having a boiling point lower than 160° C. may dry and may make the ink solidify at the inkjet nozzles, for example.

Examples of the diluting solvent include ether, ketone, aromatic series, xylene, ethyl ethoxypropionate, ethyl acetate, cyclohexanone, diethylene glycol monomethyl ether, diethylene glycol, monoethyl ether, $\gamma$-butyrolactone, ethyl lactate, cyclohexane methyl ethyl ketone, toluene, ethylethoxy propionate, polymethacrylate or propylene glycol monomethyl ether acetate, ethylene glycol monomethyl ether, diethylene glycol, and triethylene glycol monobutyl ether.

A viscosity of the photo-polymerizable ink is preferably from 3 mPa·s to 40 mPa·s, and more preferably from 3 mPa·s to 35 mPa·s at 25° C. Alternatively, it is preferably from 7 mPa·s to 15 mPa·s, and more preferably from 10 mPa·s to 12 mPa·s at 60° C.

The viscosities at 25° C. and 60° C. were measured with a cone-plate rotary viscometer VISCOMETER TV-22 manufactured by Toki Sangyo Co., Ltd. with a temperature of constant-temperature cyclic water set to 25° C. and 60° C. VISCOMATE VM-150III was used for adjustment of the temperature of the cyclic water. The temperature of 25° C. assumes common room temperature conditions, and the temperature of 60° C. assumes specifications of a commercially-available heatable inkjet head, such as GEN4 manufactured by Ricoh Printing Systems Co., Ltd.

A static surface tension of the photo-polymerizable ink at 25° C. is preferably from 20 mN/m to 40 mN/m, and more preferably from 28 mN/m to 35 mN/m. The static surface tension was measured with a static surface tensiometer (CBVP-Z TYPE manufactured by Kyowa Interface Science Co., Ltd.) at 25° C. The static surface tension assumes specifications of a commercially available inkjet head, such as GEN4 manufactured by Ricoh Printing Systems Co., Ltd.

When the colorant is made of an inorganic pigment or an organic pigment, an average primary particle diameter of the pigment particles is preferably from 20 nm to 200 nm, and more preferably from 50 nm to 160 nm. When the average primary particle diameter is less than 20 nm, the particles are so minute that a printed matter may have a poor light resistance. When it is greater than 200 nm, a printed matter may have a poor fineness. The above average primary particle diameters are values measured with, for example, an electron microscope (JEM-2010 manufactured by JEOL Ltd.).

<<Oil-Based Ink>>

The oil-based ink contains an organic solvent, a pigment, a dispersant, and other additives. The pigment and dispersant may be the same as those used in the photo-polymerizable ink.

Examples of the organic solvent that can be used include an ester solvent, an alcohol solvent, a higher fatty acid solvent, a hydrocarbon solvent, and ether. One of these may be used alone, or two or more of these may be used as a mixture.

Examples of the ester solvent include methyl laurate, isopropyl laurate, isopropyl myristate, isopropyl palmitate, isooctyl palmitate, isostearyl palmitate, methyl oleate, ethyl oleate, isopropyl oleate, butyl oleate, methyl linoleate, isobutyl linoleate, ethyl linoleate, isopropyl isostearate, methyl soyate, isobutyl soyate, tall oil methyl, tall oil isobutyl, diisopropyl adipate, diisopropyl sebacate, diethyl sebacate, propylene glycol monocaprate, trimethylolpropane tri-2-ethylhexanoate, and glyceryl tri-2-ethyl hexanoate.

Examples of the alcohol solvent include isomyristyl alcohol, isopalmityl alcohol, isostearyl alcohol, and oleyl alcohol.

Examples of the higher fatty acid solvent include isononanoic acid, isomyristic acid, isopalmitic acid, oleic acid, and isostearic acid.

Examples of the hydrocarbon solvent include an aliphatic hydrocarbon solvent, an alicyclic hydrocarbon-based solvent, and an aromatic hydrocarbon solvent.

Examples of the aliphatic hydrocarbon solvent and alicyclic hydrocarbon-based solvent include "TECLEAN N-16, TECLEAN N-20, TECLEAN N-22, NO. 0 SOLVENT L, NO. 0 SOLVENT M, NO. 0 SOLVENT H, AF-4, AF-5, AF-6, and AF-7" (all being product names) manufactured by Shin Nihon Sekiyu Kabushiki-Gaisha, "NISSEKI ISOZOL, and NAPHTHEZOL" (both being product names) manufactured by Shin Nihon Sekiyu Kagaku Kabushiki-Gaisha, and "ISOPAR G, ISOPAR H, ISOPAR L, ISOPAR M, EXXOL D40, EXXOL D80, EXXOL D100, and EXXOL D140" (all being product names) manufactured by Exxon Mobil Corporation.

Examples of the ether solvent include diethyl glycol monobutyl ether, ethylene glycol monobutyl ether, propylene glycol monobutyl ether, and propylene glycol dibutyl ether.

The content of the organic solvent is preferably 60% by mass or greater, and more preferably from 70% by mass to 98% by mass relative to a total amount of the oil-based ink.

<<Solvent Ink>>

A solvent ink contains an organic solvent, a pigment, a pigment dispersant, and a binder resin, and further contains other components according to necessity.

The solvent may be a volatile organic solvent commonly used in solvent-based ink.

Examples of the organic solvent include alcohols, glycols, glycol ethers, esters, ketones, an aromatic compound, and a nitrogen-containing compound.

Examples of the alcohols include methyl alcohol, ethyl alcohol, n-propyl alcohol, isopropyl alcohol, n-butyl alcohol, tridecyl alcohol, cyclohexyl alcohol, and 2-methylcyclohexyl alcohol.

Examples of the glycols include ethylene glycol, diethylene glycol, triethylene glycol, polyethylene glycol, propylene glycol, dipropylene glycol, and glycerin.

Examples of the glycol ethers include ethylene glycol monomethyl ether, ethylene glycol monoethyl ether, ethylene glycol monobutyl ether, ethylene glycol diethyl ether, and ethylene glycol dimethyl ether.

Examples of the esters include ethyl acetate, isopropylene acetate, n-butyl acetate, methyl lactate, ethyl lactate, and butyl lactate.

Examples of the ketones include acetone, methyl ethyl ketone, methyl isobutyl ketone, cyclohexanone, isophorone, and diacetone alcohol.

Examples of the aromatic compound include toluene and xylene.

Examples of the nitrogen-containing compound include acetonitrile, γ-butyrolactone, γ-valerolactone, N-methyl-2-pyrrolidone, and N-ethyl-2-pyrrolidone.

These may be selected variously in terms of adaptability to the properties of the head nozzles during printing, safety, and a drying property, and more than one of these may be used as a mixture according to necessity.

It is preferable that the solvent ink contain glycol ethers as the organic solvent.

Examples of the glycol ethers include diethylene glycol monomethyl ether, diethylene glycol monobutyl ether, diethylene glycol dimethyl ether, diethylene glycol ethyl methyl ether, diethylene glycol diethyl ether, diethylene glycol dibutyl ether, dipropylene glycol monomethyl ether, dipropylene glycol dimethyl ether, propylene glycol monomethyl ether acetate, diethylene glycol monoethyl ether acetate, and diethylene glycol monobutyl ether acetate.

The binder resin used in the solvent ink may be a resin for a binder that is commonly used in common ink compositions, and are not particularly limited, and an arbitrary binder resin may be selected according to the purpose. Examples thereof include: amino resin such as polyester resin, acrylic resin, vinyl chloride resin, epoxy resin, phenol resin, novolac resin, rosin-modified phenol resin, melamine, and benzoguanamine; cellulose ester resin such as polyamide resin, cellulose diacetate, cellulose triacetate, nitrocellulose, cellulose nitrate, cellulose propionate, and cellulose acetate butyrate; and cellulose ether resin such as methyl cellulose, ethyl cellulose, benzyl cellulose, trityl cellulose, cyan ethyl cellulose, carboxymethyl cellulose, carboxyethyl cellulose, and aminoethyl cellulose. Among these, addition of polyester resin, acrylic resin, and vinyl chloride resin is preferable because close adhesiveness with a base material upon printing will be improved.

The polyester resin may be either of saturated polyester and unsaturated polyester resin. The polyester resin is produced from a condensation reaction between a polybasic acid and a polyvalent alcohol. The number average molecular weight of the polyester resin is preferably from 1,000 to 50,000, and more preferably from 2,000 to 20,000.

The acrylic resin may be a product obtained by copolymerizing radically-polymerizable monomers that are commonly used.

Examples of (meth)acrylic acid esters as the radically-polymerizable monomers include methyl acrylate, ethyl acrylate, isopropyl acrylate, n-butyl acrylate, 2-ethylhexyl acrylate, methyl methacrylate, ethyl methacrylate, isopropyl methacrylate, n-butyl methacrylate, isobutyl methacrylate, t-butyl methacrylate, cyclohexyl methacrylate, and 2-ethylhexyl methacrylate.

Examples of vinyls as the radically-polymerizable monomers include styrene, vinyl toluene, α-methyl styrene, vinyl acetate, vinyl propionate, vinyl pyrrolidone, vinyl chloride, vinylidene chloride, vinylidene fluoride, ethyl vinyl ether, and isobutyl vinyl ether.

Examples of α-olefins as the radically-polymerizable monomers include ethylene and propylene.

Examples of carboxyl group-containing monomers as the radically-polymerizable monomers include acrylic acid, methacrylic acid, maleic acid, fumaric acid, itaconic acid, mono-n-butyl maleate, mono-n-butyl fumarate, mono-n-butyl itaconate, and crotonic acid.

Examples of hydroxyl group-containing (meth)acrylic acid esters as the radically-polymerizable monomers include 2-hydroxyethyl (meth)acrylate, 2-hydroxypropyl (meth)acrylate, 3-hydroxypropyl (meth)acrylate, 4-hydroxybutyl (meth)acrylate, (2-hydroxymethyl)ethyl acrylate, (2-hydroxymethyl)butyl acrylate, (4-hydroxymethylcyclohexyl) methyl (meth)acrylate, glycerin mono(meth)acrylate, 2-(meth)acryloyloxyethyl-2-hydroxypropyl phthalate, and 2-hydroxy-3-phenoxypropyl (meth)acrylate.

Examples of amide group-containing monomers as the radically-polymerizable monomers include acrylamide, methacrylamide, maleic acid amide, and diacetone acrylamide.

Examples of glycidyl group-containing monomers as the radically-polymerizable monomers include glycidyl methacrylate, and allyl glycidyl ether.

Examples of cyano group-containing monomers as the radically-polymerizable monomers include acrylonitrile, and methacrylonitrile.

Examples of dienes as the radically-polymerizable monomers include butadiene, and isoprene.

Examples of hydroxyl group-containing allyl compounds as the radically-polymerizable monomers include allyl alcohol, and 2-hydroxyethyl allyl ether.

Examples of tertiary amino group-containing monomers as the radically-polymerizable monomers include dimethyl amino ethyl methacrylate, and diethyl amino ethyl methacrylate.

Examples of alkoxy silyl group-containing monomers as the radically-polymerizable monomers include vinyl trimethoxysilane, vinyl triethoxysilane, vinyl triisopropoxysilane, vinyl tris(β-methoxyethoxy)silane, vinyl methyl dimethoxysilane, vinyl methyl diethoxysilane, vinyl dimethyl methoxysilane, vinyl dimethyl ethoxysilane, 3-methacryloxypropyltrimethoxysilane, 3-methacryloxypropyltriethoxysilane, 3-methacryloxypropylmethyldimethoxysilane, and 3-methacryloxypropylmethyldiethoxysilane.

Examples of monomers having 2 or more unsaturated bonds per molecule as the radically-polymerizable monomers include diallyl phthalate, divinyl benzene, allyl acrylate, and trimethylolpropane trimethacrylate.

These monomers may be used alone, or two or more of these may be used in combination.

Examples of the vinyl chloride resin include a resin obtained by copolymerizing vinyl chloride with another monomer such as vinyl acetate, vinylidene chloride, acrylic, and maleic acid. Among these, a vinyl chloride/vinyl acetate copolymerized resin, or a copolymerized resin having a weight average molecular weight of 30,000 or less is preferable.

These resins may be used in combination. The content of the resin is preferably from 1% by mass to 20% by mass, and more preferably from 1% by mass to 10% by mass.

The color of the ink is not particularly limited, and an arbitrary color may be selected according to the purpose. Examples thereof include yellow, magenta, cyan, and black.

When recording is performed with an ink set in which 2 or more of these colors are used in combination, a multicolor image can be formed. When recording is performed with an ink set in which all of the colors are used in combination, a full-color image can be formed.

—Recording Medium—

The recording medium is not particularly limited, and an arbitrary recording medium may be selected from publicly-known recording media. Examples thereof include regular paper, gloss paper, special paper, yarn, fiber, fabric, leather, metal, plastic, glass, wood, ceramics, OHP sheet, and film.

<Other Units>

Examples of the other units include a cleaning unit, and a control unit.

—Cleaning Unit—

The cleaning unit is a unit configured to wipe the liquid jetting surface of the nozzle plate of the liquid jet head with a blade.

The size, material, shape, structure, etc. of the blade are not particularly limited, and may be appropriately selected according to the purpose.

The size of the blade is not particularly limited, and may be appropriately selected according to the purpose. Examples of the material of the blade include rubber and elastomer, in terms of wiping the surface of the water repellent film 4 of the nozzle plate 2.

The shape of the blade is not particularly limited, and may be appropriately selected according to the purpose, as long as the blade can perform wiping. Examples of the shape include a panel shape, and a plate shape.

The control unit is not particularly limited, and an arbitrary control unit may be selected according to the purpose, as long as it can control the operations of each unit. Examples thereof include devices such as a sequencer, and a computer.

An example of an inkjet recording apparatus, which is an image forming apparatus mounted with the liquid jet head of the present invention, will be described with reference to FIG. 12 to FIG. 14. FIG. 12 is a side elevation explaining a mechanical section of this apparatus. FIG. 13 is a plan view explaining a main portion of this mechanical section. FIG. 14 is a front elevation explaining an example of a head unit.

This image forming apparatus is a serial image forming apparatus, and supports a carriage 233 slidably in a main scanning direction on main and sub guide rods 231 and 232, which are guide members held laterally between left and right side plates 221A and 221B. It moves and scans the carriage in the direction of the arrow A (a carriage main scanning direction) via a timing belt by means of an unillustrated main scanning motor.

As shown also in FIG. 12, the carriage 233 is mounted with a head unit in which recording heads 234 each formed of the liquid jet head of the present invention and tanks 235 containing inks to be supplied to the heads 234 are integrated with each other. The recording heads 234 each have nozzle lines including a plurality of nozzles that are arranged in a sub scanning direction B perpendicular to the main scanning direction, and are mounted to have their ink droplet jetting direction aligned downward.

The recording heads 234 each have two nozzle lines. One recording head 234a jets black (K) liquid droplets from one nozzle line, and cyan (C) liquid droplets from the other nozzle line. The other recording head 234b jets magenta (M) liquid droplets from one nozzle line, and yellow (Y) liquid droplets from the other nozzle line. The configuration described here is a two-head configuration for jetting four colors of liquid droplets. However, four nozzle lines may be arranged per head, so that four colors may be jetted from one head.

The tanks 235 of the recording head 234 are supplied and replenished with inks of the respective colors from ink cartridges 210 of the respective colors through supply tubes 236 of the respective colors by means of a supply unit.

As a sheet feeding section configured to feed sheets 242 stacked on a sheet stacking section (platen) 241 of a sheet feeding tray 202, there are provided a half-moon roll (sheet feeding roll) 243 configured to feed the sheets 242 one by one separately from the sheet stacking section 241, and a separation pad 244 provided oppositely to the sheet feeding roll 243.

Further, in order for the sheet 242 fed from the sheet feeding section to be delivered to below the recording heads 234, there are provided a guide 245 configured to guide the sheet 242, a counter roller 246, a conveying guide member 247, and a pressing member 248 including a leading end pressurizing roll 249. Further, there is provided a conveying belt 251, which is a conveying unit configured to electrostatically adsorb the fed sheet 242 and convey it to a position to face the recording heads 234.

The conveying belt 251 is an endless belt, hung between a conveying roller 252 and a tension roller 253, and configured to rotate in a belt conveying direction B (sub scanning direction). There is also provided a charging roller 256 configured to electrically charge the surface of the conveying belt 251. The charging roller 256 is disposed to contact the superficial surface of the conveying belt 251 and roll in conjunction with the rotation of the conveying belt 251. The conveying belt 251 rotates and moves in the belt conveying direction with the conveying roller 242 driven to rotate by an unillustrated sub scanning motor via the timing belt.

As a sheet discharging section configured to discharge a sheet 242 having a print recorded by the recording head 234, there are provided a separation claw 261 configured to separate the sheet 242 from the conveying belt 251, a sheet discharging roller 262, and a sheet discharging roll 263. There is a sheet discharging tray 203 below the sheet discharging roller 262.

A double-face unit 271 is detachably mounted on the back side of the apparatus body. The double-face unit 271 retrieves a sheet 242 that is returned by the conveying belt 251 being rotated in the opposite direction, overturns the sheet, and feeds it again to between the counter roller 246 and the conveying belt 251. The top portion of the double-face unit 271 is used as a manual feeding tray 272.

A maintenance/restoration mechanism 281 configured to maintain and restore the state of the nozzles of the recording heads 234 is provided at a non-printing region at one side in the scanning direction of the carriage 233.

The maintenance/restoration mechanism 281 includes caps 282a and 282b configured to cap the nozzle surfaces of the recording heads 234. The maintenance/restoration mechanism 281 also includes a wiper member 283 configured to wipe the nozzle surfaces. The maintenance/restoration mechanism 281 also includes a blank shot receptacle 284 configured to receive liquid droplets jetted in a blank shot for jetting liquid droplets that do not contribute to recording in order to discharge a thickened recording liquid.

A blank shot receptacle 288 configured to receive liquid droplets jetted in a blank shot for jetting liquid droplets that do not contribute to recording in order to discharge a recording liquid thickened during recording is disposed at a non-printing region at the other side in the scanning direction of the carriage 233. The blank shot receptacle 288 has an opening 289 extending along the direction of the nozzle lines of the recording heads 234.

In the image forming apparatus configured as described above, the sheet 242 is fed one by one separately from the sheet feeding tray 202, guided by the guide 245, and conveyed by being sandwiched between the conveying belt 251 and the counter roller 246. Then, the sheet 242 is shifted in the conveying direction by substantially 90°, with its leading end guided by the conveying guide 247 and pressed by the leading end pressurizing roll 249 onto the conveying belt 251.

Then, when the sheet 242 is fed over the conveying belt 251 that is electrically charged, the sheet 242 is adsorbed to the conveying belt 25 and conveyed in the sub scanning direction in accordance with the conveying belt 251 being rotated and moved.

Here, by the carriage 233 being moved to drive the recording heads 234 in accordance with an image signal, ink droplets are jetted to record one line over the sheet 242 that is being stopped. After the sheet 242 is conveyed by a predetermined amount, the next line is recorded on the sheet. Upon reception of a recording completion signal or a signal indicating an arrival of the rear end of the sheet 242 to the recording region, the recording operation is terminated, and the sheet 242 is discharged onto the sheet discharging tray 203.

As described above, this image forming apparatus can form high-quality images stably because it includes the liquid jet head of the present invention as the recording head.

Note that the material of the "sheet" is not limited to paper, and the term "sheet" encompasses those referred to as a recording receiving medium, a recording medium, a recording paper, a recording sheet of paper, etc. Furthermore, image formation, recording, and printing are synonyms. Further, the term "liquid jet apparatus" encompasses an image forming apparatus, and refers to an apparatus configured to jet a liquid onto a medium.

Furthermore, the term "image" is not limited to a planar image, but encompasses an image applied to a three-dimensional object, and an image formed up three-dimensionally as a steric object.

Yet further, the term "image forming apparatus" encompasses both of a serial image forming apparatus and a line image forming apparatus, unless particularly limited.

The driving element is not limited to a piezoelectric actuator, and may be a static actuator composed of a vibration plate and an opposite electrode.

In the above description, the liquid jet head of the present invention is applied as an inkjet head. However, it may also be applied as a liquid jet head for jetting any other liquid than an ink, such as a liquid resist for patterning, and as a liquid jet head for jetting a genetic test sample.

EXAMPLES

Examples of the present invention will be described below. However, the present invention is not limited to these Examples by any means.

Examples 1 to 7 and Comparative Examples 1 to 3

—Production of Resin Composition and Cured Product (Resin Layer) Thereof—

An epoxy compound, a curing agent, a curing catalyst, and a coupling agent shown in Tables 1 to 3 were added together, and stirred for 15 minutes while being cooled, to thereby obtain a resin composition before cured.

Next, as resistance to a liquid to be jetted that would be critical for a liquid jet apparatus, a swelling rate of the resin composition, a glass transition temperature (Tg) thereof in case the liquid would be jetted by being heated in order for the viscosity of the liquid to be lowered, and an amount of resin composition components to be eluted in the liquid to be jetted, were evaluated. The results are shown in Tables 1 to 3.

—Production of Resin Layer Evaluation Sample—

The resin compositions of Comparative Examples 1 to 3 and Examples 1 to 7 were filled in a mold, heated and cured at 80° C. for 3 hours, and then released from the mold, to thereby produce cured products (resin layers) of the resin compositions having a width of 10 mm, a length of 500 mm, and a thickness of 1 mm.

<Swellability Test>

The cured product of each resin composition was immersed (at 50° C., for 40 hours, ultrasonically) in an evaluation-purpose test liquid obtained by mixing N-methyl pyrrolidone and pure water at a ratio of 1:1, and a swelling rate thereof was calculated according to the mathematical formula below based on the masses of the cured product before and after the immersion in the test liquid.

Swelling rate (%)=[(mass after test−initial mass)/initial mass]×100 —Mathematical Formula 1—

—Evaluation Criteria—
A: The swelling rate was less than 3%.
B: The swelling rate was 3% or higher but less than 5%.
C: The swelling rate was 5% or higher but less than 10%.
D: The swelling rate was 10% or higher.

<Glass Transition Temperature (Tg) Measurement>

The glass transition temperature (Tg) of the cured product of each resin composition obtained by curing at 80° C. for 3 hours was obtained by measuring a temperature at which the calorific capacity of the cured product would change according to DSC method (with a thermal analysis instrument THERMO PLUS manufactured by Rigaku Corporation). The glass transition temperature was evaluated based on the criteria below.

—Evaluation Criteria—
A: The glass transition temperature was 70° C. or higher.
B: The glass transition temperature was 65° C. or higher but lower than 70° C.
C: The glass transition temperature was 55° C. or higher but lower than 65° C.
D: The glass transition temperature was lower than 55° C.

<Elution Amount Test>

Each cured product obtained by curing at 80° C. for 3 hours was immersed (at 60° C. for 1 week) in an evaluation-purpose test liquid obtained by mixing N-methyl pyrrolidone and pure water at a volume ratio of 1:1, and optical absorption spectra of the cured product before and after the immersion in the test liquid were measured with U-3310 manufactured by Hitachi, Ltd. An elution amount was calculated based on the difference (Δ) between the spectra, and evaluated based on the criteria below.

—Evaluation Criteria—
A: The elution amount was less than 0.3 abs.
B: The elution amount was 0.3 abs or greater but less than 0.5 abs.
C: The elution amount was 0.5 abs or greater but less than 1.0 abs.
D: The elution amount of 1.0 abs or greater.

TABLE 1

| | Name of component | Comp. Ex. 1 Preparation Ex. 1 | Comp. Ex. 2 Preparation Ex. 2 | Ex. 1 Preparation Ex. 3 | Ex. 2 Preparation Ex. 4 |
|---|---|---|---|---|---|
| Epoxy compound | EP1 (bisphenol A) | 50 | 100 | 25 | |
| | EP2 (bisphenol F) | 50 | | 25 | |
| | EP3 (cresol novolac type) | | | 50 | 60 |
| | EP4 (dicyclopentadiene (DCPD) type epoxy resin) | | | | |
| | EP5 (diluted DCPD type) | | | | |
| | EP6 (aminophenol type epoxy resin) | | | | 40 |
| Curing agent | PA-1 (polyamine) | 18 | | | |
| | T-1 (trimethylol propane tris (3-mercaptobutyrate)) | | 72 | 99 | 131 |
| | T-2 (DPMP) | | | | |
| | T-3 (TTIC) | | | | |
| Curing catalyst | IM-3 (Liquid 1) | | 1 | 1 | 2 |
| | IM-7 (Liquid 2) | | | | |
| Coupling agent | C-1 (glycidoxypropyl trimethoxysilane) | | 2 | 2 | 2 |
| | C-2 (aminopropyl-triethoxysilane) | 2 | | | |
| Evaluation result | Swellability | D | D | B | B |
| | Glass transition temperature (Tg) | B | B | C | C |
| | Elution amount | C | D | C | B |

TABLE 2

| | Name of component | Ex. 3 Preparation Ex. 5 | Ex. 4 Preparation Ex. 6 | Ex. 5 Preparation Ex. 7 | Ex. 6 Preparation Ex. 8 | Ex. 7 Preparation Ex. 9 |
|---|---|---|---|---|---|---|
| Epoxy compound | EP1 (bisphenol A) | | | | | |
| | EP2 (bisphenol F) | | | | | |
| | EP3 (cresol novolac type) | | | | | |
| | EP4 (dicyclopentadiene (DCPD) type epoxy resin) | 40 | 72 | 72 | 72 | 72 |
| | EP5 (diluted DCPD type) | | 3 | 3 | 3 | 3 |
| | EP6 (aminophenol type epoxy resin) | 60 | 25 | 25 | 25 | 25 |
| Curing agent | PA-1 (modified aliphatic amine) | | | | | |
| | T-1 (trimethylol propane tris (3-mercaptobutyrate)) | | | | | |
| | T-2 (DPMP) | 83 | 76 | 76 | | 76 |
| | T-3 (TTIC) | | | | 68 | |
| Curing catalyst | IM-3 (Liquid 1) | 1 | 1 | | 1 | 1 |
| | IM-7 (Liquid 2) | | | 1 | | |
| Coupling agent | C-1 (glycidoxypropyl trimethoxysilane) | 2 | 2 | 2 | 2 | |
| | C-2 (aminopropyl-triethoxysilane) | | | | | 2 |

TABLE 2-continued

| Name of component | | Ex. 3 Preparation Ex. 5 | Ex. 4 Preparation Ex. 6 | Ex. 5 Preparation Ex. 7 | Ex. 6 Preparation Ex. 8 | Ex. 7 Preparation Ex. 9 |
|---|---|---|---|---|---|---|
| Evaluation result | Swellability | A | A | A | A | A |
| | Glass transition temperature (Tg) | A | A | A | A | A |
| | Elution amount | C | A | A | A | A |

TABLE 3

| Name of component | | Comp. Ex. 3 Preparation Ex. 10 |
|---|---|---|
| Epoxy compound | EP7 (flexible liquid state) | 70 |
| | EP8 (flexible + containing F) | 30 |
| Curing agent | PA-2 (polyamine) | 41 |
| Photocatalyst | EH-1 (solid) | — |
| Curing catalyst | IM-3 (Liquid 1) | — |
| | IM-7 (Liquid 2) | — |
| Coupling agent | C-1 (glycidoxypropyl trimethoxysilane) | — |
| | C-2 (aminopropyl triethoxysilane) | 2 |
| Evaluation result | Swellability | D |
| | Glass transition temperature (Tg) | B |
| | Elution amount | D |

EP1: Bisphenol A glycidyl ether (epoxy equivalent: 190 g/eq)

[Chem. 41]

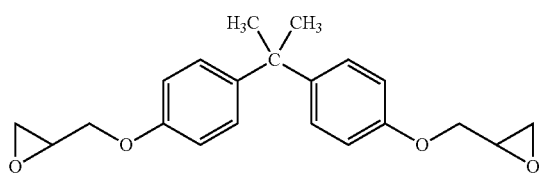

EP2: Bisphenol F glycidyl ether (epoxy equivalent: 170 g/eq)

[Chem. 42]

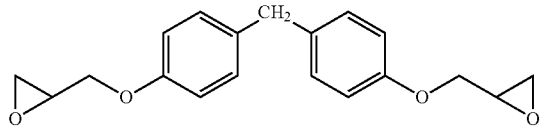

EP3: Cresol novolac epoxy resin (epoxy equivalent: 160 g/eq)

[Chem. 43]

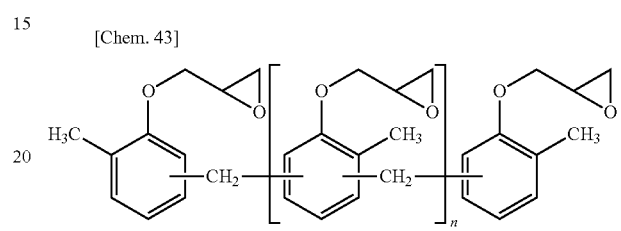

EP4: Dicyclopentadiene phenol type epoxy resin (epoxy equivalent: 239 g/eq)

[Chem. 44]

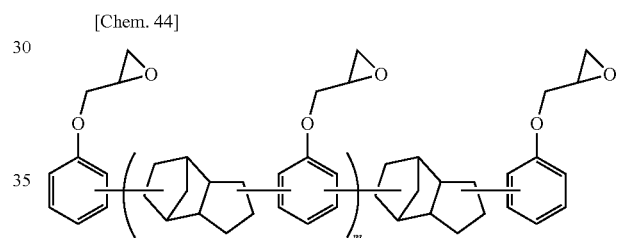

In the formula above, m represents 0.2.

EP5: Dicyclopentadiene dimethanol type epoxy resin (epoxy equivalent: 165 g/eq)

[Chem. 45]

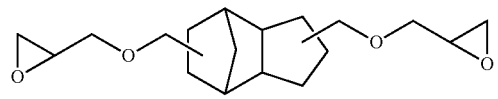

EP6: Amino phenol epoxy resin shown below (epoxy equivalent: 95 g/eq)

[Chem. 46]

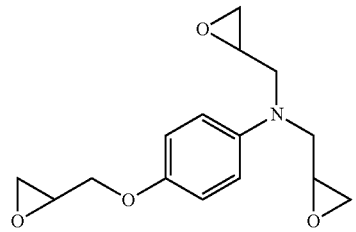

EP7: Bisphenol hexafluoroisopropyl glycidyl ether
EP8: EPIKOTE 871 manufactured by Mitsubishi Chemical Corporation
—Curing Agent—
PA-1 (polyamine): (TO184 manufactured by Mitsubishi Chemical Corporation)
PA-2 (polyamine): (#296 manufactured by Fuji Kasei Co., Ltd.
T-1: Trimethylolpropane tris(3-mercaptobutyrate)
T-2: Dipentaerythritol hexakis(3-mercaptopropionate)
T-3: 1,3,5-tris(3-mercaptopropyl)-1,3,5-triazine-2,4,6 (1H,3H,5H)-trione
—Curing Catalyst—

[Chem. 47]

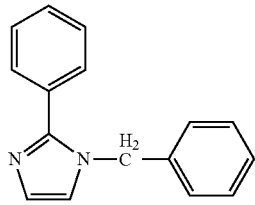

IM-3

[Chem. 48]

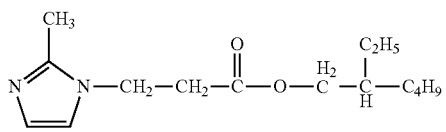

IM-7

—Coupling Agent—
C-1: 3-glycidoxypropyltrimethoxysilane (KBM-403 manufactured by Shin-Etsu Chemical Co., Ltd.)
C-2: 3-aminopropyltriethoxysilane (KBE-903 manufactured by Shin-Etsu Chemical Co., Ltd.)

From the above results, Comparative Examples 1, 2, and 3 did not satisfy the required specifications, as they did not satisfy the specified value for swellability and had a high elution amount, although they satisfied the specified value for glass transition temperature (Tg). As apparent from the results of swellability, their resin layer absorbed the ink and swelled. Further, due to the swell of the bonded portions, their Young's modulus lowered, which reduced the stiffness of the flow path portion, and significantly reduced the pressure in the flow path for flowing the ink, leading to significant degradation of the jetting reliability of the head.

Example 1 achieved a better swellability, and satisfied the required specifications. It was estimated that the selection of a cresol novolac-type multifunctional resin for the resin layer provided a better swellability and a better ink resistance.

Example 2 achieved a better performance than Example 1 in terms of elution, and satisfied the required specifications in addition to the better ink resistance. It was estimated that the use of an aminophenol-type epoxy resin having a low epoxy equivalent and a low molecular weight for the resin layer made it possible to compensate for reactions of a trace amount of unreacted portions, which led to the better performance in elution and to the better ink resistance.

Example 1 and Example 2 had a low glass transition temperature (Tg). The low glass transition temperature (Tg), although non-problematic for ordinary business printers, would be problematic for industrial printers in terms of reliability in a heat cycle, because the head may be heated to 40° C. to 60° C. in order to lower the viscosity of the ink to be jetted.

Example 3 achieved a by-far better performance than Example 1 in swellability and glass transition temperature (Tg), and satisfied the required specifications in addition to the better ink resistance and the better heat resistance. It was estimated that the use of a dicyclopentadiene-type epoxy resin for the resin layer made it possible to obtain a multi-functional structure that had a high epoxy equivalent and was bulky as is specific to dicyclopentadiene, and that the use of hexafunctional T-2 (DPMP) having a low molecular weight and a low active hydrogen concentration made it possible to realize both of a network structure hard for the ink to permeate, and a high glass transition temperature, which led to the better ink resistance and the better heat resistance. Example 3 had a high glass transition temperature (Tg), and hence would be used non-problematically for industrial printers that may be heated during use.

Examples 4, 5, 6, and 7 achieved a by-far better performance than Example 3 in elution, and satisfied the required specifications in addition to a yet better ink resistance and heat resistance. It was estimated that the introduction of a dicyclopentadiene-type reactive diluent in addition to the configuration of Example 3 made it possible to reduce unreacted portions, which lead to the better performance in elution.

Examples 4, 5, and 6 had a low amount of elution, and hence would be able to have resistance to a wide variety of inks, and would be able to be used highly reliably with various inks with industrial printers that may be heated during use.

Examples 8 to 18 and Comparative Examples 4 to 8

—Evaluation of Ink Swellability, Initial Bondability, and Bonding Reliability—

An ink swellability test was performed in the manner described below. The results are shown in Tables 7 to 9. Further, as a position maintaining function of the resin layer, initial bondability and bonding reliability were evaluated as described below by bonding members (a nozzle plate and a flow path plate) together. The results are shown in Tables 7 to 9.

<Treatment Layer Production Examples 1 and 2>

As shown in Table 4, a surface treatment was applied to a debonding test sample and an ink swellability test sample.

The evaluation was performed with treatment layers, which were Zr-incorporated $SiO_2$ films fixed to a Si:Zr element ratio of 2:1. The film formation method for the metal species to be incorporated into the $SiO_2$ film was multitarget sputtering. Si and Zr targets were set, $O_2$ was introduced as a reactive gas, and the powers for both of the targets were controlled so that the element ratio would be fixed.

TABLE 4

|  | Production Ex. 1 | Production Ex. 2 |
|---|---|---|
| Film type | $SiO_2$ | SiTaO$x$ Element ratio: Si:Ta:O = 22:11:67 |
| Film thickness | 50 nm | 50 nm |

*Any other element than those described above in the treatment layer was 10 at % or less.

<Debonding Test Piece>

As debonding test pieces, single-crystal Si pieces having a width of 17 mm and a thickness of 400 μm were each machined to have four lines of slits that were shifted at a slit position pitch of 42.3 μm and that each was formed at a pitch of 150 dpi for a width of 140 μm and a length of 2,000 μm (with a bonding area rate of 64.7%).

<Surface Treatment>

A surface treatment was applied to the respective debonding test pieces. As the surface treatment for evaluation, a $SiO_2$ film and a Ta-introduced $SiO_2$ film were applied. As the film formation method, multitarget sputtering was employed to form a film over the samples. The conditions of the treatment layers are sown in Table 4.

<Bonding>

The resin compositions shown in Tables 7 to 9 were applied over the bonding surface of the respective debonding test pieces to an application thickness of 2.5 μm. Then, the debonding test pieces were overlapped with either a rolled SUS flat plate sample made of SUS304 and having a width of 19 mm and a thickness of 20 μm, over which the treatment layer of Production Example 1 was formed, or the same rolled SUS flat plate sample, over which the treatment layer of Production Example 2 was formed, and heated while being pressurized at 10 cN·m, so that they would be bonded by curing at 80° C. for 3 hours. This process was adjusted so that the resin layer resulting from the bonding would have an average thickness of 1.5 μm. In this way, respective debonding test samples were produced.

<Production of Ink Swellability Test Sample>

As ink swellability test samples, the resin compositions shown in Tables 7 to 9 were filled in a mold, heated and cured at 80° C. for 3 hours, and then released from the mold, to thereby produce cured products of the resin compositions having a width of 10 mm, a length of 500 mm, and a thickness of 1 mm.

Ink Preparation Example 1

—Synthesis of Amide Compound Having Structural Formula (1)—

N,N-dimethylacrylamide (19.828 g) and 1-butanol (14.824 g) were put in a 300 mL separable flask equipped with a stirrer, a thermocouple, and a nitrogen gas introduction tube, and stirred with a nitrogen gas introduced.
Next, sodium t-butoxide (0.388 g) was added thereto, and they were reacted at 35° C. for 4 hours. After heating was completed, phosphoric acid (150 mg) was added thereto, and the resulting solution was homogenized, and then left untouched for 3 hours. The solution was filtered to remove a deposited matter, and further deprived of any unreacted matter with an evaporator. The yield was 30.5 g (with a yield constant of 88%).
The obtained substance was subjected to $^1$H-NMR measurement, and the followings were observed: 0.95 ppm (3H), 1.3 ppm (4H)-1.5 ppm (4H), 2.4 ppm (2H), 2.9 ppm (6H), 3.4 ppm (2H), and 3.7 ppm (2H). Hence, the obtained substance turned out to be the amide compound represented by the structural formula (1) below.

<Amide Compound of Structural Formula (1)>

[Chem.49]

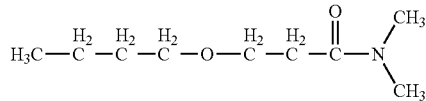

—Preparation of Surface-Reformed Black Pigment Dispersion 1—

BLACK PEARLS (Registered Trademark) 1000 manufactured by Cabot Corporation (carbon black with a BET surface area of 343 $m^2$/g, and 105 mL/100 g of DBPA) (100 g), a compound represented by the structural formula (VI) below (100 millimole), and ion-exchanged high purity water (1 L) were mixed at room temperature with a SILVERSON mixer (6,000 rpm).

When the obtained slurry had pH higher than 4, nitric acid (100 millimole) was added thereto. Thirty minutes later, sodium nitrite (100 millimole) dissolved in a trace amount of ion-exchanged high purity water was slowly added to the above mixture. Then, the mixture was heated to 60° C. while being stirred, and reacted for 1 hour. In this way, a reformed pigment, which was carbon black to which a compound represented by the structural formula (VI) below was added, was produced.

<Compound of Structural Formula (VI)>

[Chem. 50]

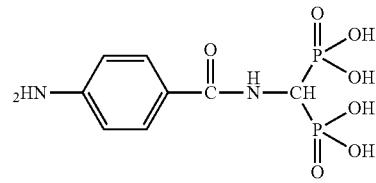

Then, the reformed pigment was adjusted to pH of 10 with a NaOH aqueous solution, to thereby obtain a reformed pigment dispersion 30 minutes later.

Together with ion-exchanged high purity water, the dispersion containing the pigment bound with at least one geminal bisphosphonic acid group or geminal bisphosphonic acid sodium salt was subjected to ultrafiltration with a dialysis membrane, and further subjected to ultrasonic dispersion, to thereby obtain a reformed pigment dispersion condensed to a pigment solid content of 20% by mass.

A surface treatment level of the obtained reformed pigment dispersion was 0.75 mmol/g, and a volume average particle diameter (D50) thereof measured with a granularity distribution analyzer (NANOTRACK UPA-EX150 manufactured by Nikkiso Co., Ltd.) was 120 nm.

Further, a sodium ion content thereof measured with a TOA-DKK ION METER IM-32P was 27,868 ppm, and a phosphorus (P) content thereof measured by an element analysis was 2.31% by mass.

—Production of Water-Based Inkjet Ink—

As shown in Ink Prescription Table 5 below, a water-soluble organic solvent, a wetting agent, a permeation agent, a surfactant, a mildewcide, and water were mixed, and stirred for 1 hour to be mixed uniformly.

Next, a water-dispersible colorant (pigment dispersion), a defoaming agent, and a pH adjustor were added thereto, and they were mixed for 1 hour. The resultant was subjected to pressure filtration through a polyvinylidene fluoride membrane filter having an average por diameter of 1.2 μm to remove coarse particles and litters, to thereby produce a water-based inkjet ink.

TABLE 5

| Component (% by mass) | | Water-based ink |
|---|---|---|
| Water-dispersible colorant | Surface-reformed black pigment dispersion 1 (Preparation Ex. 1) | 37.5 |
| Water-soluble organic solvent | Amide compound of Structural Formula (1) | 10 |
| | Compound of Structural Formula (8) | 10 |
| | Amide compound of Structured Formula (V) | 10 |
| Wetting agent | Glycerin | 10 |
| Permeation agent | 2-ethyl-1,3-hexanediol | 2 |
| Surfactant | Compound of General Formula (VIIa)-(q) | 0.1 |
| Mildewcide | PROXEL GXL | 0.05 |
| Defoaming agent | 2,4,7,9-tetramethyldecane-4,7-diol | 0.4 |
| pH adjustor | 2-amino-2-ethyl-1,3-propanediol | 0.2 |
| | Pure water | Balance |
| Total (% by mass) | | 100 |

Brevity codes, etc. in Table 5 stand for the followings.
PROXEL GXL: A mildewcide containing 1,2-benzisothiazolin-3-one as a main component (manufactured by Avecia Inc., main component: 20% by mass, containing dipropylene glycol)
Amide compound of Structural Formula (1) below

[Chem. 51]

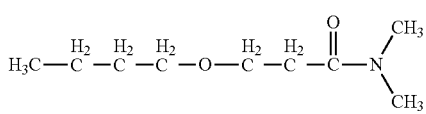

Compound of Structural Formula (8) below

[Chem. 52]

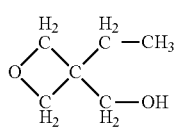

Amide compound represented by Structural Formula (V) below

[Chem. 53]

Structural Fromula (V)

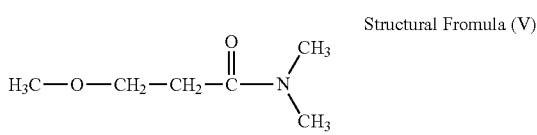

Compound of General Formula (VIIa)-(q)

Ink Preparation Example 2

—Production of Solvent-Based Inkjet Ink—
Organic solvents (reagents manufactured by Kanto Chemical Co., Inc.) shown in Ink Prescription Table 6 below were mixed, and stirred for 1 hour to be mixed uniformly. SOLSPERSE 37500 (product name, manufactured by Lubrizol Corporation), and C.I. pigment black 7 (product name: "CARBON BLACk #970" manufactured by Mitsubishi Chemical Corporation) were added to the mixture liquid, and they were stirred in an ice bath with EXCEL AUTO HOMOGENIZER manufactured by Nissei Corporation at 5,000 rpm for 30 minutes, so that they would be dispersed to an aggregation-free state. After this, they were dispersed with a multilaboratory-type beads mill DYNO-MIL manufactured by Shinmaru Enterprises Corporation filled with zirconia beads having a diameter of 0.3 mm, to thereby obtain a pigment dispersion liquid (with a pigment average particle diameter of 150 nm).

The remaining amount of the organic solvents, BYK-340 (a fluorosurfactant manufactured by Byk-Chemie GmbH), and PARALOID B60 (an acrylic resin manufactured by Rohm & Haas Corporation) were added to the obtained pigment dispersion liquid, and they were mixed and stirred for 1 hour and then subjected to pressure filtration through a polytetrafluoroethylene (PTFE) membrane filter having an average pore diameter of 5 μm to remove coarse particles and litters, to thereby produce a solvent-based inkjet ink.

TABLE 6

| Component (% by mass) | | Solvent-based ink |
|---|---|---|
| Pigment | C.I. pigment black 7 | 4 |
| Dispersant | SOLSPERSE 37500 | 4 |
| Organic solvent | Ethylene glycol-n-butylether acetate | 59 |
| | Amyl propionate | 14 |
| | Cyclohexanone | 7 |
| | Dipropylene glycol monomethyl ether | 5 |
| | N-methyl pyrrolidone | 1 |
| Surfactant | BYK-340 | 2 |
| Binder resin | PARALOID B60 | 4 |
| Total (% by mass) | | 100 |

<Ink Swellability Test>

The produced ink swellability test samples (cured products of the resin compositions) were immersed in the inks shown in Tables 7 to 9 respectively (at 50° C., for 40 hours, ultrasonically), and a swelling rate of the samples was calculated according to the mathematical formula 1 below based on the masses of the samples before and after the immersion in the inks.

Swelling rate=[(mass after test−initial mass)/initial mass]×100    —Mathematical Formula 1—

—Evaluation Criteria—
A: The swelling rate was less than 3%.
B: The swelling rate was 3% or higher but less than 5%.
C: The swelling rate was 5% or higher but less than 10%.
D: The swelling rate was 10% or higher.

<Initial Bondability>

With a desktop material testing machine (TENSILON STA-1150 manufactured by Orientec Co., Ltd.), each debonding test sample was subjected five times to 90°-direction debonding strength measurement at a rate of 1 mm/min to measure the debonding strength at the time when the debonding distance reached 5 mm. An average debonding strength was calculated, and initial bondability was evaluated based on the criteria below.

—Evaluation Criteria—
A: The average debonding strength was 1.2 N or greater.
B: The average debonding strength was 1.0 N or greater but less than 1.2 N.
C: The average debonding strength was 0.5 N or greater but less than 1.0 N.

D: The average debonding strength was less than 0.5 N.

Note that the required spec for the average debonding strength was 0.5N or greater (A to C).

<Bonding Reliability>

The respective samples after the debonding strength test were subjected to an ink resistance test and immersed in the inks shown in Tables 7 to 9 (ink immersion, at 60° C., for 60 days), and then subjected to a debonding test.

With a desktop material testing machine (TENSILON STA-1150 manufactured by Orientec Co., Ltd.), each sample after the ink resistance test was subjected five times to 90°-direction debonding strength measurement at a rate of 1 mm/min to measure the debonding strength at the time when the debonding distance reached 5 mm. An average debonding strength was calculated, and bonding reliability was evaluated based on the criteria below.

—Evaluation Criteria—

A: The average debonding strength was 1.2 N or greater.

B: The average debonding strength was 1.0 N or greater but less than 1.2 N.

C: The average debonding strength was 0.5 N or greater but less than 1.0 N.

D: The average debonding strength was less than 0.5 N.

Note that the required spec for the average debonding strength was 0.5N or greater (A to C).

Particularly, Example 10 could achieve by-far better performance than Comparative Examples in the swelling rate, initial bondability, and bonding reliability. It was estimated that the cured product achieved a sufficient resistance to the solvent-based ink, and the solvent-based ink did not dissolve $SiO_2$ of the treatment layer, which saved shrinkage of the effective bonded portions and made it possible to obtain a sufficient bonding reliability.

Next, as in Examples 11 and 12, the use of Resin Composition Preparation Example 9 significantly improved the bonding reliability with respect to both of Ink Preparation Examples 1 and 2, making it possible to obtain a liquid jet head satisfying a high bonding reliability. It was estimated that the epoxy resin in Resin Composition Preparation Example 9 had cross-linked at a higher density and cured, which prevented invasion or permeation of the ink into the resin layer during the ink immersion, leading to the high bonding reliability.

Further, Example 12 could achieve better performance than Example 9 in initial bondability and bonding reliability, making it possible to obtain a liquid jet head satisfying a high bonding reliability. It was estimated that a highly polar amino group-containing coupling agent contained in the epoxy resin of Resin Composition Preparation Example 9 made the epoxy resin capable of reacting with or adsorbing

TABLE 7

|  | Comp. Ex. 4 | Comp. Ex. 5 | Ex. 8 | Ex. 9 | Ex. 10 | Ex. 11 | Ex. 12 |
| --- | --- | --- | --- | --- | --- | --- | --- |
| Treatment layer production Ex. | Production Ex. 1 $SiO_2$ | Production Ex. 1 $SiO_2$ | Production Ex. 1 $SiO_2$ | Production Ex. 2 SiTaO | Production Ex. 1 $SiO_2$ | Production Ex. 2 SiTaO | Production Ex. 2 SiTaO |
| Resin composition preparation Ex. | Preparation Ex. 1 | Preparation Ex. 1 | Preparation Ex. 6 | Preparation Ex. 6 | Preparation Ex. 6 | Preparation Ex. 9 | Preparation Ex. 9 |
| Average thickness of resin layer | 1.5 μm | 1.5 μm | 1.5 μm | 1.5 μm | 1.5 μm | 1.5 μm | 1.5 μm |
| Ink preparation Ex. | Water Preparation Ex. 1 | Solvent Preparation Ex. 2 | Water Preparation Ex. 1 | Water Preparation Ex. 1 | Solvent Preparation Ex. 2 | Water Preparation Ex. 1 | Solvent Preparation Ex. 2 |
| Ink swellability | C | D | A | A | B | A | B |
| Initial bondability | B | B | A | C | A | A | A |
| Bonding reliability | D | D | B | C | B | A | B |

From the results of Table 7, Comparative Examples 4 and 5 did not satisfied the required specifications, because although they satisfied the specified value for initial bondability, they did not satisfy the required value for swellability, had a relatively low bonding reliability, and had a low ink resistance reliability. As obvious from the results of swellability, it was estimated that their resin layer, which was a cured product of a resin composition, absorbed the ink and swelled to thereby reduce the stiffness and strength. Further, observation of the interface between the resin layer and the single-crystal Si member revealed that the interface at bonded portions over partition walls of the Si member was corroded to have the resin composition attacked by the ink and have the effective bonded portions shrink or disappear. From the results above, it was estimated that the bonding strength was reduced significantly.

Further, due to the shrinkage of the bonded portions, the stiffness of the flow path portion was reduced, and the pressure in the flow path for flowing the ink was also reduced significantly, which led to significant degradation of the jetting reliability of the head.

As in Examples 8 to 10, the use of Resin Composition Preparation Example 6 made it possible to achieve by-far better performance in swellability with respect to both of Ink Preparation Examples 1 and 2, making it possible to obtain a liquid jet head satisfying bonding reliability.

even SiTaOx containing a Ta compound having a low activity, which made it possible to obtain a high interface strength. It was estimated that a liquid jet head having a better initial bondability and a better bonding reliability could be obtained as a result.

TABLE 8

|  | Comp. Ex. 6 | Comp. Ex. 7 | Comp. Ex. 8 |
| --- | --- | --- | --- |
| Treatment layer production Ex. | Production Ex. 1 $SiO_2$ | Production Ex. 1 $SiO_2$ | Production Ex. 1 $SiO_2$ |
| Resin composition preparation Ex. | Preparation Ex. 10 | Preparation Ex. 1 | Preparation Ex. 2 |
| Average thickness of resin layer | 1.5 μm | 1.5 μm | 1.5 μm |
| Ink preparation Ex. | Water Preparation Ex. 1 | Water Preparation Ex. 1 | Water Preparation Ex. 1 |
| Ink swellability | C | C | C |
| Initial bondability | B | B | B |
| Bonding reliability | D | D | D |

TABLE 9

|  | Ex. 13 | Ex. 14 | Ex. 15 | Ex. 16 | Ex. 17 | Ex. 18 |
|---|---|---|---|---|---|---|
| Treatment layer production Ex. | Absent | Production Ex. 1 SiO$_2$ | Production Ex. 1 SiO$_2$ | Production Ex. 1 SiO$_2$ | Production Ex. 1 SiO$_2$ | Production Ex. 1 SiO$_2$ |
| Resin composition preparation Ex. | Preparation Ex. 6 | Preparation Ex. 3 | Preparation Ex. 4 | Preparation Ex. 5 | Preparation Ex. 7 | Preparation Ex. 8 |
| Average thickness of resin layer | 1.5 μm | 1.5 μm | 1.5 μm | 1.5 μm | 1.5 μm | 1.5 μm |
| Ink preparation Ex. | Water Preparation Ex. 1 | Water Preparation Ex. 1 | Water Preparation Ex. 1 | Water Preparation Ex. 1 | Water Preparation Ex. 1 | Water Preparation Ex. 1 |
| Ink swellability | A | B | B | A | A | A |
| Initial bondability | B | C | C | B | A | A |
| Bonding reliability | C | C | C | C | B | B |

From the results of Tables 8 and 9, Comparative Examples 6 to 8 did not satisfied the required specifications, because although they satisfied the specified value for initial bondability, they did not satisfy the required value for ink swellability, had a relatively low bonding reliability, and had a low ink resistance reliability. As obvious from the results of swellability, it was estimated that their resin layer, which was a cured product of a resin composition, absorbed the ink and swelled to thereby reduce the stiffness and strength. Further, observation of the interface between the resin layer and the single-crystal Si member revealed that the interface at bonded portions over partition walls of the Si member was corroded to have the resin composition attacked by the ink and have the effective bonded portions shrink or disappear. From the results above, it was estimated that the bonding strength was reduced significantly.

Further, due to the shrinkage of the bonded portions, the stiffness of the flow path portion was reduced, and the pressure in the flow path for flowing the ink was also reduced significantly, which led to significant degradation of the jetting reliability of the liquid jet head.

Next, as in Examples 14 and 15, the use of Resin Composition Preparation Examples 3 and 4 made it possible to achieve better performance in ink reliability. It was estimated that the use of the cresol novolac-type epoxy resin containing epoxy groups at a high density and having a high molecular weight as a raw material made it possible to obtain a cured product having a low water absorptivity. The suppression of ink permeation enabled improvement of also bonding reliability.

Next, as in Examples 13 and 16, the use of Resin Composition Preparation Examples 5 and 6 made it possible to achieve better performance in ink swellability and initial bondability. It was estimated that the use of the dicyclopentadiene structure-incorporated novolac-type epoxy resin, which could form a bulky structure, made it possible to obtain a structure that was highly dense despite a low molecular weight thereof, and also made it possible to improve the bonding strength.

Next, as in Examples 17 and 18, the use of Resin Composition Preparation Examples 7 and 8 made it possible to achieve by-far better performance than Comparative Examples in bonding reliability, in addition to swellability and initial bondability. It was estimated that the incorporation of the dicyclopentadiente-type low-molecular weight epoxy resin led to an extremely dense linkage network of the cured product, which significantly suppressed the amount of the cured product eluted in the ink during the ink immersion. This made it possible to significantly suppress permeation of the ink into the resin layer and degeneration of the resin layer, which in turn made it possible to suppress corrosion of SiO$_2$, which was the treatment layer of the constituent parts and members.

Examples 19 to 24

—Evaluation of Average Thickness, Initial Bondability (Bonding Strength), and Bonding Strength Retention Rate (Bonding Reliability) of Adhesive Layer—

Initial bondability and bonding strength retention rate of adhesive layers, of which average thickness was varied in the manner described below, were evaluated. The results were shown in Table 10 and FIG. 15.

<Initial Bondability>

Single-crystal Si pieces having a width of 17 mm and a thickness of 400 μm was each machined to have four lines of slits that were shifted at a slit position pitch of 42.3 μm and that each was formed at a pitch of 150 dpi for a width of 140 μm and a length of 2,000 μm, and the treatment layer of Production Example 1 was formed over each single-crystal Si piece (with a bonding area rate of 64.7%). Resin Composition Preparation Example 9 was applied over the bonding surface of each resulting single-crystal Si piece such that the thickness of the resin layer would be larger than the intended thickness by 1 μm. Each resulting single-crystal Si piece was overlapped with a rolled SUS flat plate made of SUS5304 and having a width of 19 mm and a thickness of 20 μm, over which the treatment layer of Production Example 1 was formed, and they were heated while being pressurized at 10 cN·m, such that the resin composition would be cured at 80° C. for 3 hours.

The thickness of the resin layers was adjusted with a gap agent (MICROPEARL manufactured by Sekisui Chemical Co., Ltd.). For example, FIG. 16 is a cross-sectional image of a bonded portion where the average thickness of the resin layer was adjusted to 1.8 μm with a gap agent having a particle diameter of 1.5 μm. FIG. 17 is a cross-sectional image of a bonded portion where the average thickness of the resin layer was adjusted to 2.9 μm with a gap agent having a particle diameter of 3.0 μm.

The thickness of the resin layer was observed with an electron microscope (SEM: Scanning Electron Microscope), after the bonded sample was embedded in an epoxy resin and machined with a polishing machine to enable a desired cross-section to be observed.

With a desktop material testing machine (TENSILON STA-1150 manufactured by Orientec Co., Ltd.), each bonded and cured sample was subjected five times to 90°-direction debonding strength measurement at a rate of 1 mm/min to measure the debonding strength at the time when the debonding distance reached 5 mm. An average debonding strength was calculated, and initial bondability was evaluated based on the criteria below.
—Evaluation Criteria—
A: The average debonding strength was 1.2 N or greater.
B: The average debonding strength was 1.0 N or greater but less than 1.2 N.
C: The average debonding strength was 0.5 N or greater but less than 1.0 N.
D: The average debonding strength was less than 0.5 N.
Note that the required spec for the average debonding strength was 1.0 N or greater (A and B).
<Bonding Reliability>
The respective samples after the initial bondability evaluation were subjected to an ink resistance test (ink immersion, at 60° C., for 60 days). The ink used for the ink resistance test was the ink shown in Prescription Table 5 (Ink Preparation Example 1).
With a desktop material testing machine (TENSILON STA-1150 manufactured by Orientec Co., Ltd.), initial bonding strength and bonding strength after immersion of each sample after the ink resistance test were measured. A bonding strength retention rate (%) was calculated according to a formula: bonding strength retention rate (%)=(bonding strength after immersion/initial bonding strength)×100, and bonding reliability was evaluated based on the criteria below.
—Evaluation Criteria—
A: 90% or higher
B: 70% or higher but less than 90%
C: 50% or higher but less than 70%
D: Less than 50%
Note that the required spec was 50% or higher (A to C).

TABLE 10

|  | Ex. 19 | Ex. 20 | Ex. 21 | Ex. 22 | Ex. 23 | Ex. 24 |
|---|---|---|---|---|---|---|
| Resin Composition Preparation Ex. | 9 | 9 | 9 | 9 | 9 | 9 |
| Average thickness (μm) of resin layer | 0.5 | 1 | 1.5 | 2.0 | 2.5 | 3.0 |
| Initial bondability | C | B | A | A | A | A |
| Initial bonding strength (N) | 0.8 | 1.4 | 1.7 | 1.8 | 2 | 2 |
| Bonding reliability | A | A | B | B | C | D |
| Bonding strength retention rate (%) | 100 | 100 | 88 | 67 | 60 | 40 |

From the results of Table 10, Example 19 satisfied the spec for bonding reliability, but achieved a low initial bondability and did not satisfy the required spec. This was because the cured product of the resin composition was an epoxy structure having a high crosslink density and hence a very high Young's modulus, which made it difficult to obtain a sufficient bonding strength when the average thickness of the resin layer was small.
As compared with this, Examples 23 and 24 satisfied the spec for initial bondability, but achieved a low bonding reliability and did not satisfy the required spec. This was because a resin layer with a larger average thickness incurred permeation of a hydrophilic organic solvent and the water content into the resin layer and the bonding interface to thereby promote debonding and reduce the bonding strength.

From the above results, it was possible to secure both of bonding reliability and initial bondability by prescribing the average thickness of the resin layer to 2.5 μm or less, which made it possible to secure the most critical bonding reliability, and by prescribing the average thickness of the resin layer to 1.0 μm or greater, which made is possible to secure a high initial strength.

Aspects of the present invention are as follows, for example.

<1>A liquid jet head, including:

a flow path composed of a first member, a resin layer, and a second member, wherein the resin layer contains a cured product of a resin composition containing: an epoxy compound represented by general formula (1) below; a polythiol compound having 2 or more thiol groups in a molecule thereof; and an imidazole compound represented by general formula (2) below,

[Chem. 54]

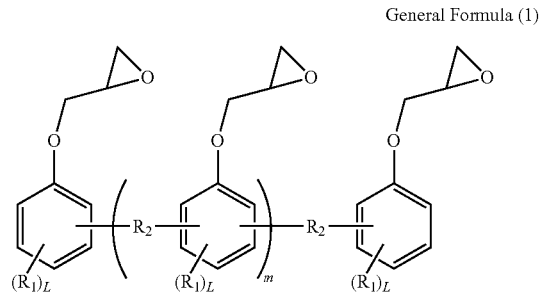

General Formula (1)

where in the general formula (1) above, L is an integer of 0 or greater but less than 3, m is a positive number of 0.1 or greater but less than 50, $R_1$ represents any one of a hydrogen atom, and an alkyl group having 1 to 4 carbon atoms, and $R_2$ represents a substituent represented by a formula,

[Chem. 55]

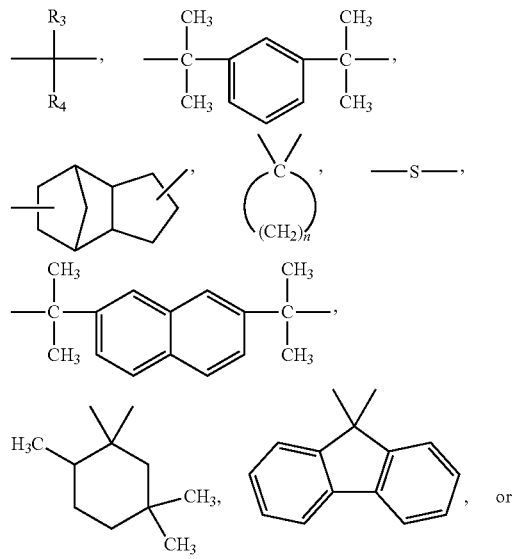

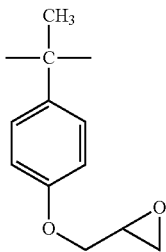

where $R_3$ and $R_4$ each independently represent any one of a hydrogen atom, and a non-substituted or fluorine-substituted methyl group, and n is an integer of from 4 to 12,

[Chem. 56]

General Formula (2)

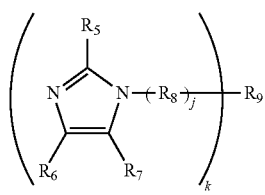

where in the general formula (2) above, k is 1 or greater but less than 6, j is 0 or 1, $R_5$, $R_6$, and $R_7$ each independently represent any one of a hydrogen atom, an alkyl group having 1 to 20 carbon atoms, and an aryl group, $R_8$ represents any one of an alkylene group having 1 to 20 carbon atoms, an arylene group, and —$CH_2CH_2COO$—, $R_9$ represents a hydrogen atom, an alkyl group having 1 to 20 carbon atoms, an aryl group, or a cyanomethyl group when k is 1, and represents a hydrocarbon group having 1 to 20 carbon atoms when k is 2 to 6.

<2> The liquid jet head according to <1>,
wherein in the general formula (2), j is 1.
<3> The liquid jet head according to <1> or <2>,
wherein the epoxy compound represented by the general formula (1) is an epoxy compound represented by general formula (3) below,

[Chem. 57]

General Formula (3)

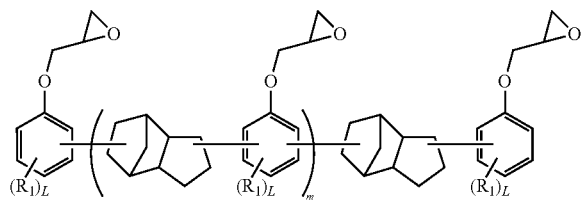

where in the general formula (3) above, L is an integer of 0 or greater but less than 3, m is a positive number of 0.1 or greater but less than 50, and $R_1$ represents any one of a hydrogen atom, and an alkyl group having 1 to 4 carbon atoms.

<4> The liquid jet head according to any one of <1> to <3>,
wherein the resin composition contains an epoxy compound represented by general formula (4) below,

[Chem. 58]

General Formula (4)

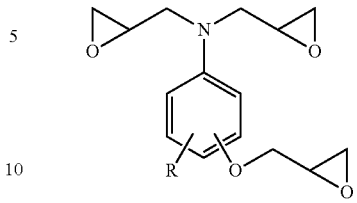

where in the general formula (4) above, R represents any one of a hydrogen atom, and an alkyl group having 1 to 4 carbon atoms.

<5> The liquid jet head according to any one of <1> to <4>,
wherein the resin composition contains an epoxy compound represented by general formula (5) below,

[Chem. 59]

General Formula (5)

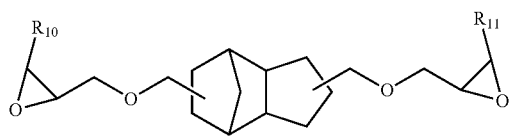

where in the general formula (5) above, $R_{10}$ and $R_{11}$ each independently represent any one of a hydrogen atom, and an alkyl group having 1 to 4 carbon atoms.

<6> The liquid jet head according to any one of <1> to <5>,
wherein a content of the epoxy compound represented by the general formula (1) is from 10 parts by mass to 100 parts by mass relative to a total epoxy compound amount of 100 parts by mass.

<7> The liquid jet head according to any one of <1> to <6>,
wherein the polythiol compound is at least one kind selected from the group consisting of dipentaerythritol hexa (3-mercaptobutyrate), and
1,3,5-tris(3-mercaptopropyl)-1,3,5-triazine-2,4,6(1H,3H,5H)-trione.

<8> The liquid jet head according to any one of <1> to <7>,
wherein the resin composition contains a silane coupling agent represented by general formula (6) below,

[Chem. 60]

General Formula (6)

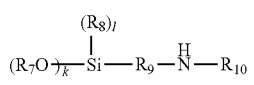

where in the general formula (6) above, $R_7$ and $R_8$ represent an alkyl group having 1 to 4 carbon atoms, $R_9$ represents any one of an alkylene group having 1 to 20 carbon atoms, and an arylene group, and $R_{10}$ represents any one of a hydrogen atom, an alkyl group having 1 to 20 carbon atoms, and an aryl group.

<9> The liquid jet head according to <8>,
wherein the silane coupling agent represented by the general formula (6) is at least one kind selected from the group consisting of 3-aminopropyl-trimethoxysilane, 3-aminopropyl triethoxysilane, N-(2-aminoethyl)aminopropyl trimethoxysilane, N-(2-aminoethyl)aminopropylmethyl dimethoxysilane, and 3-phenylaminopropyl trimethoxysilane.

<10> The liquid jet head according to any one of <1> to <9>,
wherein an interface at which at least any one of the first member and the second member contacts the resin layer includes a treatment layer, the treatment layer is an oxide containing Si, and the oxide contains a transition metal forming a passive layer over any one of the first member and the second member.

<11> The liquid jet head according to <10>,
wherein the treatment layer contains at least one transition metal selected from transition metals of Group IV and Group V.

<12> The liquid jet head according to <10> or <11>,
wherein the treatment layer contains at least one kind selected from the group consisting of Hf, Ta, and Zr.

<13> The liquid jet head according to any one of <1> to <12>,
wherein the liquid jet head includes the resin layer between the first member and the second member, and an average thickness of the resin layer is from 1.0 μm to 2.5 μm.

<14> The liquid jet head according to any one of <1> to <13>,
wherein the first member is a nozzle plate in which jet ports for jetting a liquid are formed,
wherein the second member is a flow path plate including individual liquid chambers leading to the jet ports, and
wherein the individual liquid chambers are formed by the first member and the second member being bonded via the resin layer.

<15> The liquid jet head according to any one of <1> to <14>,
wherein the resin layer contains a structural unit represented by general formula (1a) below, a structural unit represented by structural formula 1 below, and an imidazole compound represented by general formula (2) below,

[Chem. 61]

General Formula (1a)

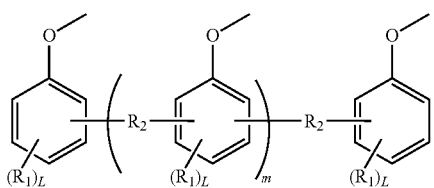

where in the general formula (1a) above, L is an integer of 0 or greater but less than 3, m is a positive number of 0.1 or greater but less than 50, $R_1$ represents any one of a hydrogen atom, and an alkyl group having 1 to 4 carbon atoms, and $R_2$ represents a substituent represented by a formula below.

[Chem. 62]

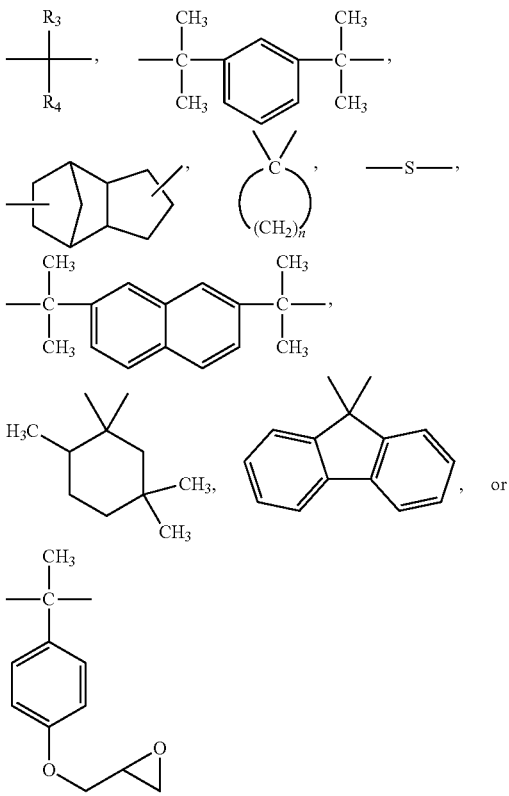

where $R_3$ and $R_4$ each independently represent any one of a hydrogen atom, and a non-substituted or fluorine-substituted methyl group, and n is an integer of from 4 to 12,

[Chem. 63]

Structural Formula 1

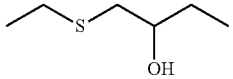

[Chem. 64]

General Formula (2)

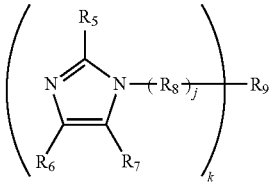

where in the general formula (2) above, k is 1 or greater but less than 6, j is 0 or 1, $R_5$, $R_6$, and $R_7$ each independently represent any one of a hydrogen atom, an alkyl group having 1 to 20 carbon atoms, and an aryl group, $R_8$ represents any one of an alkylene group having 1 to 20 carbon atoms, an arylene group, and —$CH_2CH_2COO$—, and $R_9$ represents a hydrogen atom, an alkyl group having 1 to 20 carbon atoms, an aryl group, or a cyanomethyl group when k is 1, and represents a hydrocarbon group having 1 to 20 carbon atoms when k is 2 to 6.

<16> A method for producing a liquid jet head including a flow path composed of a first member, a resin layer, and a second member, the method including: imparting a cured product of a resin composition to the first member, where the resin composition contains an epoxy compound represented by general formula (1) below, a polythiol compound having 2 or more thiol groups in a molecule thereof, and an imidazole compound represented by general formula (2) below, bonding the first member and the second member with each other via the resin composition, and applying energy to the resin composition to cure the resin composition and form the resin layer,

[Chem. 65]

General Formula (1)

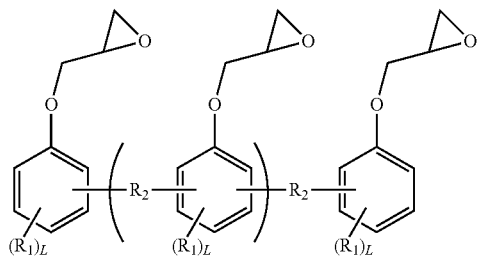

where in the general formula (1) above, L is an integer of 0 or greater but less than 3, m is a positive number of 0.1 or greater but less than 50, $R_1$ represents any one of a hydrogen atom, and an alkyl group having 1 to 4 carbon atoms, and $R_2$ represents a substituent represented by a formula below,

[Chem. 66]

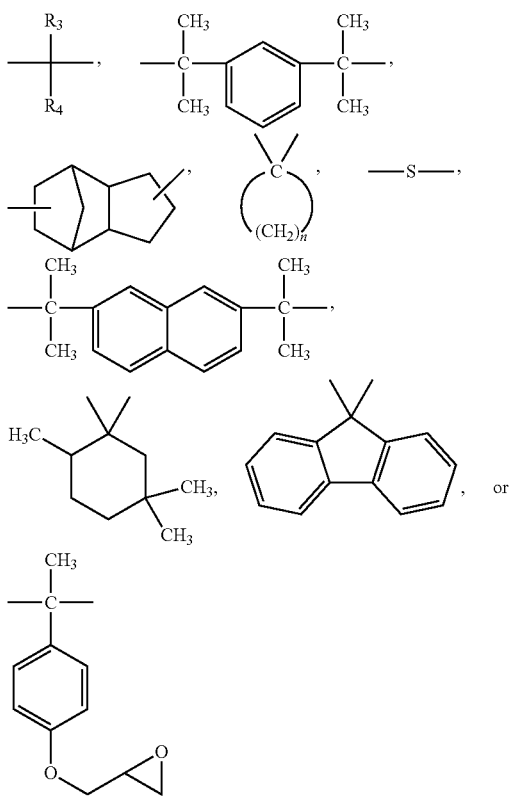

where $R_3$ and $R_4$ each independently represent any one of a hydrogen atom, and a non-substituted or fluorine-substituted methyl group, and n is an integer of from 4 to 12,

[Chem. 67]

General Formula (2)

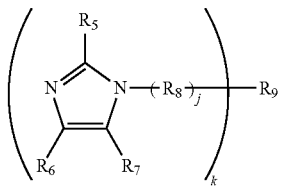

where in the general formula (2) above, k is 1 or greater but less than 6, j is 0 or 1, $R_5$, $R_6$, and $R_7$ each independently represent any one of a hydrogen atom, an alkyl group having 1 to 20 carbon atoms, and an aryl group, $R_8$ represents any one of an alkylene group having 1 to 20 carbon atoms, an arylene group, and —$CH_2CH_2COO$—, $R_9$ represents a hydrogen atom, an alkyl group having 1 to 20 carbon atoms, an aryl group, or a cyanomethyl group when k is 1, and represents a hydrocarbon group having 1 to 20 carbon atoms when k is 2 to 6.

<17> A liquid jet apparatus, including:
the liquid jet head according to any one of <1> to <15>.

<18> An image forming apparatus, including:
a housing unit configured to house an inkjet ink, and
a liquid jet head configured to apply an impact to the inkjet ink to fly the ink and record an image over a recording medium,
wherein the liquid jet head is the liquid jet head according to any one of <1> to <15>.

REFERENCE SIGNS LIST 100 liquid jet head
101 nozzle
102 nozzle plate
103 flow path
104 flow path plate
105 vibration plate
113 resin layer

The invention claimed is:
1. A liquid jet head, comprising:
a flow path composed of a first member, a resin layer, and a second member,
wherein the resin layer comprises a cured product of a resin composition that comprises: an epoxy compound represented by general formula (1) below; a polythiol compound having 2 or more thiol groups in a molecule thereof; and an imidazole compound represented by general formula (2) below:

General Formula (1)

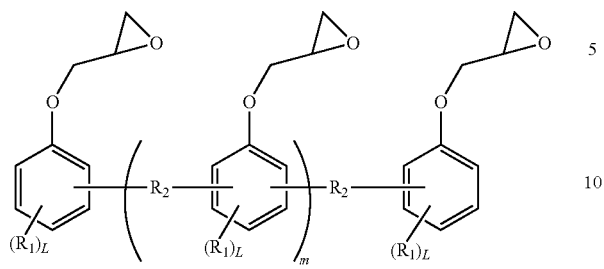

wherein in general formula (1), L is an integer of 0 or greater but less than 3, m is a positive number of 0.1 or greater but less than 50, $R_1$ represents any one of a hydrogen atom, and an alkyl group having 1 to 4 carbon atoms, and $R_2$ represents a substituent represented by a formula below,

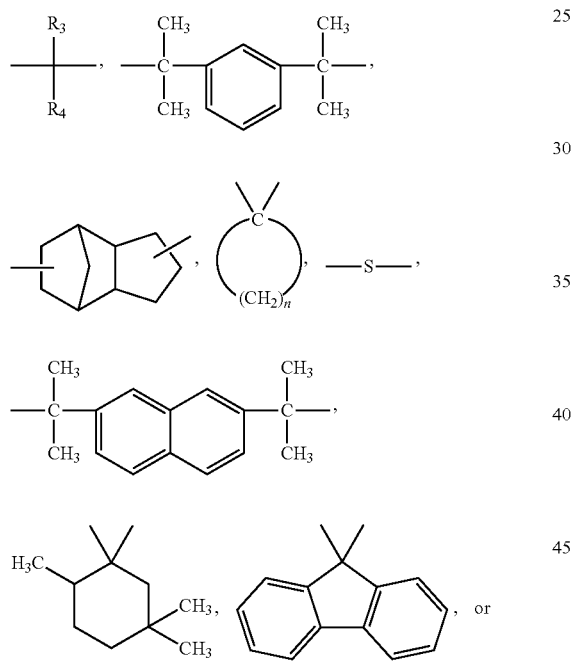

-continued

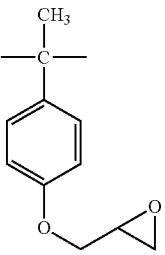

wherein $R_3$ and $R_4$ each independently represent any one of a hydrogen atom, and a non-substituted or fluorine-substituted methyl group, and n is an integer of from 4 to 12, General Formula (2)

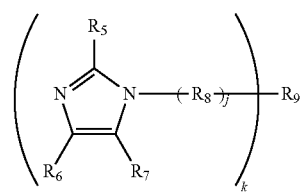

wherein in general formula (2), k is 1 or greater but less than 6, j is 0 or 1, $R_5$, $R_6$, and $R_7$ each independently represent any one of a hydrogen atom, an alkyl group having 1 to 20 carbon atoms, and an aryl group, $R_8$ represents any one of an alkylene group having 1 to 20 carbon atoms, an arylene group, and —$CH_2CH_2COO$—, $R_9$ represents a hydrogen atom, an alkyl group having 1 to 20 carbon atoms, an aryl group, or a cyanomethyl group when k is 1, and represents a hydrocarbon group having 1 to 20 carbon atoms when k is 2 to 6.

2. The liquid jet head according to claim 1, wherein in general formula (2), j is 1.

3. The liquid jet head according to claim 1, wherein the epoxy compound represented by general formula (1) is an epoxy compound represented by a general formula (3):

General Formula (3)

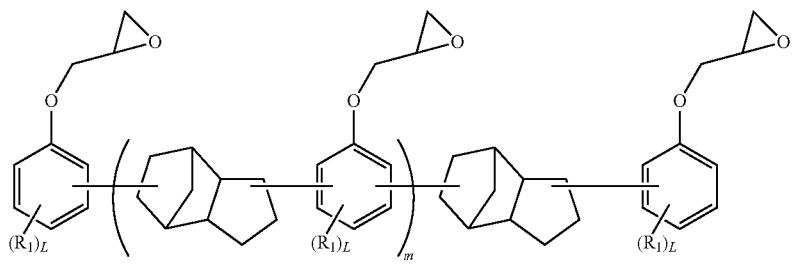

wherein in general formula (3), L is an integer of 0 or greater but less than 3, in is a positive number of 0.1 or greater but less than 50, and $R_1$ represents any one of a hydrogen atom, and an alkyl group having 1 to 4 carbon atoms.

4. The liquid jet head according to claim 1, wherein the resin composition comprises an epoxy compound represented by a general formula (4):

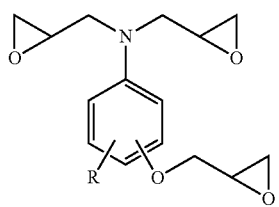

General Formula (4)

wherein in general formula (4), R represents any one of a hydrogen atom, and an alkyl group having 1 to 4 carbon atoms.

5. The liquid jet head according to claim 1, wherein the resin composition comprises an epoxy compound represented by a general formula (5):

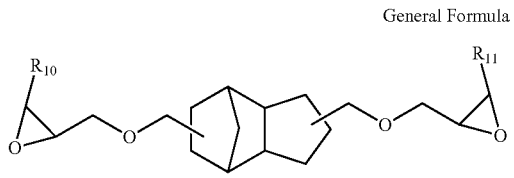

General Formula (5)

wherein in general formula (5), $R_{10}$ and $R_{11}$ each independently represent any one of a hydrogen atom, and an alkyl group having 1 to 4 carbon atoms.

6. The liquid jet head according to claim 1, wherein a content of the epoxy compound represented by general formula (1) is from 10 parts by mass to 100 parts by mass relative to a total epoxy compound amount of 100 parts by mass.

7. The liquid jet head according to claim 1, wherein the polythiol compound is at least one kind selected from the group consisting of dipentaerythritol hexa(3-mercaptobutyrate), and 1,3,5-tris(3-mercaptopropyl)-1,3,5-triazine-2,4,6(1H,3H,5H)-trione.

8. The liquid jet head according to claim 1, wherein the resin composition comprises a silane coupling agent represented by general formula (6):

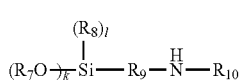

General Formula (6)

wherein in general formula (6), $R_7$ and $R_8$ represent an alkyl group having 1 to 4 carbon atoms, $R_9$ represents any one of an alkylene group having 1 to 20 carbon atoms, and an arylene group, and $R_{10}$ represents any one of a hydrogen atom, an alkyl group having 1 to 20 carbon atoms, and an aryl group.

9. The liquid jet head according to claim 8, wherein the silane coupling agent represented by general formula (6) is at least one kind selected from the group consisting of 3-aminopropyl-trimethoxysilane, 3-aminopropyl triethoxysilane, N-(2-aminoethyl)aminopropyl trimethoxysilane, N-(2-aminoethyl)aminopropylmethyl dimethoxysilane, and 3-phenylaminopropyl trimethoxysilane.

10. The liquid jet head according to claim 1, wherein an interface at which at least any one of the first member and the second member contacts the resin layer comprises a treatment layer, the treatment layer is an oxide that comprises Si, and the oxide comprises a transition metal forming a passive layer over any one of the first member and the second member.

11. The liquid jet head according to claim 10, wherein the treatment layer comprises at least one transition metal selected from the group consisting of transition metals of Group IV and Group V.

12. The liquid jet head according to claim 10, wherein the treatment layer comprises at least one kind selected from the group consisting of Hf, Ta, and Zr.

13. The liquid jet head according to claim 1, wherein the liquid jet head comprises the resin layer between the first member and the second member, and an average thickness of the resin layer is from 1.0 µm to 2.5 µm.

14. The liquid jet head according to claim 1,
wherein the first member is a nozzle plate in which jet ports for jetting a liquid are formed,
wherein the second member is a flow path plate that comprises individual liquid chambers leading to the jet ports, and
wherein the individual liquid chambers are formed by the first member and the second member being bonded via the resin layer.

15. The liquid jet head according to claim 1, wherein the resin layer comprises a structural unit represented by general formula (1a), a structural unit represented by structural formula 1, and an imidazole compound represented by general formula (2):

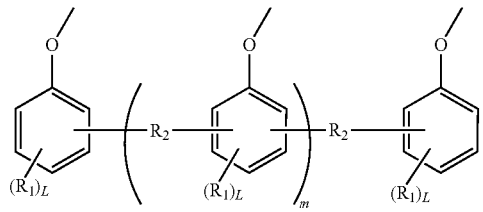

General Formula (1a)

wherein in general formula (1a), L is an integer of 0 or greater but less than 3, m is a positive number of 0.1 or greater but less than 50, $R_1$ represents any one of a hydrogen atom, and an alkyl group having 1 to 4 carbon atoms, and $R_2$ represents a substituent represented by a formula below,

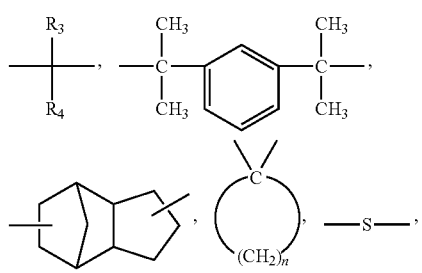

-continued

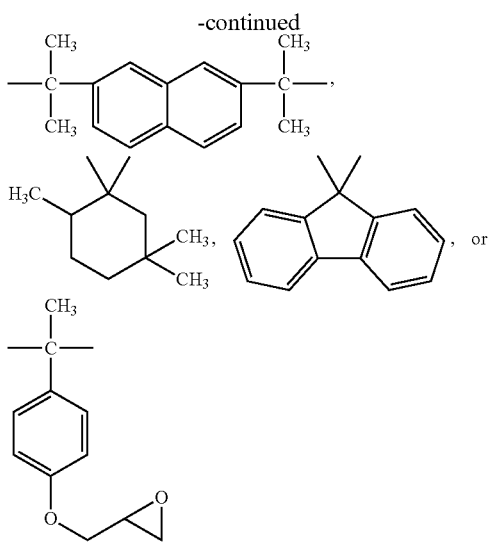

wherein $R_3$ and $R_4$ each independently represent any one of a hydrogen atom, and a non-substituted or fluorine-substituted methyl group, and n is an integer of from 4 to 12, Structural Formula 1

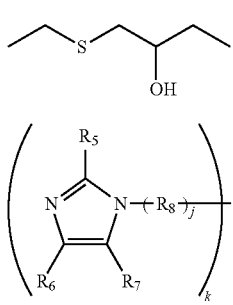

General Formula (2)

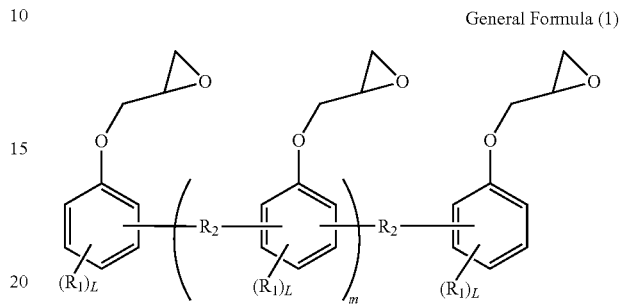

wherein in general formula (2), k is 1 or greater but less than 6, j is 0 or 1, $R_5$, $R_6$, and $R_7$ each independently represent any one of a hydrogen atom, an alkyl group having 1 to 20 carbon atoms, and an aryl group, $R_8$ represents any one of an alkylene group having 1 to 20 carbon atoms, an arylene group, and —$CH_2CH_2COO$—, and $R_9$ represents a hydrogen atom, an alkyl group having 1 to 20 carbon atoms, an aryl group, or a cyanomethyl group when k is 1, and represents a hydrocarbon group having 1 to 20 carbon atoms when k is 2 to 6.

16. An image forming apparatus, comprising:
a housing unit configured to house an inkjet ink, and
a liquid jet head configured to apply an impact to the inkjet ink to fly the ink and record an image over a recording medium,
wherein the liquid jet head is the liquid jet head according to claim 1.

17. A method for producing a liquid jet head that comprises a flow path composed of a first member, a resin layer, and a second member, the method comprising:
imparting a cured product of a resin composition to the first member, where the resin composition comprises an epoxy compound represented by the general formula (1), a polythiol compound having 2 or more thiol groups in a molecule thereof, and an imidazole compound represented by the general formula (2),
bonding the first member and the second member with each other via the resin composition, and
applying energy to the resin composition to cure the resin composition and form the resin layer, General Formula (1)

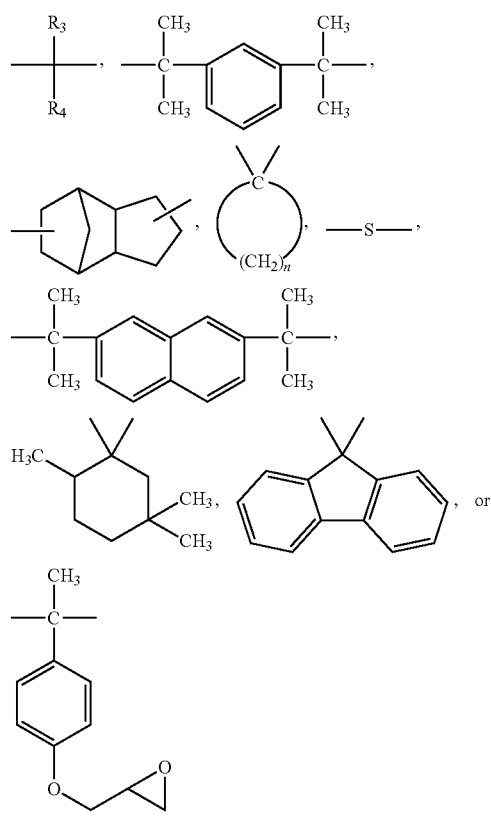

wherein formula (1), L is an integer of 0 or greater but less than 3, m is a positive number of 0.1 or greater but less than 50, $R_1$ represents any one of a hydrogen atom, and an alkyl group having 1 to 4 carbon atoms, and $R_2$ represents a substituent represented by a formula below, wherein $R_3$ and $R_4$ each independently represent any one of a hydrogen atom, and a non-substituted or fluorine-substituted methyl group, and n is an integer of from 4 to 12, General Formula (2)

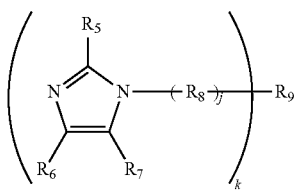

wherein in general formula (2) above, k is 1 or greater but less than 6, j is 0 or 1, $R_5$, $R_6$, and $R_7$ each independently represent any one of a hydrogen atom, an alkyl group having 1 to 20 carbon atoms, and an aryl group, $R_8$ represents any one of an alkylene group having 1 to 20 carbon atoms, an arylene group, and —CH$_2$CH$_2$COO—, $R_9$ represents a hydrogen atom, an alkyl group having 1 to 20 carbon atoms, an aryl group, or a cyanomethyl group when k is 1, and represents a hydrocarbon group having 1 to 20 carbon atoms when k is 2 to 6.

18. A liquid jet apparatus, comprising a liquid jet head comprising:
a flow path composed of a first member, a resin layer, and a second member,
wherein the resin layer comprises a cured product of a resin composition that comprises: an epoxy compound represented by general formula (1) below; a polythiol compound having 2 or more thiol groups in a molecule thereof; and an imidazole compound represented by general formula (2) below:

General Formula (1)

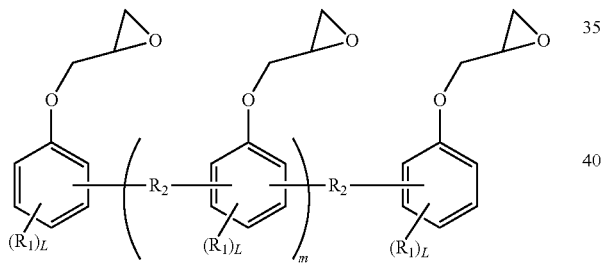

wherein in general formula (1), L is an integer of 0 or greater but less than 3, m is a positive number of 0.1 or greater but less than 50, $R_1$ represents any one of a hydrogen atom, and an alkyl group having 1 to 4 carbon atoms, and $R_2$ represents a substituent represented by a formula below,

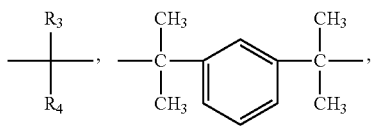

-continued

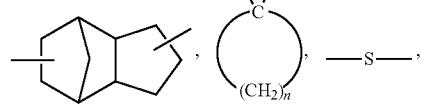

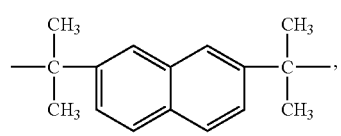

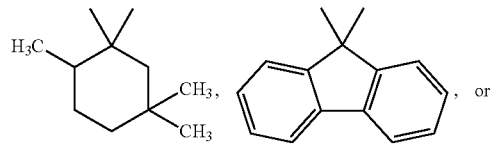

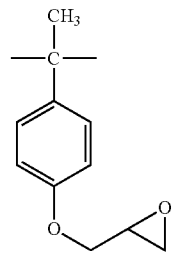

wherein $R_3$ and $R_4$ each independently represent any one of a hydrogen atom, and a non-substituted or fluorine-substituted methyl group, and n is an integer of from 4 to 12, General Formula (2)

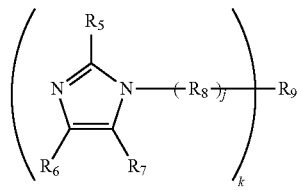

wherein in general formula (2), k is 1 or greater but less than 6, j is 0 or 1, $R_5$, $R_6$, and $R_7$ each independently represent any one of a hydrogen atom, an alkyl group having 1 to 20 carbon atoms, and an aryl group, $R_8$ represents any one of an alkylene group having 1 to 20 carbon atoms, an arylene group, and —CH$_2$CH$_2$COO—, $R_9$ represents a hydrogen atom, an alkyl group having 1 to 20 carbon atoms, an aryl group, or a cyanomethyl group when k is 1, and represents a hydrocarbon group having 1 to 20 carbon atoms when k is 2 to 6.

* * * * *